US012227212B2

United States Patent
Qian et al.

(10) Patent No.: US 12,227,212 B2
(45) Date of Patent: Feb. 18, 2025

(54) COMPUTER VISION BASED REAL-TIME PIXEL-LEVEL RAILROAD TRACK COMPONENTS DETECTION SYSTEM

(71) Applicant: University of South Carolina, Columbia, SC (US)

(72) Inventors: Yu Qian, Irmo, SC (US); Feng Guo, Columbia, SC (US)

(73) Assignee: University of South Carolina, Columbia, SC (US)

(*) Notice: Subject to any disclaimer, the term of this patent is extended or adjusted under 35 U.S.C. 154(b) by 936 days.

(21) Appl. No.: 17/330,591

(22) Filed: May 26, 2021

(65) Prior Publication Data
US 2021/0370993 A1   Dec. 2, 2021

Related U.S. Application Data

(60) Provisional application No. 63/030,376, filed on May 27, 2020.

(51) Int. Cl.
| | | |
|---|---|---|
| B61L 23/04 | (2006.01) | |
| G06N 3/08 | (2023.01) | |
| G06T 7/00 | (2017.01) | |
| G06T 7/73 | (2017.01) | |

(52) U.S. Cl.
CPC ............ *B61L 23/042* (2013.01); *G06N 3/08* (2013.01); *G06T 7/0008* (2013.01); *G06T 7/75* (2017.01); *G06T 2207/20081* (2013.01); *G06T 2207/20084* (2013.01); *G06T 2207/20132* (2013.01)

(58) Field of Classification Search
CPC ....... B61L 23/042; G06T 7/75; G06T 7/0008; G06T 2207/20081; G06T 2207/20084; G06T 2207/20132; G06N 3/08
See application file for complete search history.

(56) References Cited

U.S. PATENT DOCUMENTS

| | | | |
|---|---|---|---|
| 2017/0106885 A1* | 4/2017 | Singh | ............... B61L 23/045 |
| 2018/0018524 A1* | 1/2018 | Yao | ...................... G06V 20/56 |

FOREIGN PATENT DOCUMENTS

CN            112347943 A   *   2/2021

OTHER PUBLICATIONS

Li, Y., Li, S., Du, H., Chen, L., Zhang, D., & Li, Y. (2020). YOLO-ACN: Focusing on Small Target and Occluded Object Detection. IEEE Access, 8, 227288-227303. (Year: 2020).*

Y.-W. Lin, C.-C. Hsieh, W.-H. Huang, S.-L. Hsieh and W.-H. Hung, "Railway Track Fasteners Fault Detection using Deep Learning," 2019 IEEE Eurasia Conference on IOT, Communication and Engineering (ECICE), Yunlin, Taiwan, 2019, pp. 187-190, doi: 10.1109/ECICE47484.2019.8942769 (Year: 2019).*

Bochkovskiy, A., Wang, C., & Liao, H.M. (2020). YOLOv4: Optimal Speed and Accuracy of Object Detection. ArXiv, abs/2004.10934. (Year: 2020).*

(Continued)

*Primary Examiner* — Vu Le
*Assistant Examiner* — Jack Peter Kraynak
(74) *Attorney, Agent, or Firm* — Offit Kurman; Douglas Lineberry

(57) ABSTRACT

Systems, methods and devices for a computer vision-based pixel-level rail components detection system using an improved one-stage instance segmentation model and prior knowledge, aiming to inspect railway components in a rapid, accurate, and convenient fashion.

7 Claims, 51 Drawing Sheets

(56) References Cited

OTHER PUBLICATIONS

Li, Y., Trinh, H., Haas, N., Otto, C., & Pankanti, S. (2014). Rail Component Detection, Optimization, and Assessment for Automatic Rail Track Inspection. IEEE Transactions on Intelligent Transportation Systems, 15, 760-770. (Year: 2014).*

* cited by examiner

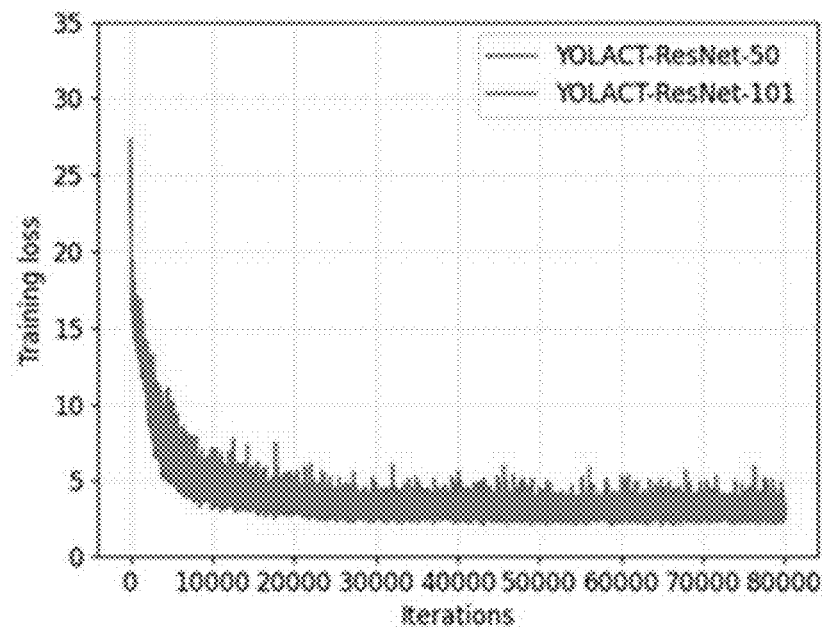
(a)
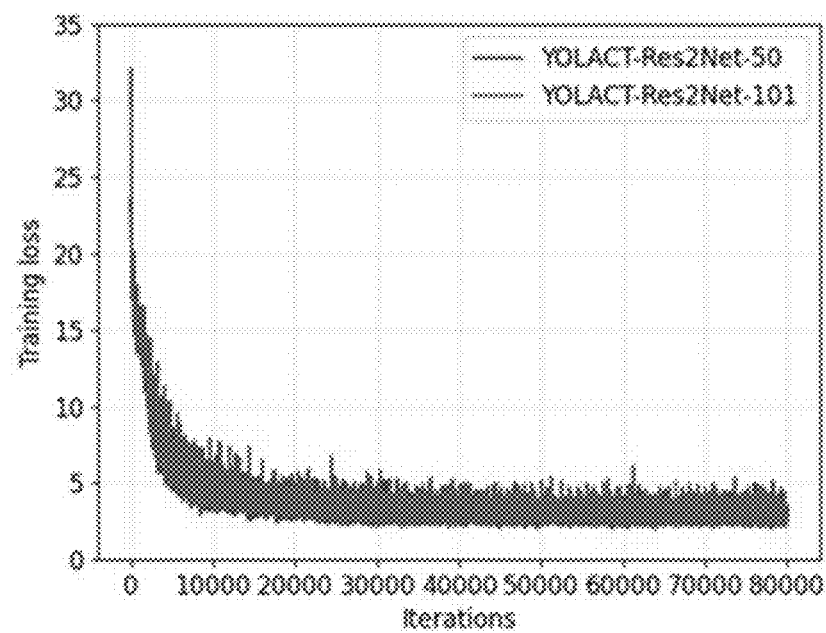
(b)
FIGURE 8

Table 1 The detailed specifications of backbone of proposed Res2Net-50

| Layer | Type | Filter size | Stride | Output channels | Output size |
|---|---|---|---|---|---|
| Input image | | | | | 512 |
| Conv1 | | 7×7 | 2 | 64 | 256 |
| | Max pooling | 3×3 | 2 | 64 | 128 |
| Layer1 | bottleneck | [1×1, 104; 3×3, 26; 3×3, 26; 3×3, 26; 1×1, 256] ×3 | | 256 | 128 |
| Layer2 | bottleneck | [1×1, 208; 3×3, 52; 3×3, 52; 3×3, 52; 1×1, 512] ×4 | | 512 | 64 |
| Layer3 | bottleneck | [1×1, 416; 3×3, 104; 3×3, 104; 3×3, 104; 1×1, 1024] ×6 | | 1024 | 32 |
| Layer4 | bottleneck | [1×1, 832; 3×3, 208; 3×3, 208; 3×3, 208; 1×1, 2048] ×3 | | 2048 | 16 |

FIGURE 15

Table 2 Training hyperparameters for our proposed models

| Hyperparameters | Value |
|---|---|
| Input size | $512 \times 512$ |
| Initial learning rate | $10^{-3}$ |
| Weight decay | $5 \times 10^{-4}$ |
| Momentum | 0.9 |
| Iterations | 80k |
| Batch size | 8 |

FIGURE 16

Table 3 COCO mAP results with different models in this study on custom dataset.

| | Method | AP | AP₅₀ | AP₇₅ | AP_S | AP_M | AP_L | Speed (FPS) |
|---|---|---|---|---|---|---|---|---|
| bbox | YOLACT-Res2Net-50 | 61.5 | 98.1 | 68.0 | 38.5 | 70.3 | 56.8 | 36.4 |
| | YOLACT-Res2Net-101 | 60.7 | 97.8 | 65.8 | 37.3 | 70.5 | 54.6 | 26.8 |
| | YOLACT-ResNet-50 | 57.5 | 97.1 | 58.7 | 43.4 | 68.4 | 47.9 | 40.2 |
| | YOLACT-ResNet-101 | 60.0 | 97.8 | 65.9 | 37.0 | 68.0 | 55.2 | 32.9 |
| | Mask R-CNN | 62.0 | 97.2 | 70.2 | 41.0 | 46.0 | 72.1 | 5 |
| mask | YOLACT-Res2Net-50 | 58.3 | 97.4 | 59.5 | 30.5 | 59.6 | 74.4 | - |
| | YOLACT-Res2Net-101 | 59.1 | 96.9 | 60.3 | 31.1 | 59.6 | 77.5 | - |
| | YOLACT-ResNet-50 | 57.8 | 97.0 | 57.5 | 30.1 | 58.9 | 72.9 | - |
| | YOLACT-ResNet-101 | 58.4 | 97.4 | 57.9 | 27.1 | 57.7 | 76.6 | - |
| | Mask R-CNN | 54.2 | 95.9 | 46.9 | 35.4 | 35.4 | 79.0 | - |

FIGURE 17

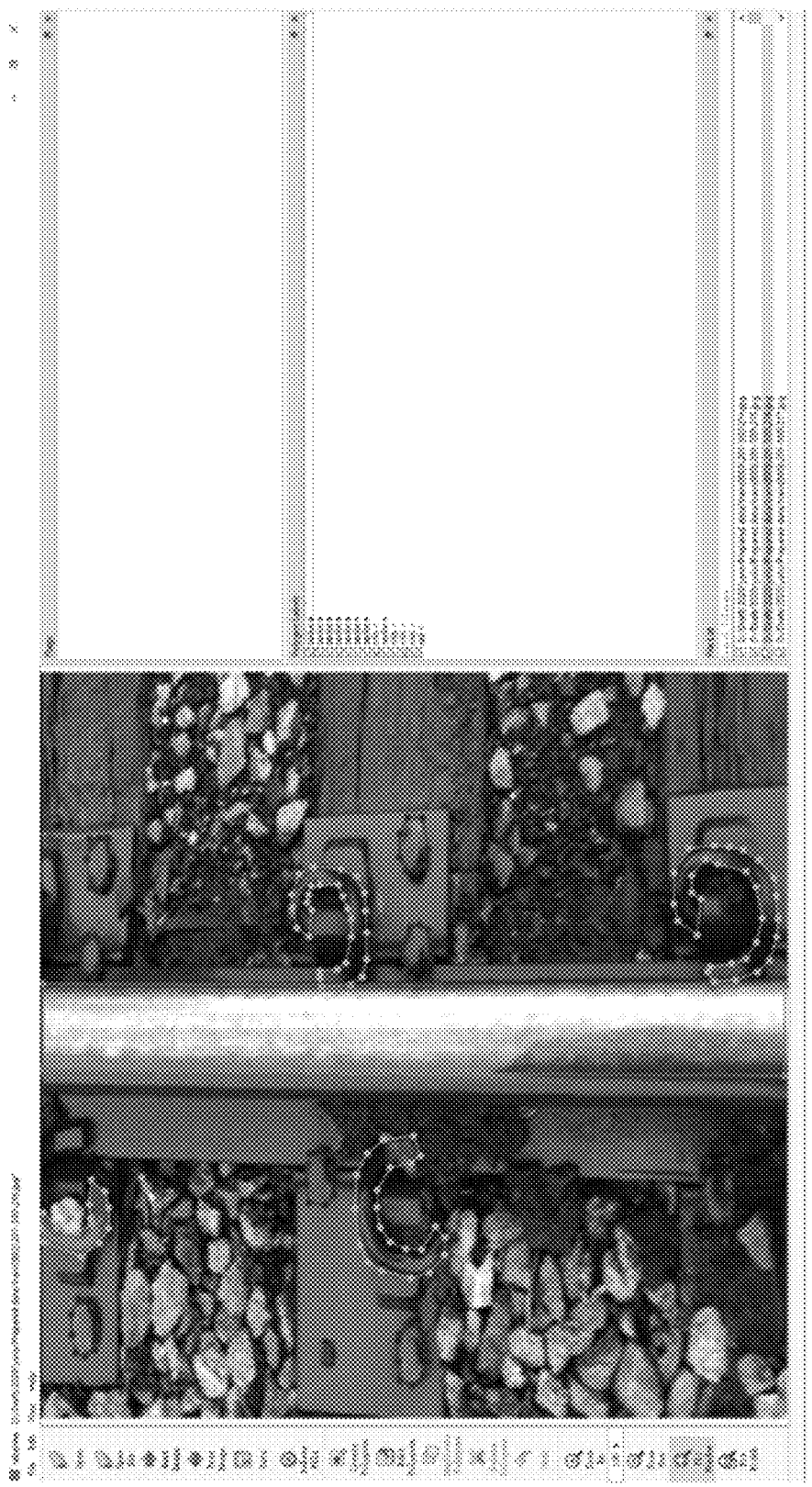

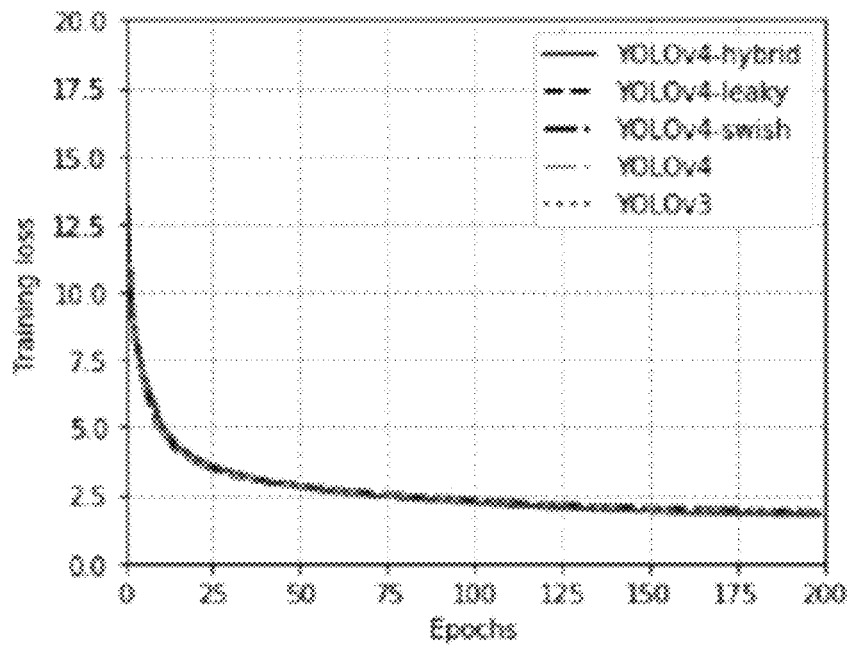
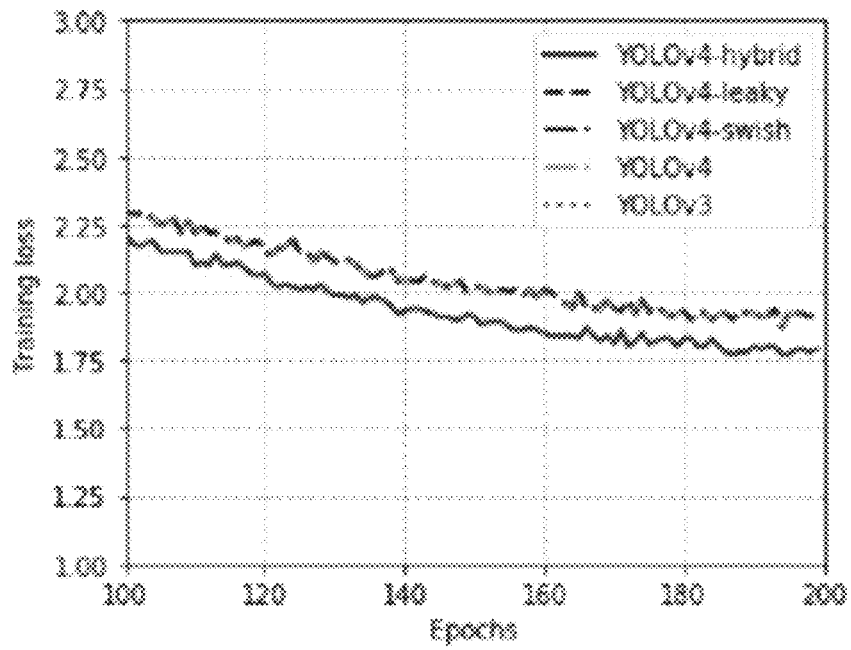
FIGURE 27A

TABLE 4

The hyperparameters of training models.

| Model | Input size | Learning rate | Decay | Momentum | Epochs | Batch size |
|---|---|---|---|---|---|---|
| YOLOv4-hybrid | 512 × 512 | 0.00261 | 0.0005 | 0.949 | 200 | 8 |
| YOLOv4-leaky | 512 × 512 | 0.00261 | 0.0005 | 0.949 | 200 | 8 |
| YOLOv4-swish | 512 × 512 | 0.00261 | 0.0005 | 0.949 | 200 | 8 |
| YOLOv4 | 512 × 512 | 0.00261 | 0.0005 | 0.949 | 200 | 8 |
| YOLOv3 | 512 × 512 | 0.001 | 0.0005 | 0.9 | 200 | 8 |

FIGURE 34

TABLE 5

Performance indicators.

| Model | Class | Precision (%) | Recall (%) | mAP@0.5 (%) | F1 (%) | Inference time (ms) |
|---|---|---|---|---|---|---|
| YOLOv4-hybrid | All | 84.2 | 96.0 | 94.4 | 89.6 | 12.7 (78.7 FPS) |
| | Rail | 78.2 | 100.0 | 96.7 | 87.7 | |
| | Clip | 91.9 | 98.4 | 97.3 | 95.1 | |
| | Spike | 82.6 | 89.4 | 89.3 | 85.9 | |
| YOLOv4-leaky | All | 82.7 | 93.4 | 92.9 | 87.1 | 10.7 (93.5 FPS) |
| | Rail | 70.5 | 100.0 | 96.3 | 82.7 | |
| | Clip | 91.3 | 98.3 | 98.0 | 94.7 | |
| | Spike | 86.3 | 81.8 | 84.3 | 84.0 | |
| YOLOv4-swish | All | 76.5 | 94.2 | 93.2 | 83.7 | 12.1 (82.6 FPS) |
| | Rail | 60.7 | 100.0 | 97.1 | 75.6 | |
| | Clip | 91.3 | 97.1 | 96.6 | 94.1 | |
| | Spike | 77.6 | 85.6 | 86.0 | 81.4 | |
| YOLOv4 | All | 82.6 | 94.9 | 93.1 | 87.9 | 13.2 (75.6 FPS) |
| | Rail | 71.5 | 100.0 | 93.1 | 83.4 | |
| | Clip | 91.5 | 97.9 | 97.7 | 94.6 | |
| | Spike | 84.8 | 86.8 | 88.6 | 85.8 | |
| YOLOv3 | All | 82.7 | 95.0 | 92.6 | 87.7 | 9.6 (104.1 FPS) |
| | Rail | 67.4 | 100.0 | 93.8 | 80.5 | |
| | Clip | 90.4 | 99.0 | 96.7 | 94.5 | |
| | Spike | 90.2 | 86.0 | 87.2 | 88.1 | |

The bold and italics indicates to highlight the best results of each column.

FIGURE 35

TABLE 6
Influence of different loss functions.

| Model | Class | Precision (%) | Recall (%) | mAP@0.5 (%) | F1 (%) | Inference time (ms) |
|---|---|---|---|---|---|---|
| YOLOv4-hybrid (CIoU) | All | 84.2 | 96.0 | 94.4 | 89.6 | 12.7 (78.7FPS) |
| | Rail | 78.2 | 100.0 | 96.7 | 87.7 | |
| | Clip | 91.9 | 98.4 | 97.3 | 95.1 | |
| | Spike | 82.6 | 89.4 | 89.3 | 85.9 | |
| YOLOv4 (CIoU) | All | 82.6 | 94.9 | 93.1 | 87.9 | 13.2 (75.6FPS) |
| | Rail | 71.5 | 100.0 | 93.1 | 83.4 | |
| | Clip | 91.5 | 97.9 | 97.7 | 94.6 | |
| | Spike | 84.8 | 86.8 | 88.6 | 85.8 | |
| YOLOv4-hybrid (DIoU) | All | 82.6 | 94.9 | 93.5 | 87.9 | 12.4 (80.6FPS) |
| | Rail | 71.2 | 100.0 | 95.1 | 83.2 | |
| | Clip | 91.2 | 98.4 | 97.8 | 94.7 | |
| | Spike | 85.4 | 86.4 | 87.6 | 85.9 | |
| YOLOv4 (DIoU) | All | 74.8 | 95.5 | 93.0 | 83.4 | 13.1 (76.3FPS) |
| | Rail | 61.9 | 100.0 | 94.7 | 76.5 | |
| | Clip | 88.5 | 99.0 | 97.9 | 93.5 | |
| | Spike | 73.9 | 87.6 | 86.5 | 80.1 | |
| YOLOv4-hybrid (GIoU) | All | 78.0 | 95.7 | 94.1 | 84.8 | 12.7 (78.7FPS) |
| | Rail | 56.7 | 100.0 | 95.0 | 72.4 | |
| | Clip | 90.4 | 98.1 | 96.5 | 94.1 | |
| | Spike | 87.0 | 89.1 | 90.7 | 88.0 | |
| YOLOv4 (GIoU) | All | 73.2 | 95.5 | 94.2 | 82.1 | 13 (76.9FPS) |
| | Rail | 56.7 | 100.0 | 95.7 | 72.4 | |
| | Clip | 81.8 | 97.7 | 96.6 | 89.0 | |
| | Spike | 81.1 | 88.9 | 90.2 | 84.8 | |

FIGURE 36

TABLE 7

Hyperparameters of each training

| Backbone | Learning rate | Input size | Epoch | Batch size | Momentum | Decay |
|---|---|---|---|---|---|---|
| ResNet50 | 0.02 | 512 × 512 | 12 | 8 | 0.9 | 0.0005 |
|  | 0.01 | 512 × 512 | 12 | 8 | 0.9 | 0.0005 |
|  | 0.005 | 512 × 512 | 12 | 8 | 0.9 | 0.0005 |
| ResNet101 | 0.02 | 512 × 512 | 12 | 8 | 0.9 | 0.0005 |
|  | 0.01 | 512 × 512 | 12 | 8 | 0.9 | 0.0005 |
|  | 0.005 | 512 × 512 | 12 | 8 | 0.9 | 0.0005 |

FIGURE 49

TABLE 8

Parallel test results of Mask R-CNN models with different backbones and learning rates

| Backbone | Learning rate | Bbox | | | Mask | | |
|---|---|---|---|---|---|---|---|
| | | mAP | AP_50 | AP_75 | mAP | AP_50 | AP_75 |
| ResNet101 | LR=0.02 | 65.50 | 90.60 | 66.80 | 64.60 | 89.90 | 62.50 |
| | | 65.10 | 90.60 | 66.10 | 64.30 | 90.20 | 63.60 |
| | | 65.40 | 90.90 | 65.10 | 64.30 | 90.00 | 61.80 |
| | Mean Value (MV) | 65.33 | 90.70 | 66.00 | 64.40 | 90.03 | 62.63 |
| | Standard Deviation (SD) | 0.17 | 0.14 | 0.70 | 0.14 | 0.12 | 0.74 |
| | LR=0.01 | 65.40 | 90.50 | 66.60 | 64.30 | 90.30 | 62.00 |
| | | 64.90 | 90.50 | 66.20 | 64.60 | 90.00 | 63.10 |
| | | 64.70 | 90.60 | 66.00 | 64.30 | 89.70 | 62.10 |
| | Mean Value (MV) | 65.00 | 90.53 | 66.27 | 64.40 | 90.00 | 62.40 |
| | Standard Deviation (SD) | 0.29 | 0.05 | 0.25 | 0.14 | 0.24 | 0.50 |
| | LR=0.005 | 65.70 | 90.50 | 67.10 | 64.70 | 90.20 | 64.10 |
| | | 65.10 | 91.30 | 66.90 | 64.20 | 90.40 | 62.50 |
| | | 65.50 | 91.10 | 67.20 | 64.60 | 90.50 | 63.50 |
| | Mean Value (MV) | 65.43 | 90.97 | 67.07 | 64.50 | 90.37 | 63.37 |
| | Standard Deviation (SD) | 0.25 | 0.34 | 0.12 | 0.22 | 0.12 | 0.66 |
| ResNet50 | LR=0.02 | 53.20 | 80.50 | 51.40 | 55.30 | 81.10 | 53.20 |
| | | 52.70 | 80.70 | 50.30 | 54.30 | 81.10 | 52.00 |
| | | 51.80 | 79.80 | 51.00 | 54.00 | 81.00 | 51.90 |
| | Mean Value | 52.57 | 80.33 | 50.90 | 54.53 | 81.07 | 52.37 |
| | Standard Deviation | 0.58 | 0.39 | 0.45 | 0.56 | 0.05 | 0.59 |
| | LR=0.01 | 44.50 | 77.40 | 41.90 | 46.80 | 78.20 | 45.10 |
| | | 44.70 | 77.50 | 43.40 | 46.70 | 78.00 | 46.60 |
| | | 43.20 | 76.40 | 40.90 | 44.80 | 76.70 | 42.20 |
| | Mean Value (MV) | 44.13 | 77.10 | 42.07 | 46.10 | 77.63 | 44.63 |
| | Standard Deviation (SD) | 0.66 | 0.50 | 1.03 | 0.92 | 0.66 | 1.83 |
| | LR=0.005 | 34.90 | 68.50 | 31.50 | 38.80 | 71.60 | 39.00 |
| | | 33.50 | 68.00 | 28.60 | 37.80 | 71.10 | 37.00 |
| | | 34.50 | 68.60 | 31.30 | 39.30 | 72.40 | 39.60 |
| | Mean Value (MV) | 34.30 | 68.37 | 30.47 | 38.63 | 71.70 | 38.53 |
| | Standard Deviation (SD) | 0.59 | 0.26 | 1.32 | 0.62 | 0.54 | 1.11 |

Note: Except for SD, the parameters' unit are percentage (%).

FIGURE 50

COMPUTER VISION BASED REAL-TIME PIXEL-LEVEL RAILROAD TRACK COMPONENTS DETECTION SYSTEM

BACKGROUND OF THE INVENTION

1) Field of the Invention

The present invention relates to systems, methods and devices for a computer vision-based pixel-level rail components detection system using an improved one-stage instance segmentation model and prior knowledge, aiming to inspect railway components in a rapid, accurate, and convenient fashion.

Citation or identification of any document in this application is not an admission that such a document is available as prior art to the present disclosure.

2) Description of Related Art

In the United States, to ensure railroad safety and efficient operation, high-frequency track inspections (once or twice a week) are enforced by the Federal Railroad Administration (FRA). Various types of automatic inspection equipment have been applied, such as ground penetrating radar, laser, or Lidar, etc. but they are usually very expensive and require extensive training and experience to operate. The data collected in the field needs to be transferred/returned to perform post-processing and interpret the results with complex procedures, which usually takes a significant amount of time. Prior to the current disclosure, track inspections heavily rely on manual inspections which are low efficiency, subjective, and not as accurate as desired, especially for missing and broken track components, such as spikes, clips, tie plates, etc. Current approaches comprise two steps, which separate inspection video collection and data analysis. All the collected videos need to be brought back from the field to process and obtain useful information.

Periodic inspections on railroad track component conditions are essential to maintain railroad safety and efficient operation. According to the Federal Railroad Administration (FRA) safety database (FRA, 2018a), there were 546 accidents associated with track defects in 2018, resulting in over $97 million financial loss and uncountable negative social impact. Out of the 546 accidents, there were 48 accidents, caused by missing spikes, clips, and broken rails, etc. leading to around $10 million damages.

In the United States, FRA mandates regular track inspections once or twice per week as part of the early warning strategy (FRA, 2018b). Unfortunately, to date, most of the track inspection work, except for the track geometry measurement, is still very labor- and time-intensive, especially for inspecting missing components. Due to the nature of the manual inspection, the results of inspecting missing components are inefficient and expensive. This issue is more pronounced with the Class I railroad mainlines due to the saturated traffic volume and limited windows for inspection and maintenance, leading to derailments and severe accidents. For example, broken spikes caused a 120-car Norfolk Southern train derailment at Vandergrift, PA, which spilled between 3,000 and 4,000 gallons of crude oil. In addition, due to broken spikes, a Union Pacific train carrying 96 cars derailed near Mosier, Oregon, resulting in 42,000 gallons of Bakken oil being spilled and a severe oil train fire (Dake, 2016; Hardway, 2014; Tom Roadcap, 2018). Thus, an automatic rail components inspection system with high accuracy, fast processing speed, and low cost, is in urgent need.

In the past few years, many efforts have been devoted to developing automatic track inspection systems. Sawadisavi et al. (2009) applied the machine vision system as a supplement for manual visual inspection. Simple, local features such as edge and texture information were utilized with Gabor filters. However, with the limitation of low-level feature extractors, it cannot deal well with the variation of environmental conditions and object appearances. Xia et al. (2010) attempted the detection of broken rail fasteners with the Adaboost algorithm. With the from-coarse-to-fine strategy, the fastener position was determined first, and then the Adaboost-based algorithm was performed to recognize the fastener condition. Although the accuracy of this approach was reasonable in many cases, the processing speed was low and real-time processing was not possible.

Yang et al. (2011) demonstrated a Direction Field (DF)-based method for detecting absent fasteners. The object DF was extracted as the feature element for recognition and the weight coefficient matrix was obtained based on the Linear Discriminant Analysis (LDA). Their detection approach performed well on low-resolution images with 320×240 pixels taken from the high-speed railways but its performance on high-resolution images was not mentioned. Feng et al (2013) proposed a new probabilistic structure topic model (STM) to detect partially worn and missing fasteners. Compared with other methods such as support-vector machine (SVM) and AdaboostSTM, STM is more robust and can achieve a higher precision on the detection of fasteners with different orientations and illumination conditions. Unfortunately, STM is very demanding in computational power, thus, it cannot perform an end-to-end test.

Earlier computer vision algorithms such as edge detection, Adaboost, SVM, etc. have been applied to detect rail components and can improve inspection efficiency. However, there is still room for improvement in terms of accuracy, efficiency, speed, end-to-end test, and robustness, etc. Notably, the convolutional neural network (CNN), which automatically learns input features with efficient computation, has been extremely successful in computer vision development recently. It has been growing rapidly and becoming popular with the increased size of training data and improved computation power (Pan & Yang, 2020).

Since the early 2000s, CNNs have dominated object detection, semantic segmentation, instance segmentation, multiple object tracking (MOT), etc. (LeCun, Bengio, & Hinton, 2015) Several CNNs with high accuracy and efficiency such as AlexNet (Krizhevsky, Sutskever, & Hinton, 2012), VGGNet (Simonyan & Zisserman, 2014), Google Net (Szegedy et al., 2015), Inception Net (Szegedy, Vanhoucke, Ioffe, Shlens, & Wojna, 2016), ResNet (He, Zhang, Ren, & Sun, 2016), EfficientNet (Tan & Le, 2019) have been successfully developed and adopted in the field. In terms of object detection, there are mainly two categories, one-stage detector and two-stage detector (Jiao et al., 2019). YOLO (Redmon, Divvala, Girshick, & Farhadi, 2016), SSD (Liu et al., 2016), and RetinaNet (Lin, Goyal, Girshick, He, & Dollár, 2017) are the representatives of the one-stage detectors which can work in real-time with high inference speed. For the two-stage detectors, Fast R-CNN (Girshick, 2015) is the most representative, which has high accuracy on the object localization and recognition. In terms of instance segmentation, Mask R-CNN (He, Gkioxari, Dollar, & Girshick, 2017), a state-of-the-art model, is very accurate on object detection, but its processing speed is relatively low. To fill the gap, YOLACT (Bolya, Zhou, Xiao, & Lee, 2019) breaks up instance segmentation into two parallel tasks and can achieve over 30 FPS processing speed on MS COCO (Lin et al., 2014) with only one GPU.

With the significant progress in the development of neural networks and computer vision, infrastructure damage detection methods based on machine learning and computer vision have been successfully applied in civil engineering (Adeli, 2001; Rafiei and Adeli, 2017; Cha et al., 2018; Rafiei and Adeli, 2018; Perez-Ramirez et al., 2019; Yeum et al., 2019; Cao et al., 2020) For instance, in bridge damage detection, researchers have conducted bridge health inspections by using the Bayesian optimized deep learning model (Liang, 2019), concrete bridge surface damage detection by using the improved YOLOv3 (C. Zhang, Chang, & Jamshidi, 2020), crack evaluation of a high-rise bridge by using a modified SegNet (Jang, An, Kim, & Cho, 2020), etc. In the field of pavement assessment and crack detection, Fei et al. (Fei et al., 2019; A. Zhang et al., 2017) developed CrackNet and CrackNet-V for pixel-level cracking detection on 3D asphalt images. Jeong et al (Jeong, Jo, & Ditzler, 2020) assessed the pavement roughness by using an optimized CNN.

For concrete structure damage evaluation, there were studies on the reinforced concrete building damage detection using ResNet-50 and ResNet-50-based YOLOv2 (Pan & Yang, 2020), pixel-level multiple damage detection of concrete structure by using a fine-tuned DesNet-121 (Li, Zhao, & Zhou, 2019), and concrete crack detection by using context-aware semantic segmentation (X. Zhang, Rajan, & Story, 2019), etc. Moreover, health condition monitoring of civil infrastructure has widely used CNNs, such as infrastructure condition assessment by using DCNNs (Wu et al., 2019) and the estimation of wind-induced responses by using a CNN model (Oh, Glisic, Kim, & Park, 2019), etc. However, few studies implemented the cutting-edge CNN models on railroad track inspection and detection. Gibert et al. (2016), attempted using the DCNN model, which is used for semantic image segmentation, for railway ties and fasteners inspection. The target objects needed to be classified on multiple levels and cannot perform a real-time and end-to-end test.

Rail component detection remains a very challenging task due to complex environmental conditions, small or tiny objects, and limited training data. It is an object of the present disclosure to provide a computer vision-based pixel-level rail components detection system using an improved one-stage instance segmentation model and prior knowledge, aiming to inspect railway components in a rapid, accurate, and convenient fashion. The proposed network extracts the input features from the improved backbone, predicts objects in different scales utilizing feature pyramid network, and generates high-quality masks by assembling prototype generation and mask coefficient. As FIG. 1 shows, three major tasks were conducted for the current disclosure: 1) data preparation, 2) training and validation, and 3) prediction and validation with other state-of-the-art models. In short, the novelties of this disclosure include, but are not limited to: 1) improved detection performance of the first real-time instance segmentation model, YOLACT, by using a module with more granular levels and receptive fields; 2) the first public rail components image dataset including one thousand 512×512 images and corresponding JSON files; and 3) effects of light condition on the model performance were tested and evaluated.

These and other aspects, objects, features, and advantages of the example embodiments will become apparent to those having ordinary skill in the art upon consideration of the following detailed description of example embodiments.

SUMMARY

The above objectives are accomplished according to the present disclosure by providing in one embodiment an improved one-stage object detection model. The model may include at least one camera, at least one graphics processing unit, at least one one-stage object detection model YOLOv4-hybrid, and may include Swish, Leaky-ReLU, a combination of Mish and Swhich; and the one-stage object detection model YOLOv4-hybrid employs a hybrid activation function, which includes parameters including precision, recall, mAP, and F1 score functionality. Further, the model may function in diverse light conditions. Again, the model may detect image modification. Further, detection of image modification may include analysis of a structural integrity of a component analyzed by the model. Again still, the model may include a deep learning algorithm. Still yet, the model may perform real time component detection. Moreover, wherein the model performs real time component detection on a railway.

In a further embodiment, the current disclosure provides a computer vision-based instance segmentation framework for rail surface defect inspection. The framework may include at least one graphics processing unit, at least one hyperparameter combination, at least one segmentation model configured to perform at least bounding box and mask predictions, at least one backbone; and wherein the vision-based instance segmentation framework: detects in real time; characterizes a defect shape; and quantifies a size of the defect shape. Moreover, the at least one segmentation model may be a Mask R-CNN retrained to inspect train rail surfaces for defects. Still yet, the backbone may comprise ResNet101 or ResNet50. Again further, the defect shape may be a rail surface defect. Yet further, the framework may have at least three learning rates. Further yet, orientation of a railway being analyzed may have no impact on defect detection. Still moreover, the framework may detect dense defect conditions and/or sparse defect conditions. Still again, the framework may detect in normal, over-exposure, and/or weak-light conditions. Further still, the framework may employ a Mask R-CNN-based segmentation model.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 8 shows Training loss of original YOLACT models and proposed YOLACT-Res2Net-50 and YOLACT-Res2Net-101.

rail, clip, and spike on YOLACT-ResNet-50; (d)-(f): rail, clip, and spike on YOLACT-ResNet-101.

Figure 12:
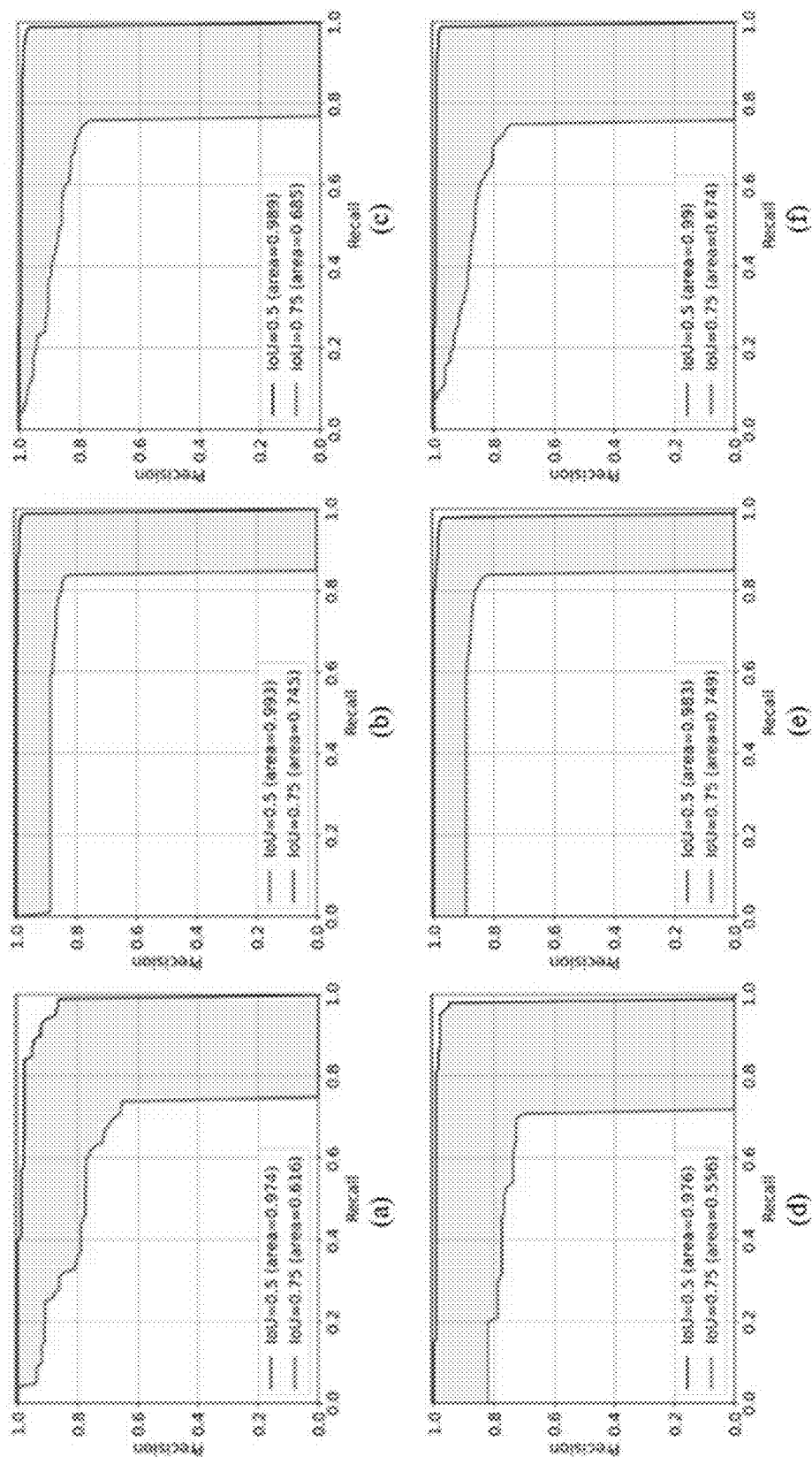

FIG. 12 shows precision-recall curves of YOLACT-Res2Net-50 and YOLACT-Res2Net-101 on each category. (a)-(c): rail, clip, and spike on YOLACT-Res2Net-50; (d)-(f): rail, clip, and spike on YOLACT-Res2Net-101.

Figure 13:
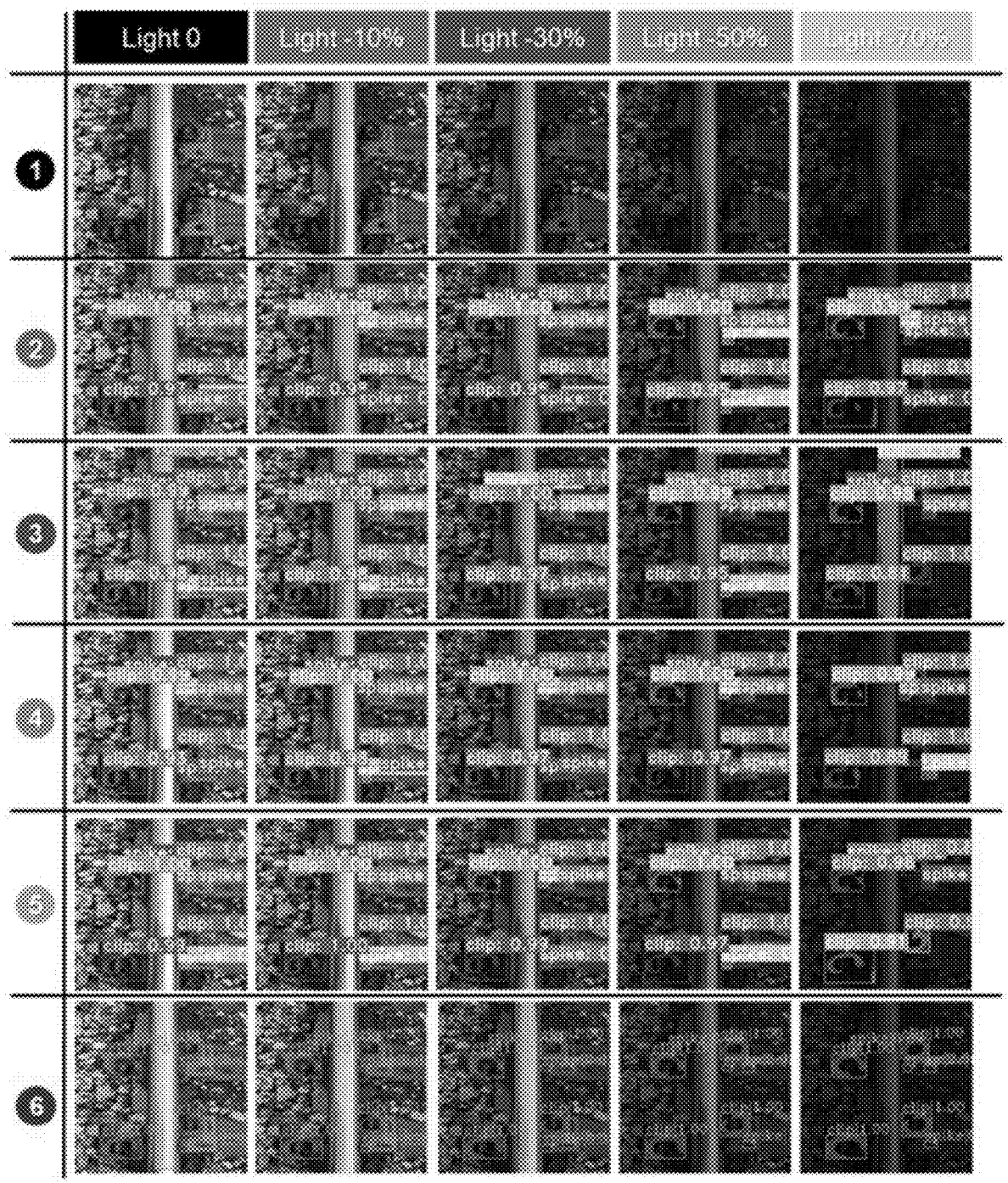

FIG. 13 shows detection results on the different light condition 1: Ground truth; 2: YOLACT-Res2Net-50; 3: YOLACT-Res2Net-101; 4: YOLACT-ResNet-50; 5: YOLACT-ResNet-101; 6: Mask R-CNN.

Figure 14:
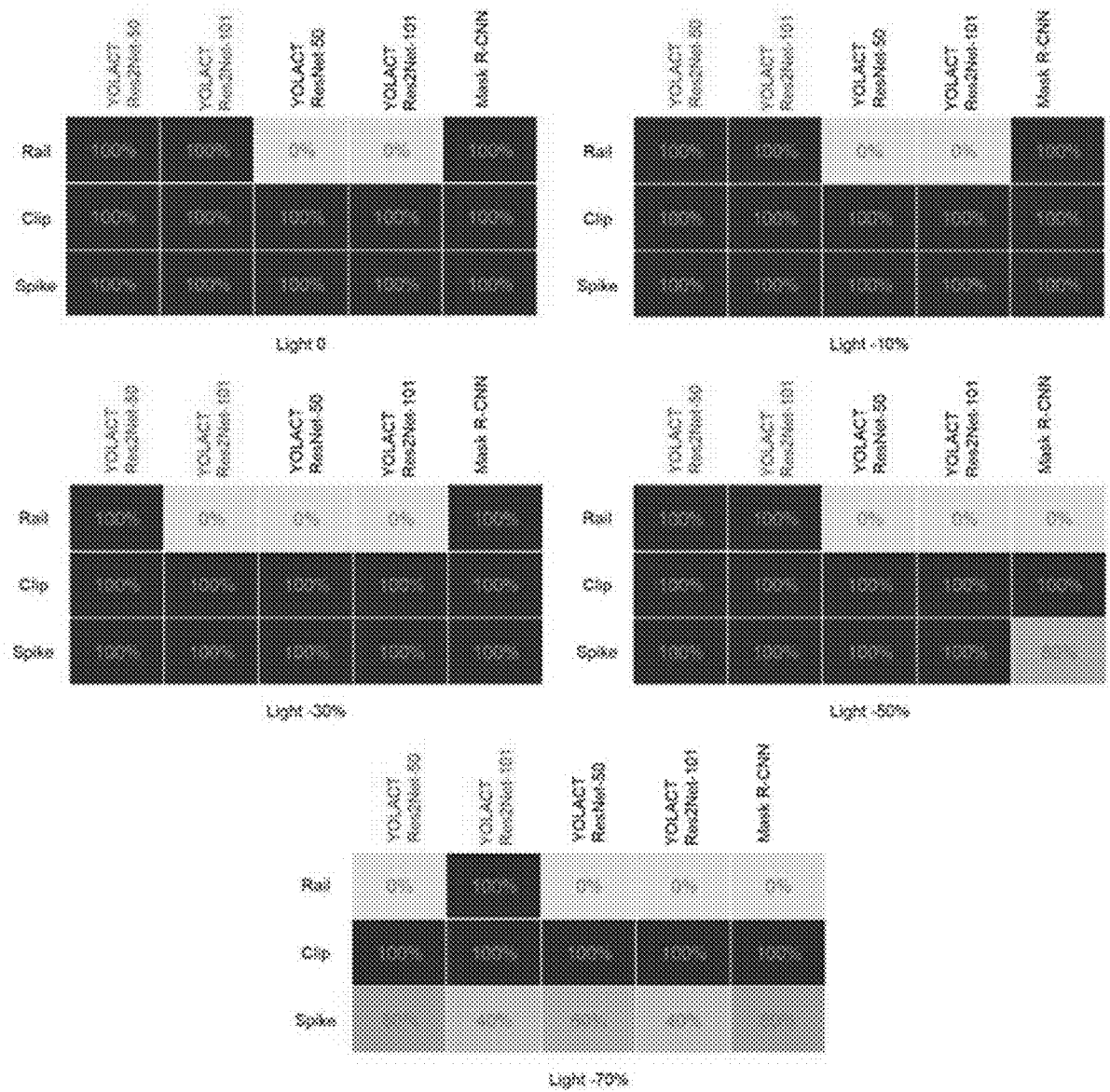

FIG. 14 shows detection accuracy under different illuminations.

FIG. 15 shows Table 1, detailed specifications of backbone of proposed Res2Net-50.

FIG. 16 shows Table 2, training hyperparameters for our proposed models.

FIG. 17 shows Table 3, COCO mAP results with different models in this disclosure on custom dataset.

Figure 18:
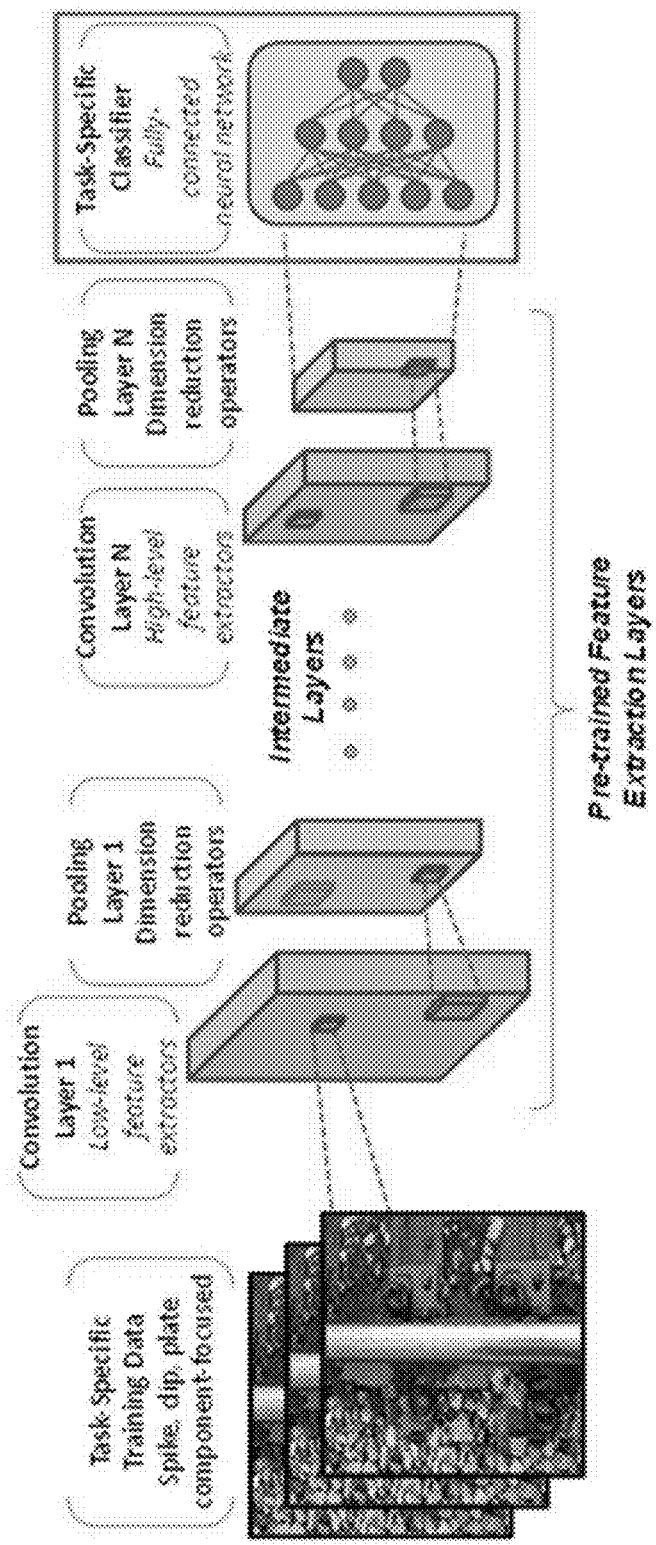

FIG. 18 shows a transfer learning illustration of the current disclosure.

Figure 19:

FIG. 19 shows preliminary e-clip and spike detection results produced by one embodiment of the current disclosure.

Figure 20:

FIG. 20 shows a Basler raL2048-48 gm camera.

Figure 21:
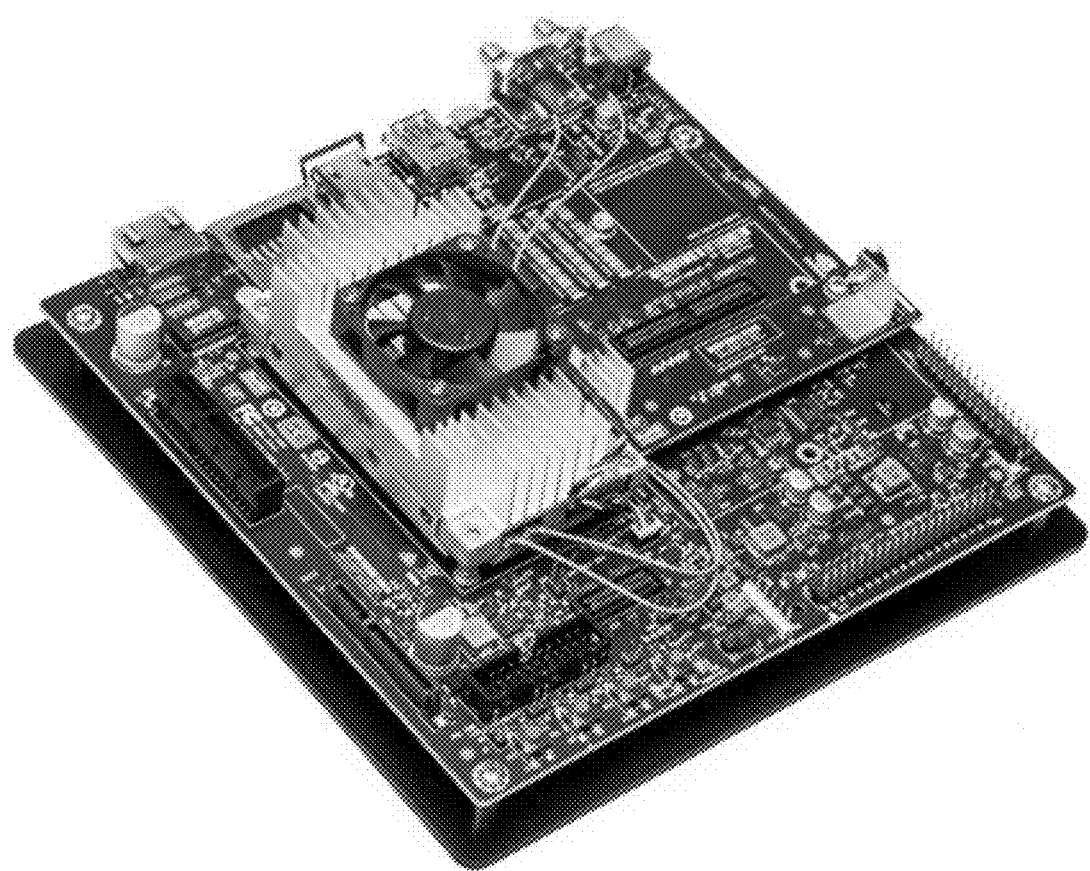

FIG. 21 shows a NVIDIA Jetson TX2 development kit.

Figure 22:
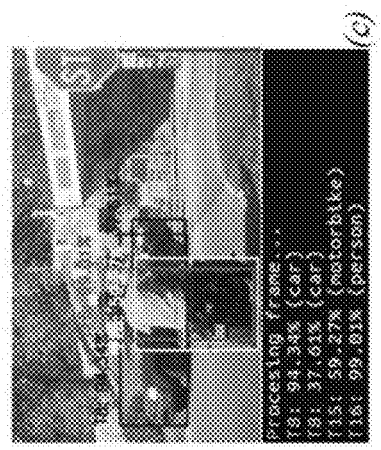

FIG. 22 shows CNN-based target classifications.

Figure 23:
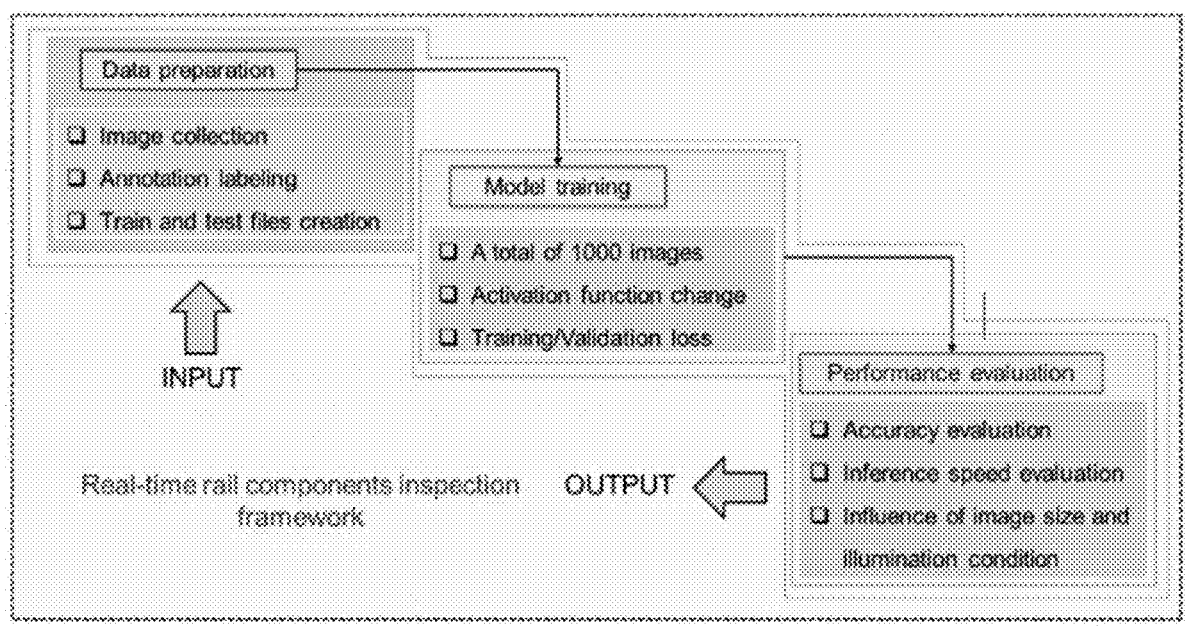

FIG. 23 shows one embodiment of a methodology of the current disclosure.

Figure 24:
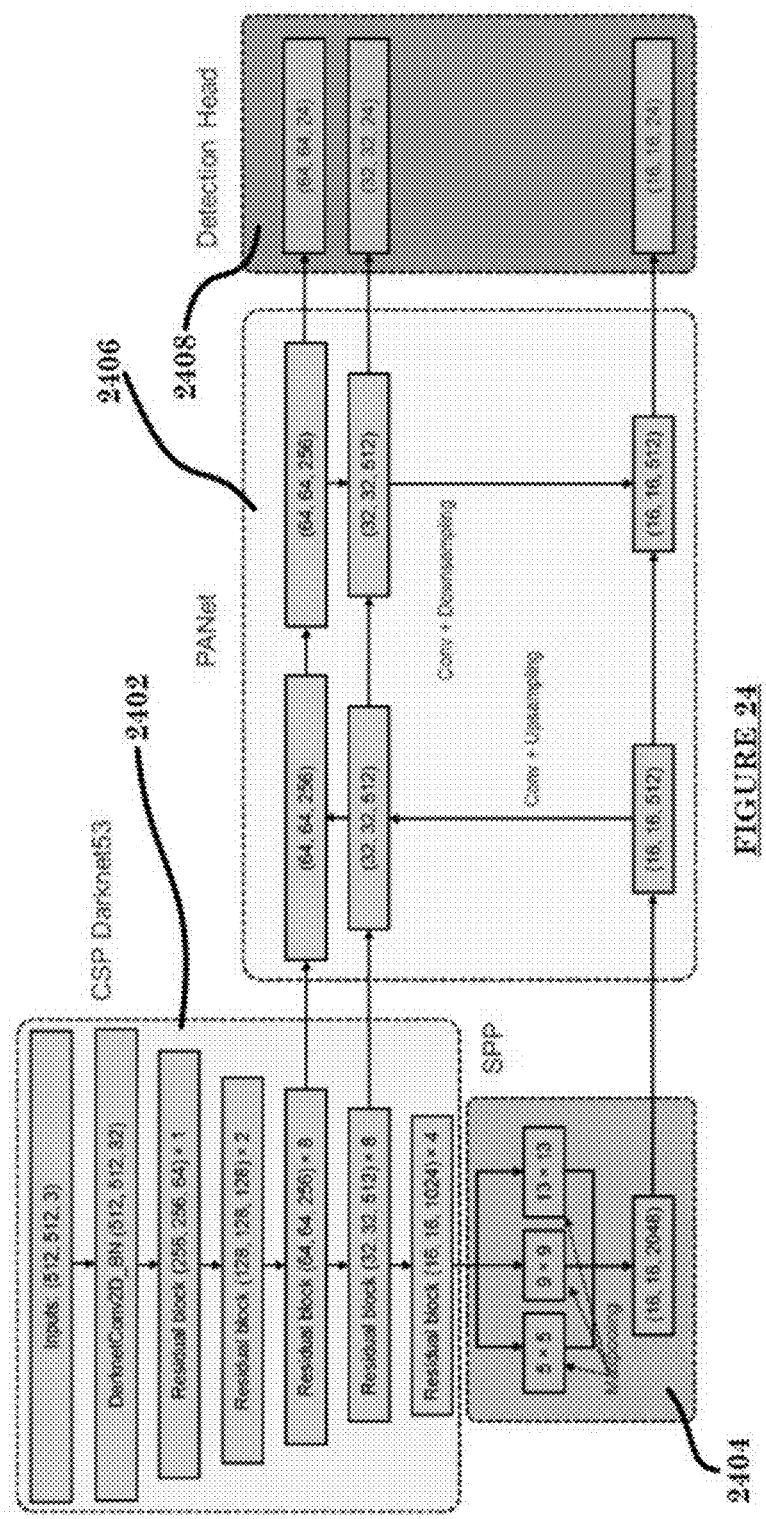

FIG. 24 shows an overview of the YOLOv4 network architecture of the current disclosure.

Figure 25:
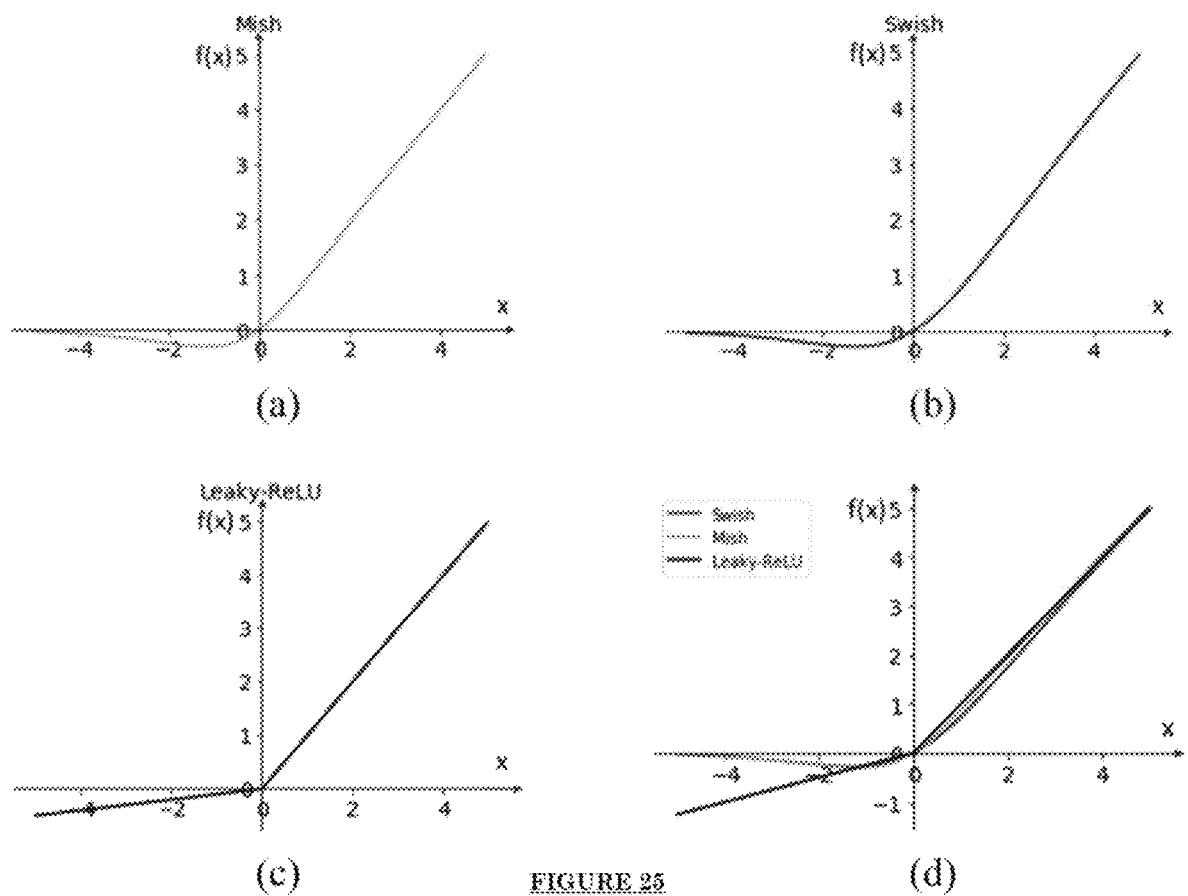

FIG. 25 shows plots of different activation functions (a) Swish (b) Mish (c) Leaky-ReLU (d) Overview of three activation functions in the same coordinate system.

FIG. 26 shows one embodiment of a labeling process in the labelme.

FIG. 27A shows training loss of different models.

Figure 27B:
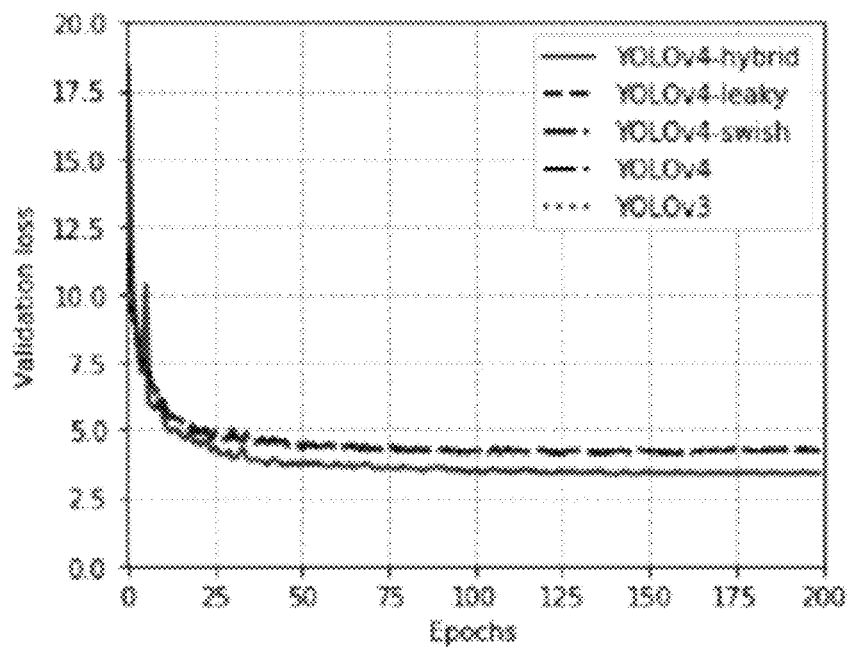

FIG. 27B shows validation loss of different models.

Figure 28:
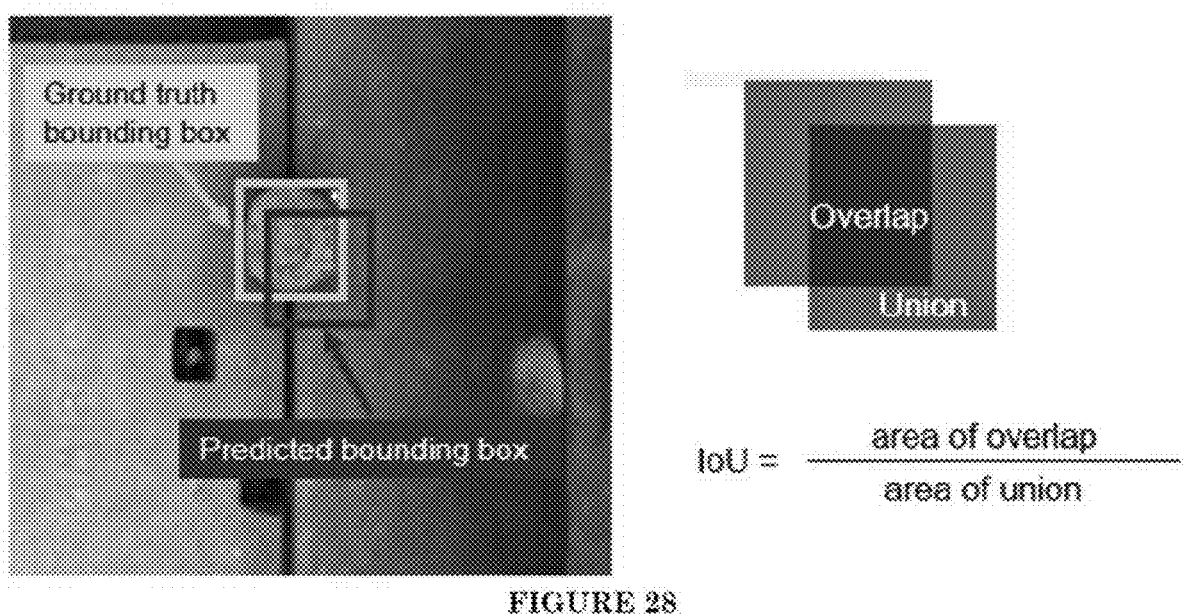

FIG. 28 shows one embodiment of a definition of IoU.

Figure 29:
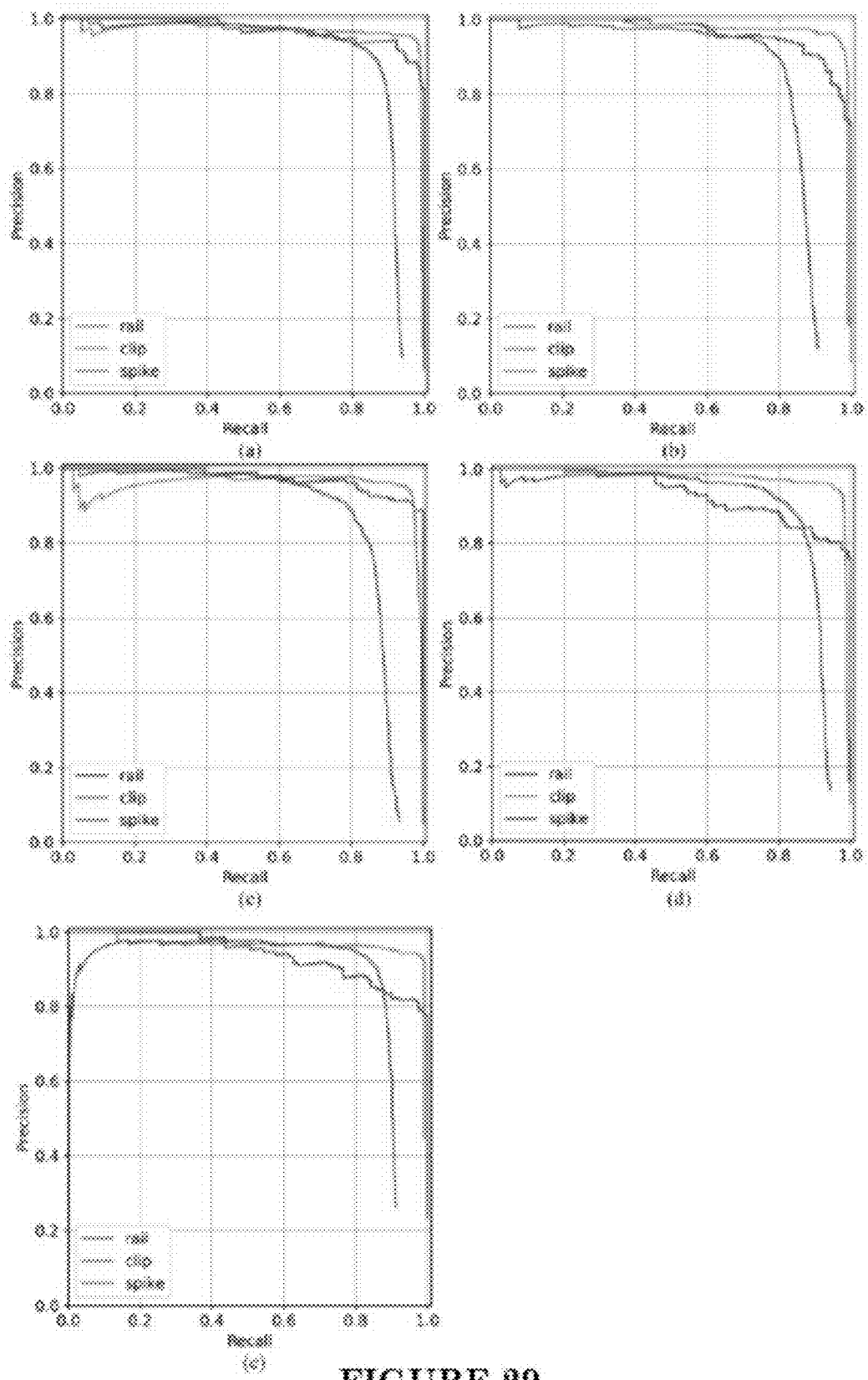

FIG. 29 shows precision-recall curves of testing models. (a) YOLOv4-hybrid (b) YOLOv4-leaky (c) YOLOv4-swish (d) YOLOv4 (e) YOLOv3.

Figure 30:
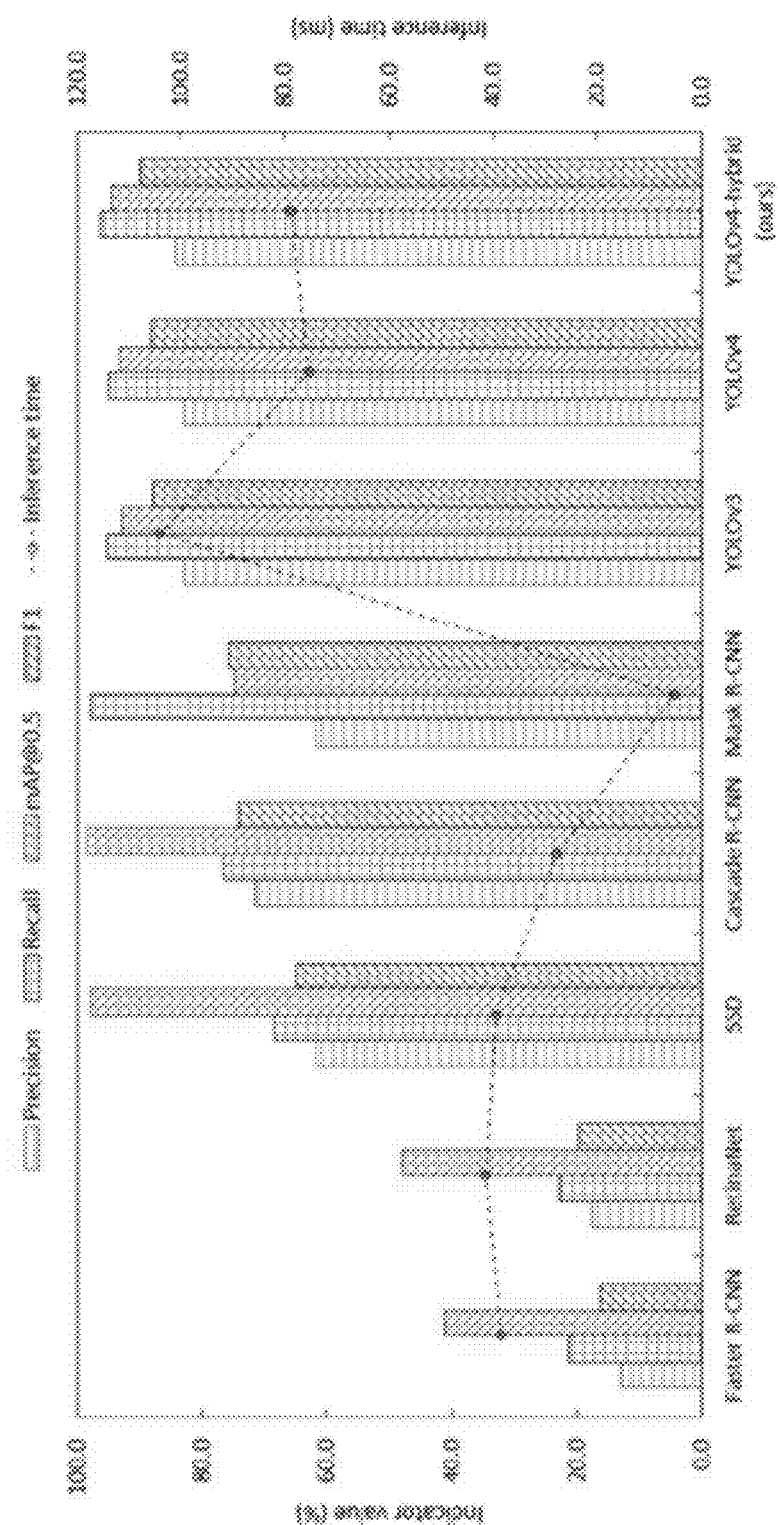

FIG. 30 shows performance comparison between YOLOv4-hybrid and other SOTA models.

Figure 31:
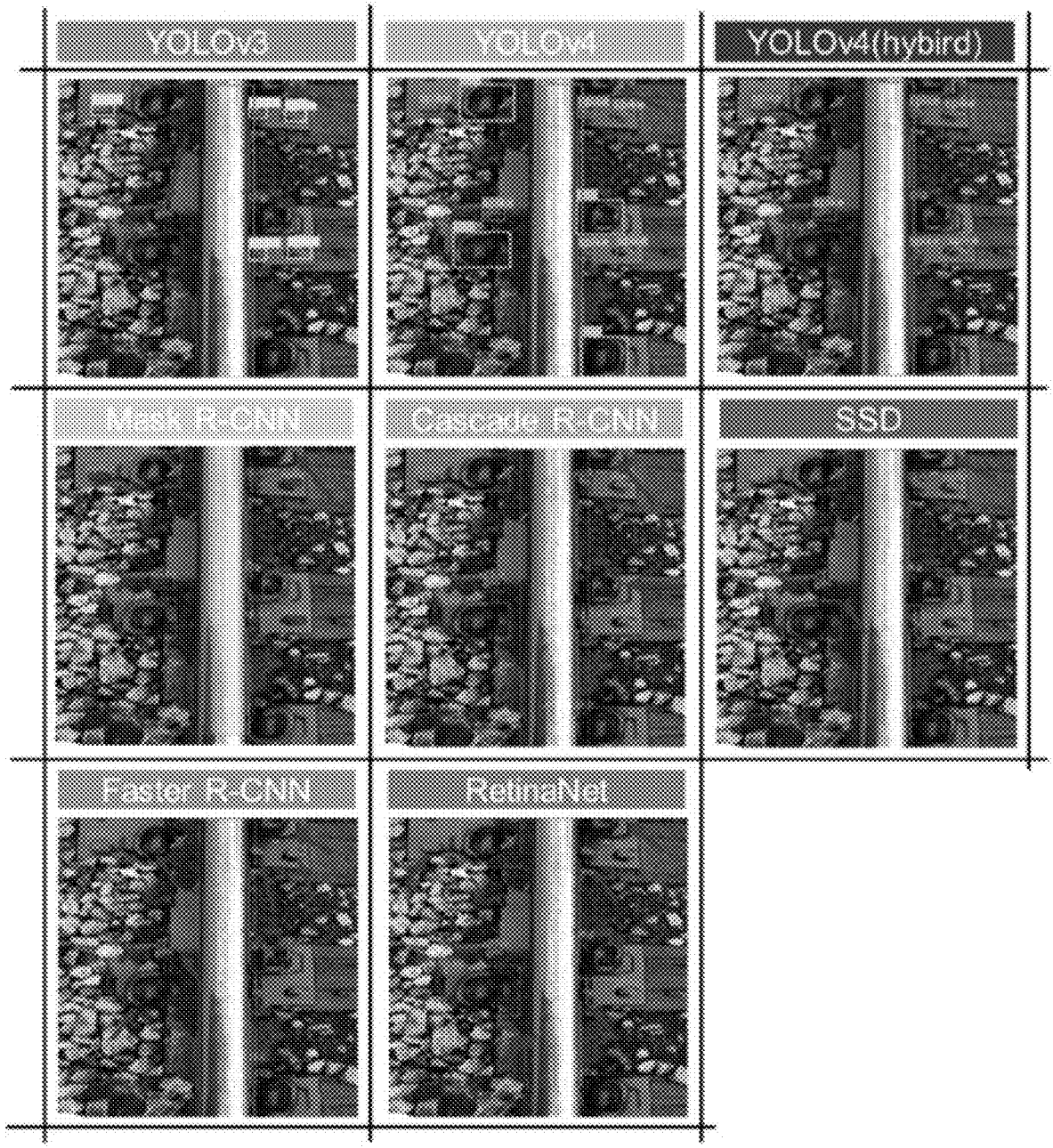

FIG. 31 shows prediction results on different models with the high and low recall values (red arrows point out the missed detection).

Figure 32:
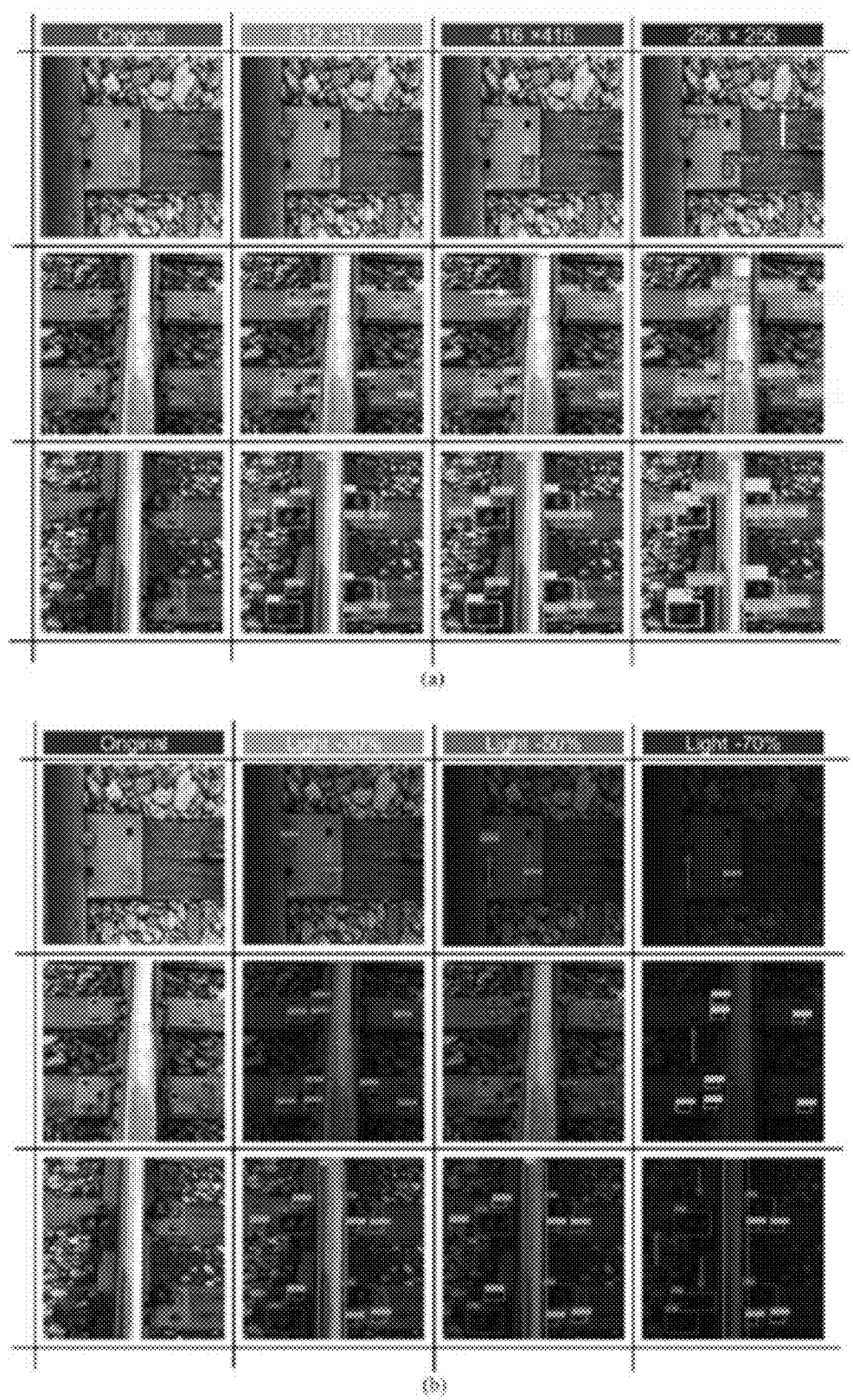

FIG. 32 shows impacts of image size and illumination on the prediction performance (a) prediction performance on the images with different sizes (b) prediction performance on the images under different illumination conditions.

Figure 33:
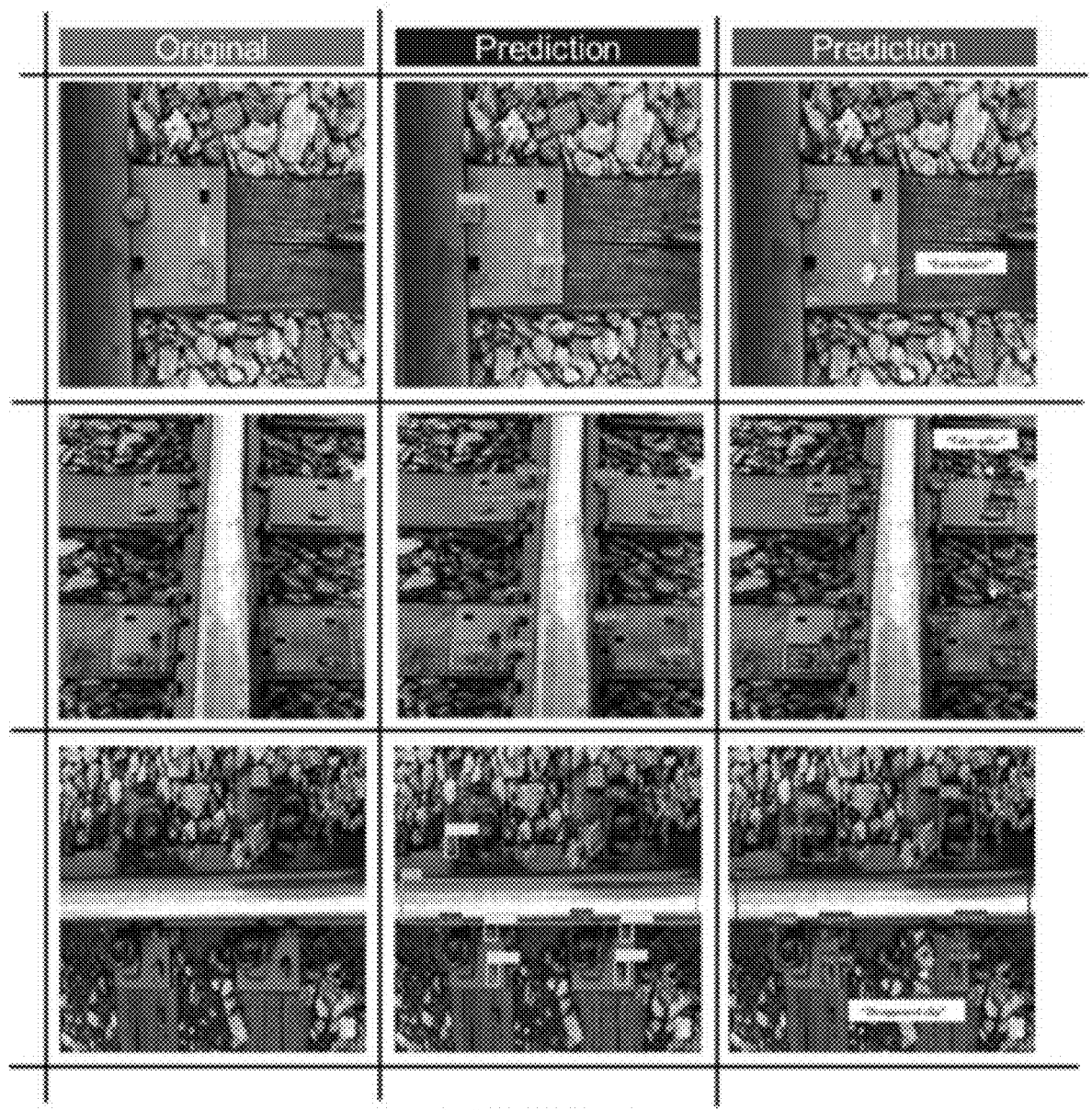

FIG. 33 shows prediction performance on "fake" railroad track components.

FIG. 34 shows Table 4, The Hyperparameters of training models.

FIG. 35 shows Table 5, Performance Indicators.

FIG. 36 shows Table 6, Influence on Different Loss Functions.

Figure 37:
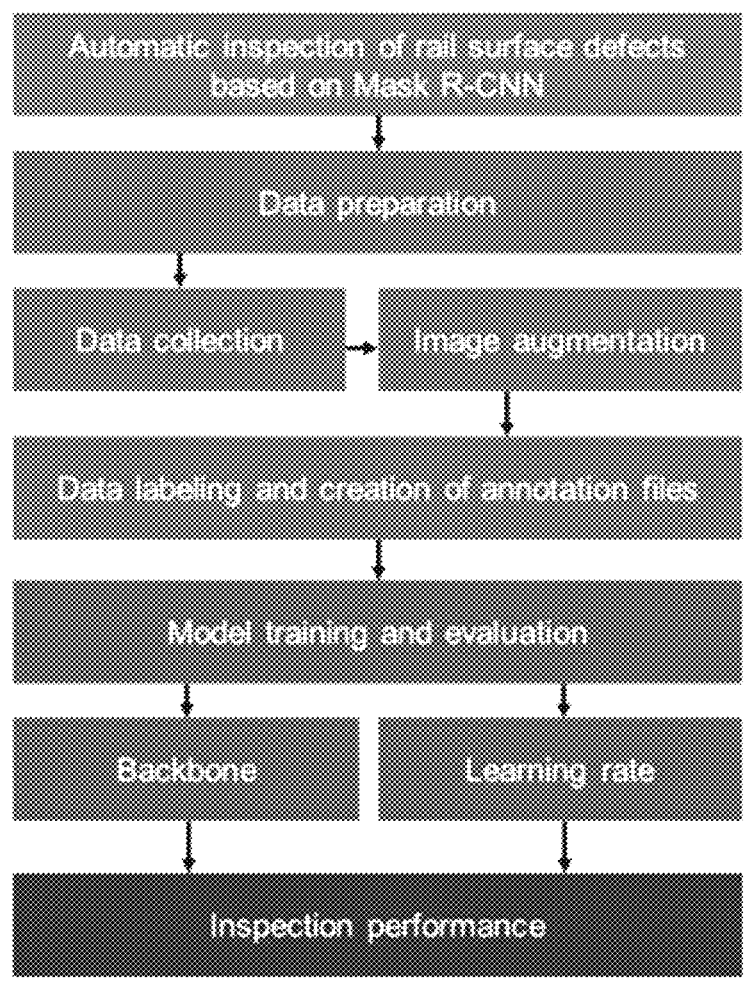

FIG. 37 shows an alternative methodology of the current disclosure.

Figure 38:
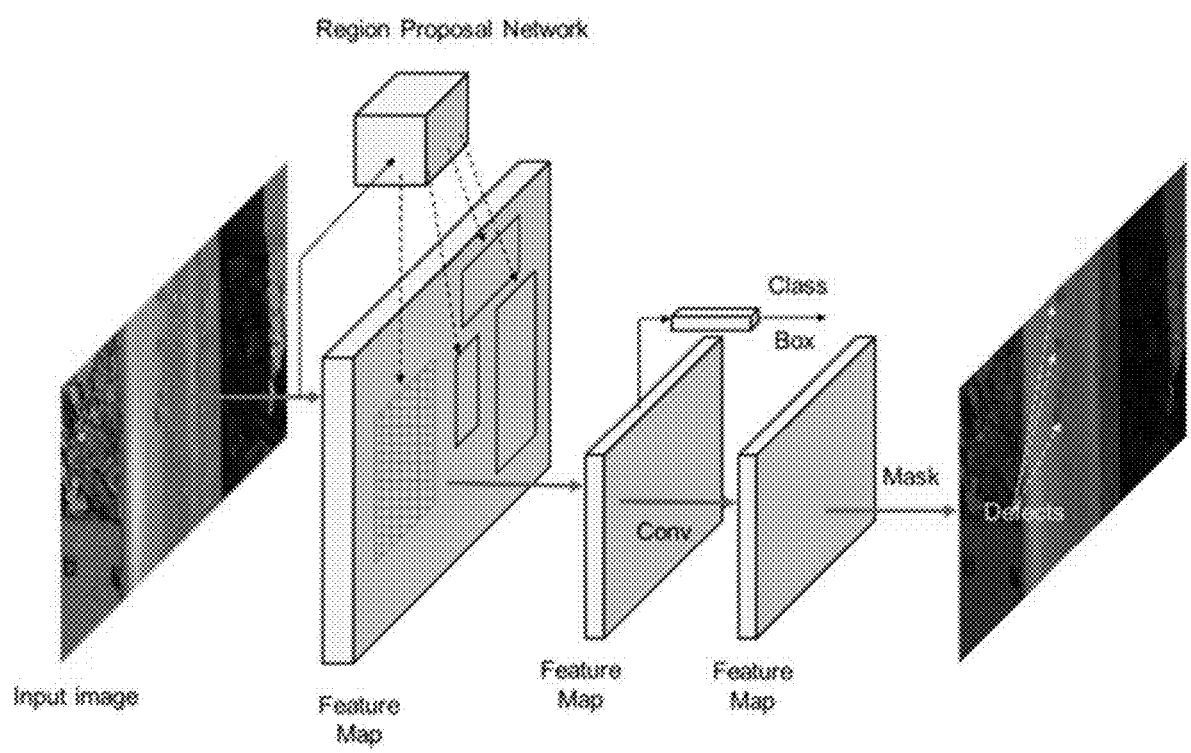

FIG. 38 shows an overview of Mask R-CNN architecture.

Figure 39:
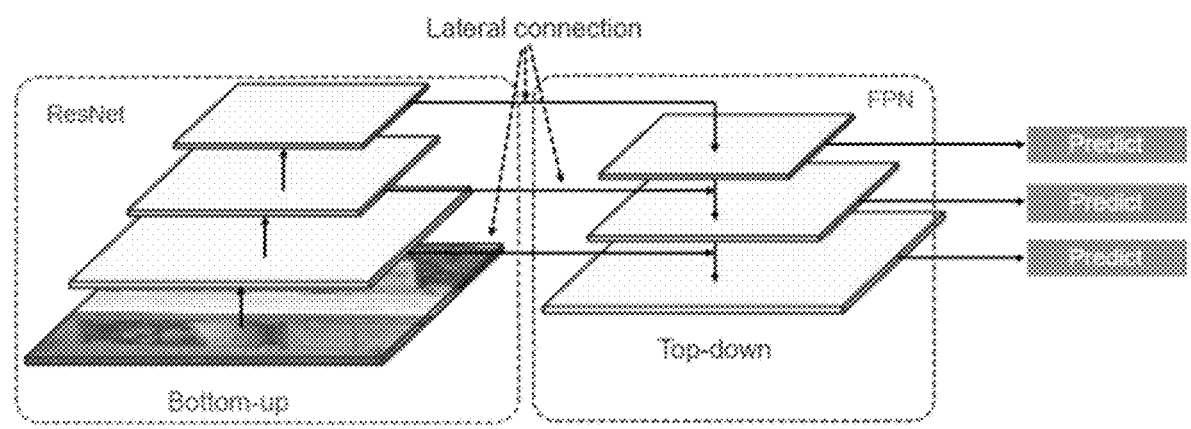

FIG. 39 shows an overview of the backbone structure of Mask R-CNN.

Figure 40:
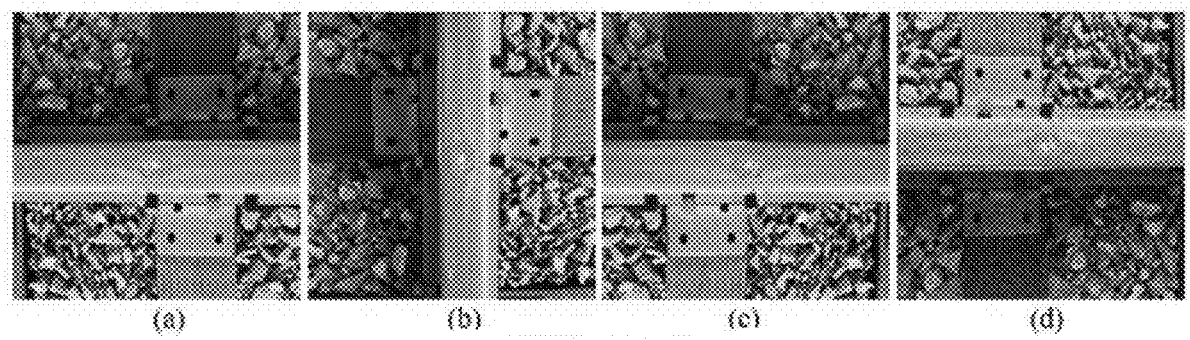

FIG. 40 shows source images and augmented images at: (a) source image; (b) 90 rotation (c) mirroring (d) 180 rotation and Gaussian noise.

Figure 41:
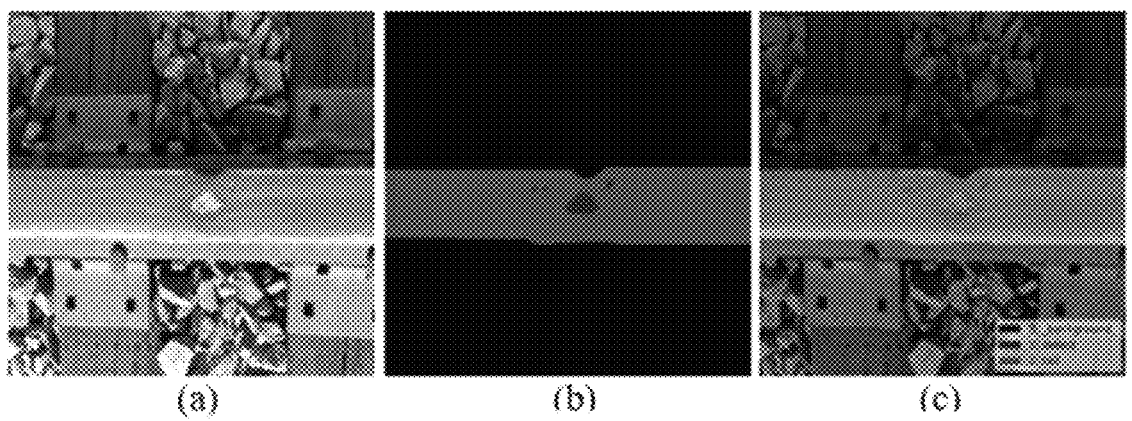
Figure 42:
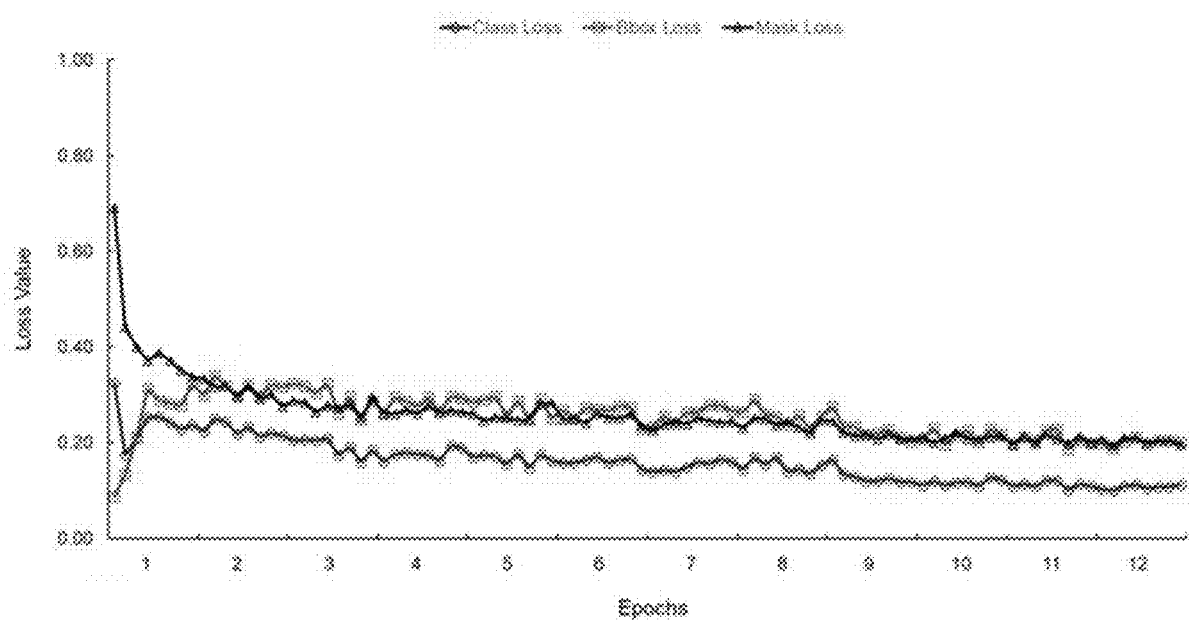

FIG. 41 shows converted results of a JSON file at: (a) source image; (b) mask file; (c) visualization of mask file FIG. 42 shows a representative training loss over epochs.

Figure 43:
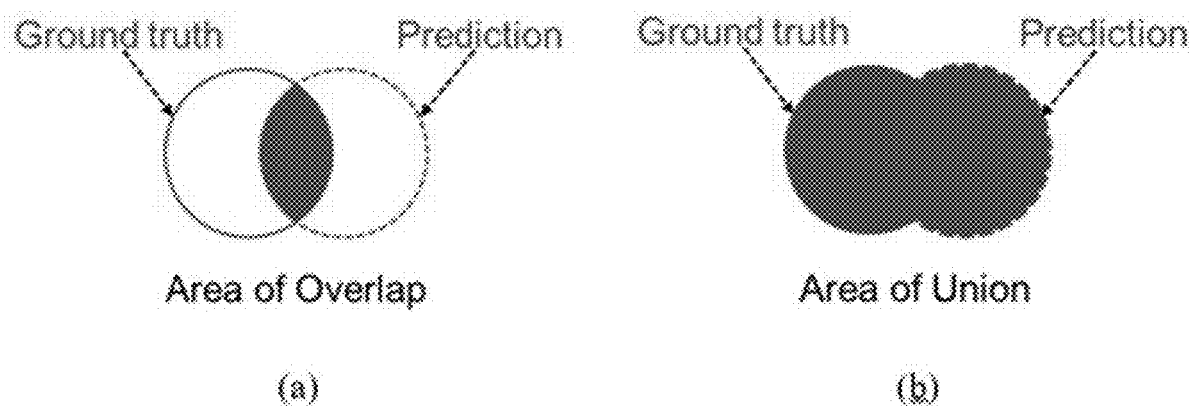

FIG. 43 shows the definition of overlap and union at: (a) area of overlap, (b) area of union.

Figure 44:
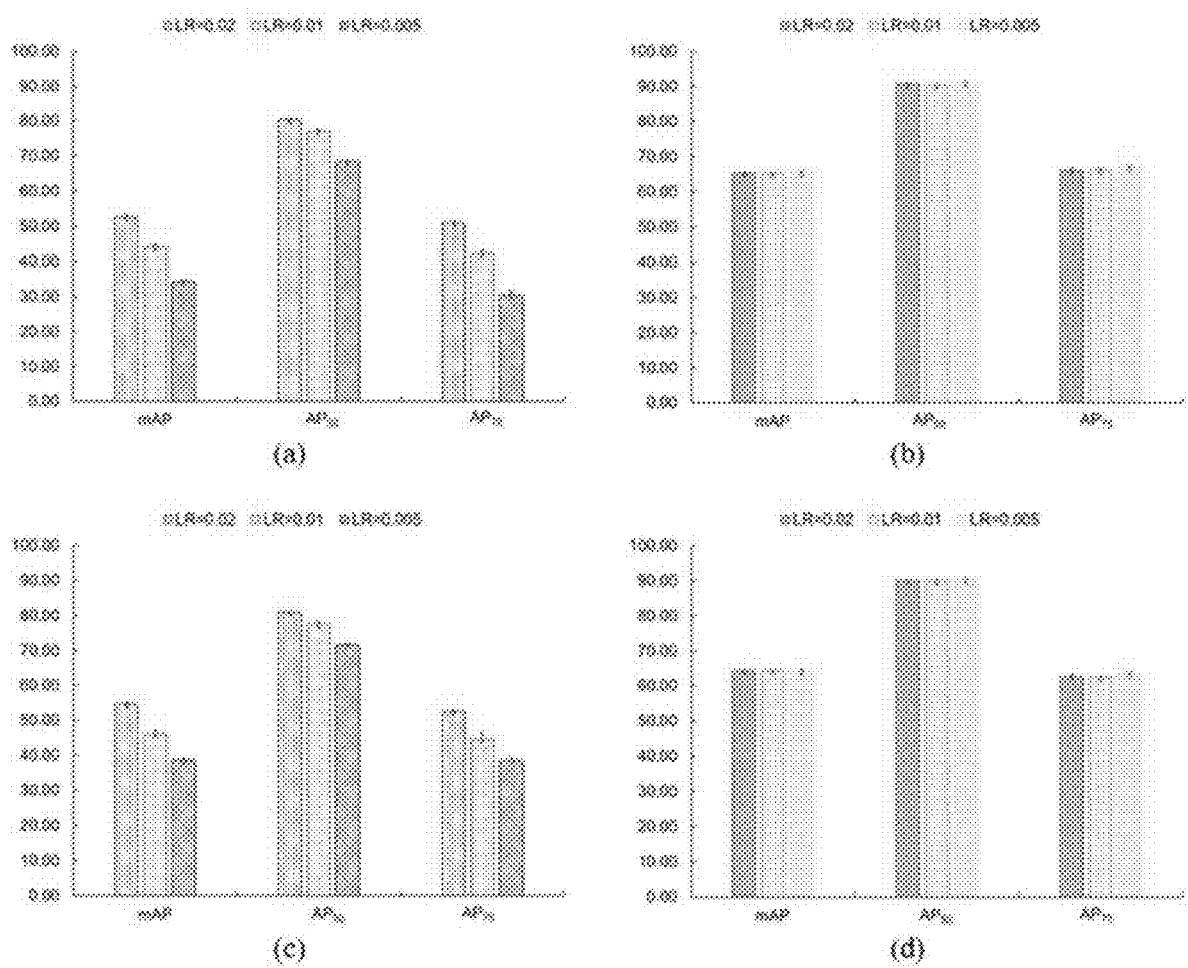

FIG. 44 shows AP results of Mask R-CNN models with different backbones and learning rates at: (a) bounding box results of ResNet101; (b) bounding box results of ResNet50; (c) mask results of ResNet101; (d) mask results of ResNet50.

Figure 45:
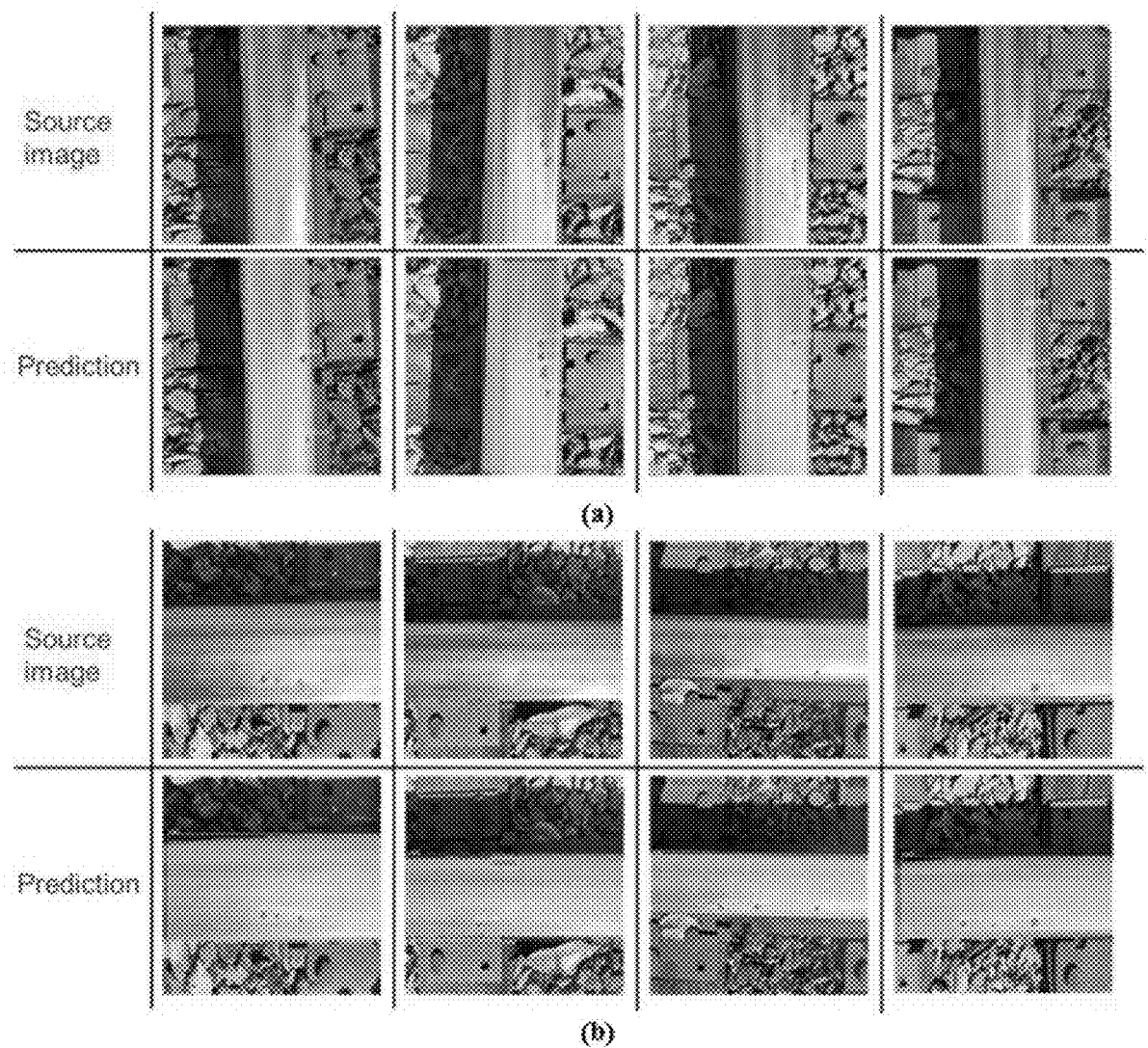

FIG. 45 shows inspection performance of Mask R-CNN on the rail surface defect with different orientations at: (a) Images with vertical orientation, (b) Images with horizontal orientation.

Figure 46:
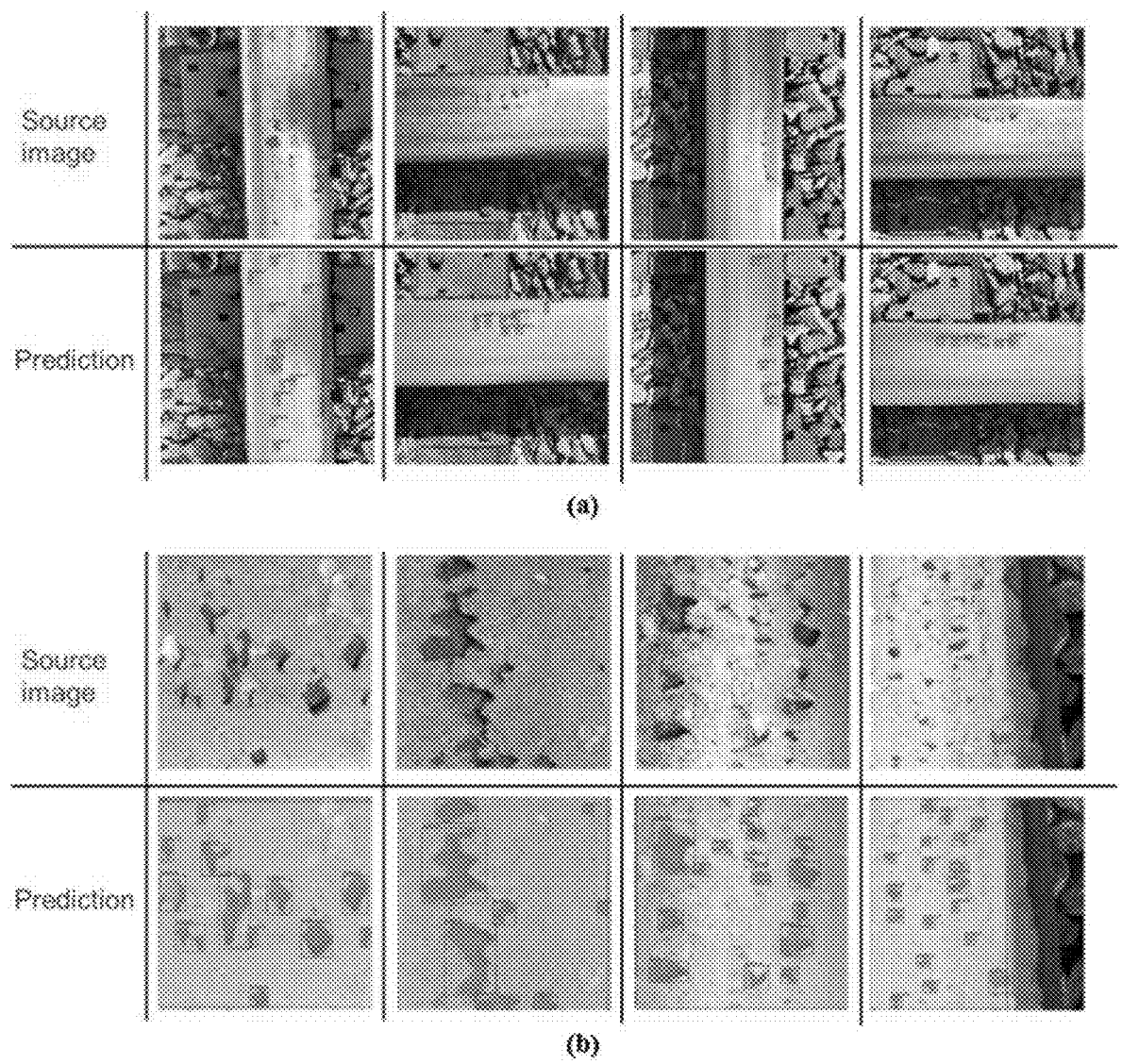

FIG. 46 shows inspection performance of Mask R-CNN on the rail surface defect with different defect severities at: (a) Images with relatively mild defect conditions, (b) Images with relatively severer defect conditions (enlarged to show details).

Figure 47:
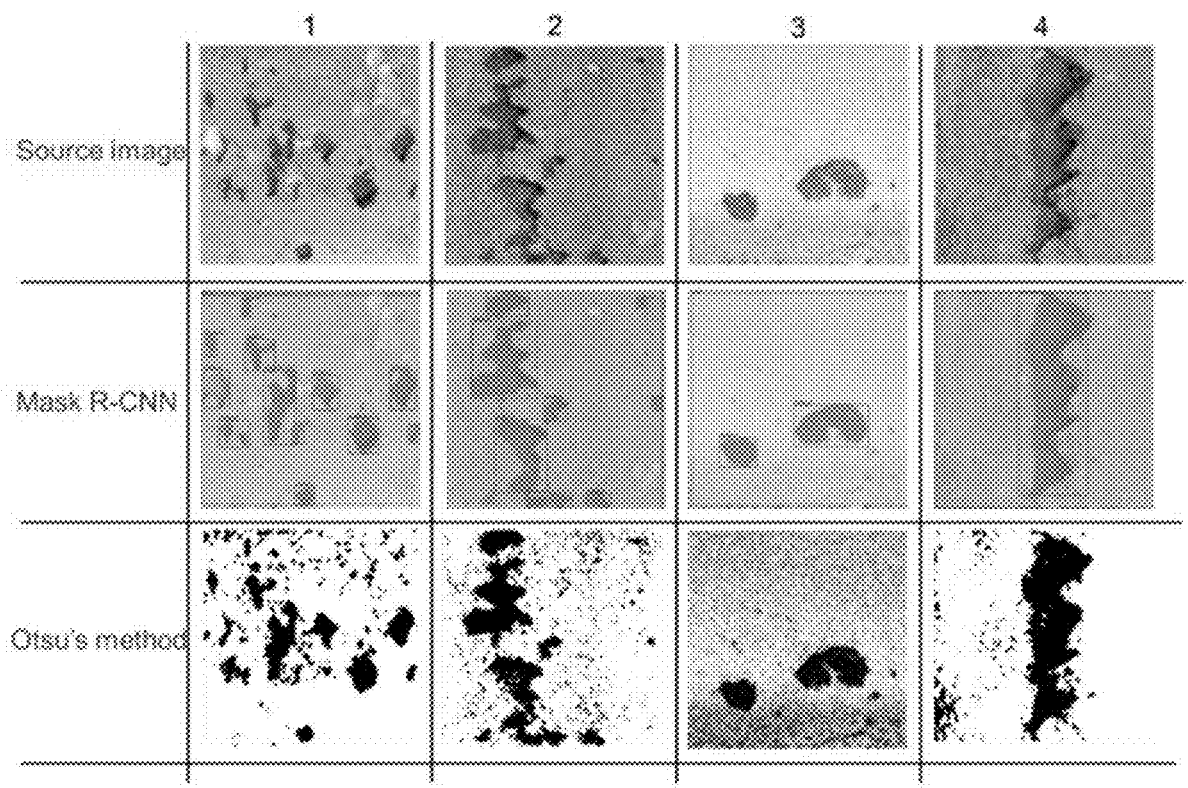

FIG. 47 shows a performance comparison between Mask R-CNN and Otsu's method

Figure 48:
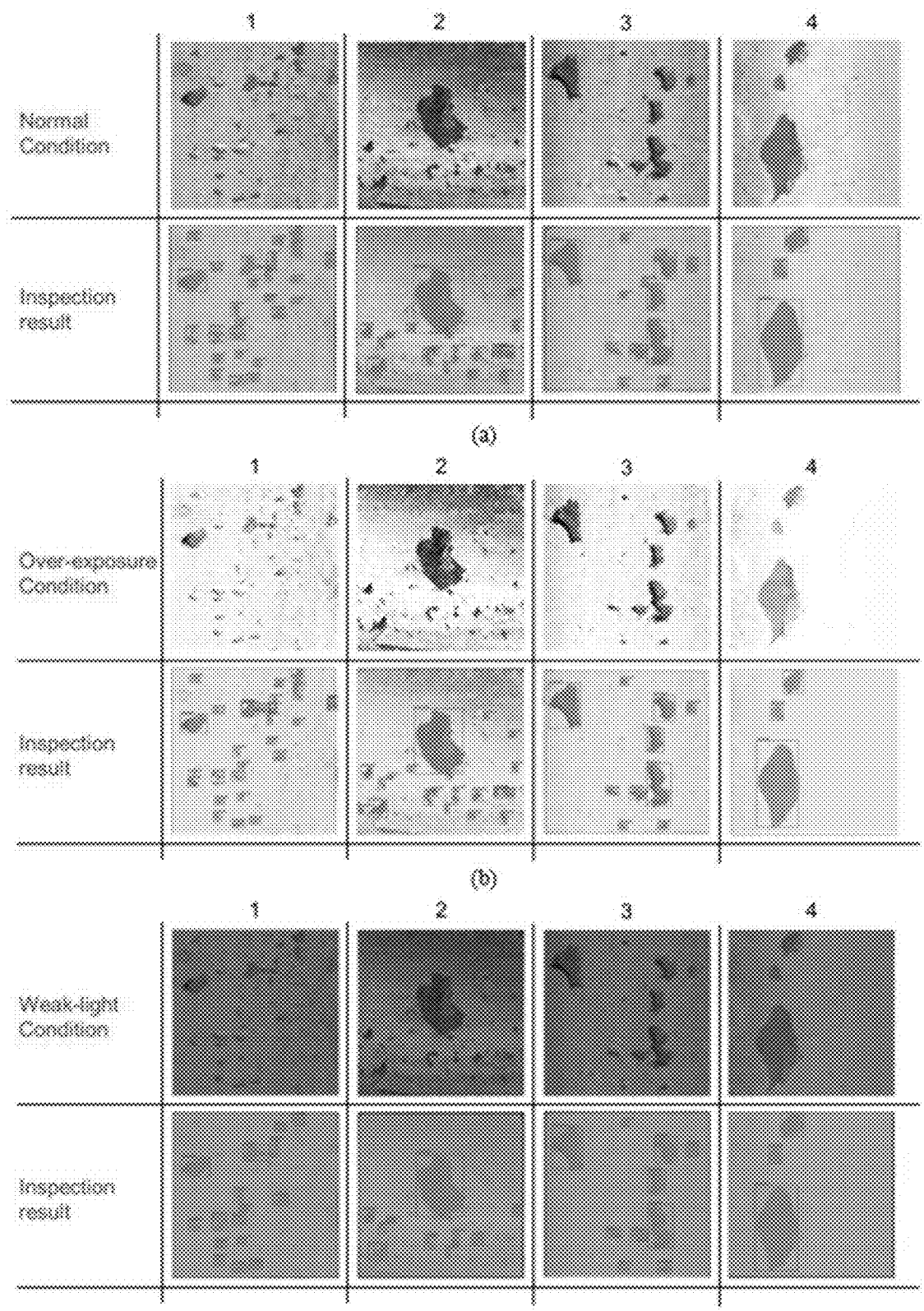

FIG. 48 shows inspection performance under different light conditions at: (a) Normal condition; (b) Over-exposure condition; and (c) Weak-light condition.

FIG. 49 shows hyperparameters of each training.

FIG. 50 shows parallel test results of Mask R-CNN models with different backbones and learning rates.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

The figures herein are for illustrative purposes only and are not necessarily drawn to scale.

DETAILED DESCRIPTION OF A PREFERRED EMBODIMENT

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used interchangeably herein, the terms "sufficient" and "effective," can refer to an amount (e.g. mass, volume, dosage, concentration, and/or time period) needed to achieve one or more desired and/or stated result(s). For example, a therapeutically effective amount refers to an amount needed to achieve one or more therapeutic effects.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

The current disclosure has developed a real-time segmentation system using a deep learning algorithm and a camera to perform real-time component detection and recognition for railroad/railway tracks. This system potentially changes railroad inspection from a two-step approach (first record inspection video and then bring the video back to analyze the video) into a one-step approach, analyzing the inspection video as it was recorded.

The current disclosure includes systems and methods and also developed a computer program, burned the program into a chip; and hooked the chip with any ordinary camera. The camera can be used to inspect railroad/railway tracks to detect and recognize missing or broken components.

It is an object of the present disclosure to provide a real-time pixel-level rail components detection system to inspect railroad/railway track quickly and accurately. A real-time pixel level detection system with an improved real-time instance segmentation model that leverages the speed of real-time object detection and high accuracy of two-stage instance segmentation is provided. A backbone with more granular levels and receptive fields was adopted and implemented in the model. Compared with other state-of-the-art models in instance segmentation and real-time instance segmentation, this model can achieve 61.5 bbox mAP, and 59.1 mask mAP in its customized dataset, which are higher than other models. Meanwhile, the current disclosure can achieve a real-time speed of 30 FPS in a high-resolution video (1080*1092) on a single GPU. The fast processing speeds up inspection videos into real-time useful information as the videos are being recorded to assist track maintenance decisions.

Proposed Neural Network Architecture

For the current disclosure, YOLACT-Res2Net-50 and YOLACT-Res2Net-101, which implemented with a new bottleneck, are proposed to improve the accuracy of bounding box detection and instance segmentation performance of the original YOLACT model. The main structure of the proposed models is the same as the YOLACT model, except the backbone and the parameters in the Protonet. The proposed model structure can be seen in FIG. 2. Specifically, the structure includes backbone (feature extractor), feature pyramid network (FPN), prediction head (generating anchors), and Protonet (predicting k prototype masks). In general, instance segmentation is much harder than object detection because it heavily relies on feature localization to produce masks, resulting in low speed and difficulties in field applications. Nevertheless, different from the general idea of predicting anchors first and then predicting masks, the YOLACT model proposes to separate the instance segmentation into two parallel tasks. One is to generate prototype masks using the Protonet (a fully convolutional network) over the entire image, and the other one is to predict anchors and mask coefficients by using prediction head. Then, the two tasks will be assembled by a linear combination, and the output will be generated after a threshold. In this way, the expensive repooling process in the traditional approach like Mask R-CNN was reduced, making instance segmentation close to real-time, and meanwhile, the mask quality was also improved.

Backbone Structure

In object detection, the backbone acts as a basic feature extractor, which takes images or videos as inputs and then outputs feature maps of the corresponding inputs (Jiao et al., 2019). According to specific detection needs such as accuracy and efficiencies, different backbones will be adopted. For high accuracy, typically a deeper and densely connected backbone like ResNet, DenseNet, etc. is employed. Considering speed and efficiency, lightweight backbones like MobileNet, EfficientNet, etc. would be preferred. In this disclosure, to improve the detection performance on object and mask, Res2Net bottleneck with stronger multi-scale representation ability was implemented in our proposed models, YOLACT-Res2Net-50 and YOLACT-Res2Net-101. More details are presented in the following sections.

ResNet-50 & ResNet-101

Figure 3:
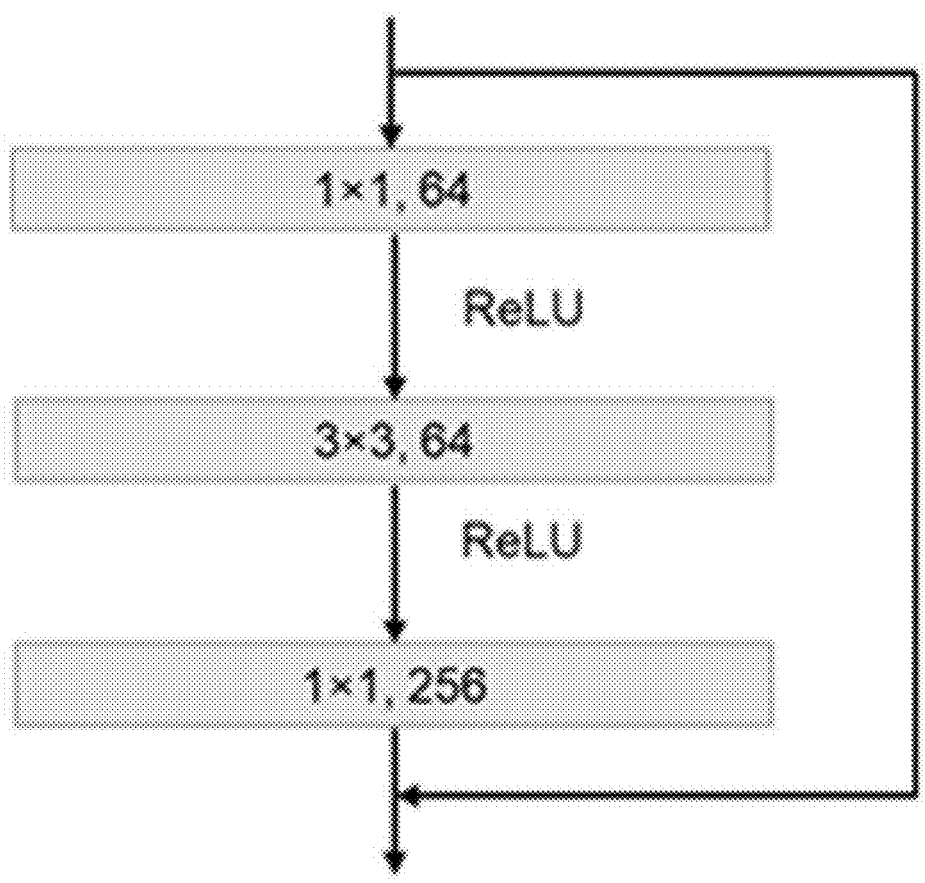
FIG. 3 shows a structure of a bottleneck design.

ResNet-50 and ResNet-101 proposed by (He et al., 2016), were adopted in the original YOLACT models. As the name indicated, ResNet-50 and ResNet-101 include 50 layers and 101 layers, respectively. To reduce the computation parameters, the bottleneck structure was introduced in ResNet. FIG. 3 shows the bottleneck design for ResNet-50 and ResNet-101. Through the bottleneck structure, there are significant parameter reductions. As shown in FIG. 3, with the bottleneck design, the first 1×1 convolution reduces a 256-dimension channel to a 64-dimension channel, and is recovered by a 1×1 convolution at the end. The total number of computation parameters is 1×1×256×64+3×3×64×64+1× 1×64×256=69,632. To get the same effect without using bottleneck design, there will be 2 convolutions with 3×3× 256. The total number of parameters will be 3×3×256×256× 2=1,179,648, 17 times higher than the optimized structure using the bottleneck design.

Figure 4:
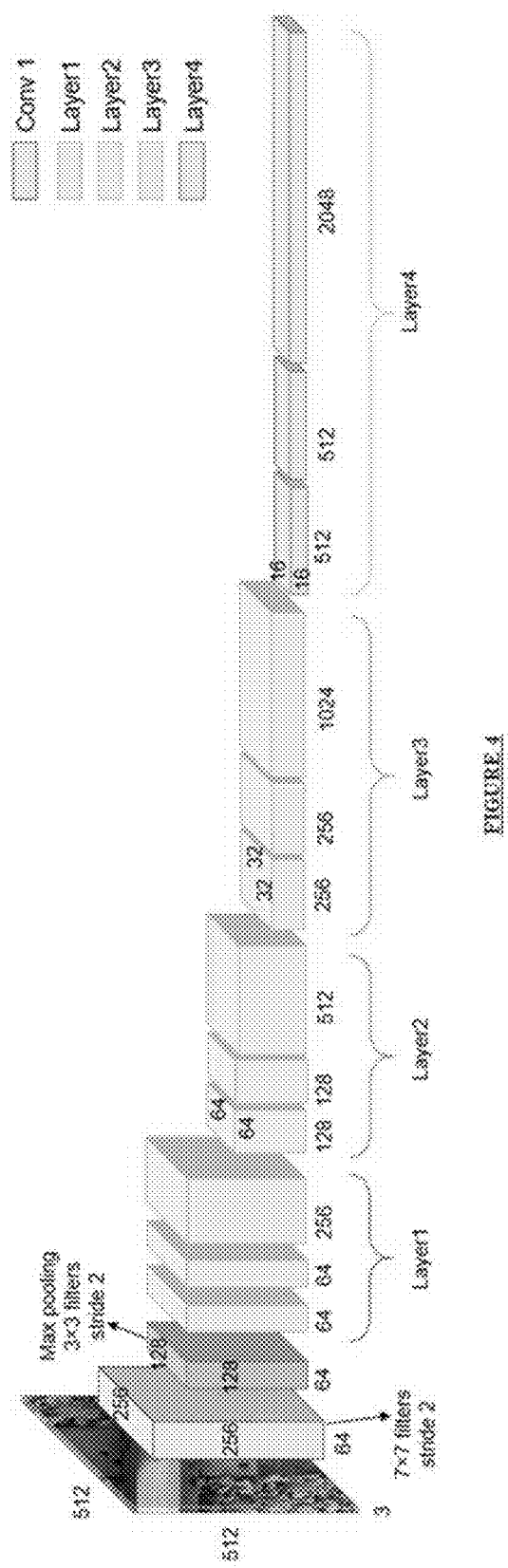
FIG. 4 shows a main structure of ResNet-50.

FIG. 4 shows the main structure of ResNet-50. It consists of five stages, which are Conv1, Layer 1, Layer2, Layer3, and Layer4, respectively, corresponding to C1 to C5 in the proposed model in this disclosure shown in FIG. 2. Due to the space limitation, C1 and C2 were not plotted. From Layer 1 to Layer4, each block contains three convolutional layers. Correspondingly, there are 3, 4, 6, and 3 stacked blocks in ResNet-50. Similarly, in ResNet-101, there are 3, 4, 23, and 3 stacked blocks. Furthermore, after Conv1, Layer 1, Layer2, Lay3, and Layer4, the input image size becomes ½, ¼, ⅛, 1/16, and 1/32 of the original image input size, respectively.

Res2Net-50 & Res2Net-101

Figure 5:
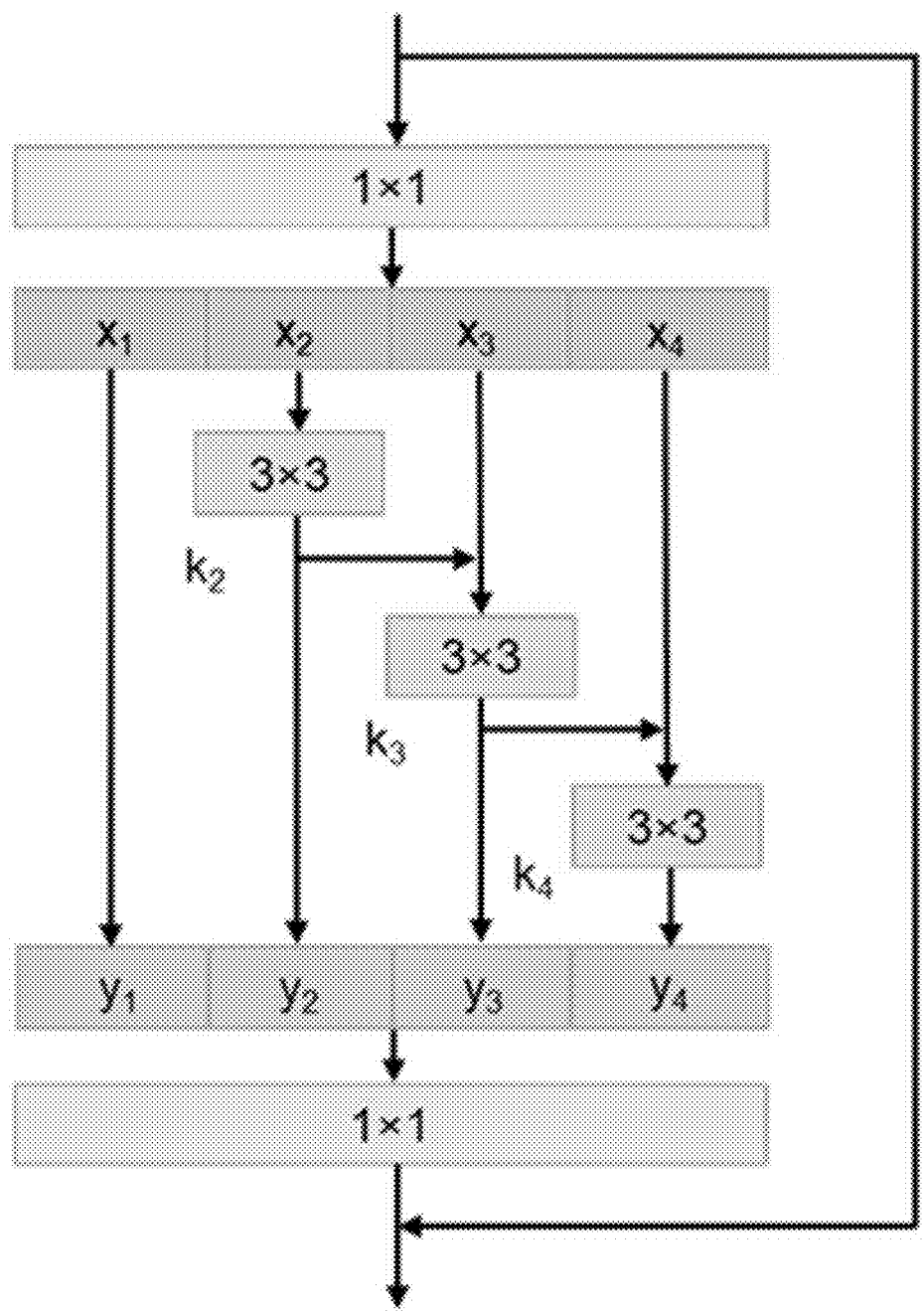
FIG. 5 shows structure of a Res2Net bottleneck (scale=4).

Res2Net is a new multi-scale bottleneck architecture proposed by Gao et al (2019). It can be integrated into the state-of-the-art backbone architectures, aiming to improve the multi-scale representation ability at a granular level. FIG. 5 shows the architecture of the Res2Net bottleneck. In this bottleneck structure, the original 3×3 filter of w channels shown in FIG. 3 were replaced with a set of smaller filter groups. Each group has w channels and meanwhile, n=w×s, and s is the scale. As shown in FIG. 5, following the 1×1 convolution, the feature maps were evenly split into s subsets. Note $x_i$ is one of the subsets which has 1/s number of channels and the same spatial size with inputs. For each feature subset $x_i$ (i≥2), there is a 3×3 convolution corresponding to it, namely as $K_i$ ( ). While for $x_1$ and $y_1=x_1$, there is no convolution. Each output feature map, $y_i$, is the output of $K_i$ ( ). The calculations are summarized in Equation (1). In our proposed model of YOLACT-Res2Net-50 and YOLACT-Res2Net-101, according to the previous study (Gao et al., 2019) and the provided pre-trained weights, we chose w=26 and s=4 for our model training and test.

$$y_i = \begin{cases} x_i & i = 1; \\ K_i(x_i) & i = 2; \\ K_i(x_i + y_{i-1}) & 2 < i \leq s. \end{cases} \quad (1)$$

where $y_i$ is the output feature map, $x_i$ is the input feature map, $K_i$ is the convolution corresponding to $x_i$.

To better show the improved network architecture, Table 1, see FIG. 15, presents the detailed parameters of the backbone of the proposed YOLACT-Res2Net-50 in this disclosure. Similar to ResNet-50 shown in FIG. 4, there are five stages: Conv1, Layer 1, Layer2, Layer3, and Layer4. The main difference is the bottleneck structures shown in FIG. 3 and FIG. 5. It also can be indicated in the filter size shown in Table 1, see FIG. 15. The original filters were changed from [1×1, 3×3, 1×1] to [1×1, 3×3, 3×3, 3×3, 1×1] due to space and width in the proposed Res2Net bottleneck. The reason there are three convolutional kernels of 3×3 is the $x_1$ does not need the convolution process. Meanwhile, from $x_2$ to $x_4$, they have the convolutional processes with each kernel. In this way, as the literature mentioned (Gao et al., 2019), the range of receptive fields for each network layer will increase, and therefore, the model will have better detection performance. Besides, it is worth noting that the introduced feature sets cause changes of the output channels in the filters.

FPN Structure

Figure 1:
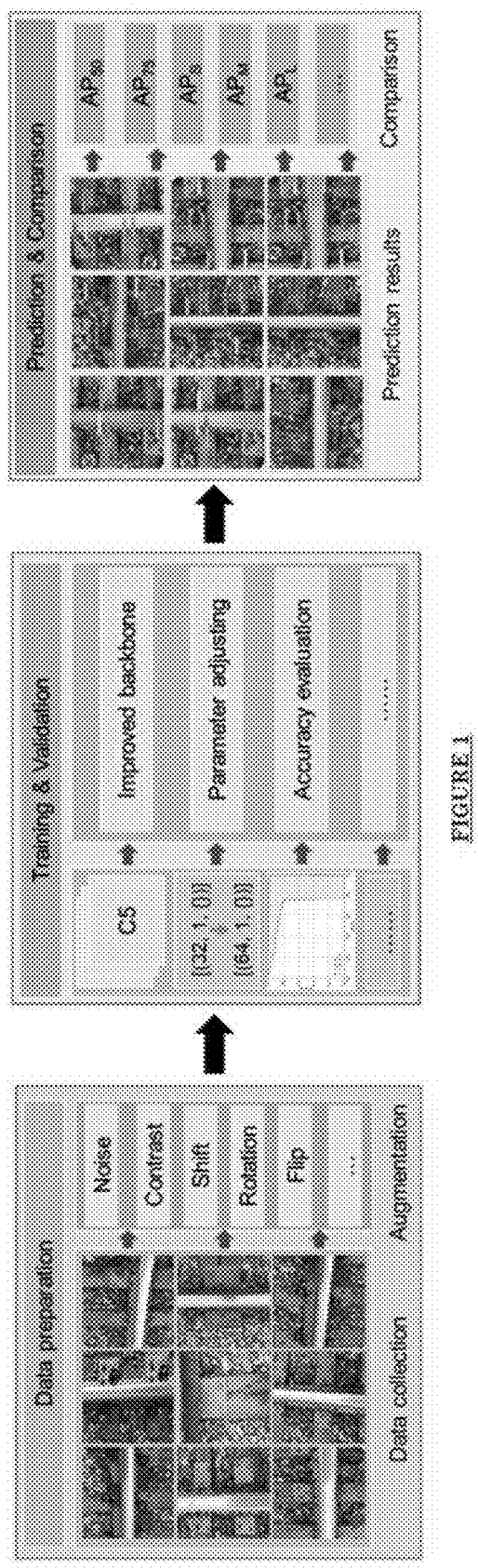
FIG. 1 shows a progressive view of the current disclosure.

To detect objects on multiple scales, Feature Pyramid Network (FPN) (Lin, Dollar, et al., 2017) has been widely used in many object detection and segmentation models. Typically, the composition of an FPN includes a bottom-up pathway, a top-down pathway, and lateral connections. The bottom-up pathway is the feed-forward computation for the backbone to extract features in the inputs. The assembly of convolution layers with the same output feature size was denoted as the stage in the FPN. Specifically, the backbone, as shown in FIG. 1, {C3, C4, C5} is the output of the last residual blocks in the stage of Layer2, Layer3, and Layer4, respectively. It is worth noting that as layers go up, the spatial resolution decreases. In terms of the top-down pathway, it constructs the high-resolution layers from higher layers in the pyramid which are semantically strong, but not precise. Hence, the later connections are then used to merge the features from the bottom-up pathway and top-down pathway for a better prediction on the object locations. The original set of feature output in the FPN is {P3, P4, P5}, corresponding to {C3, C4, C5}. In the YOLACT type models, to increase the detection performance on the small objects, the P5 was upsampled to P6 and P7 with one-fourth dimensions; meanwhile, the P2 was omitted.

Prototype Generation

Figure 6:
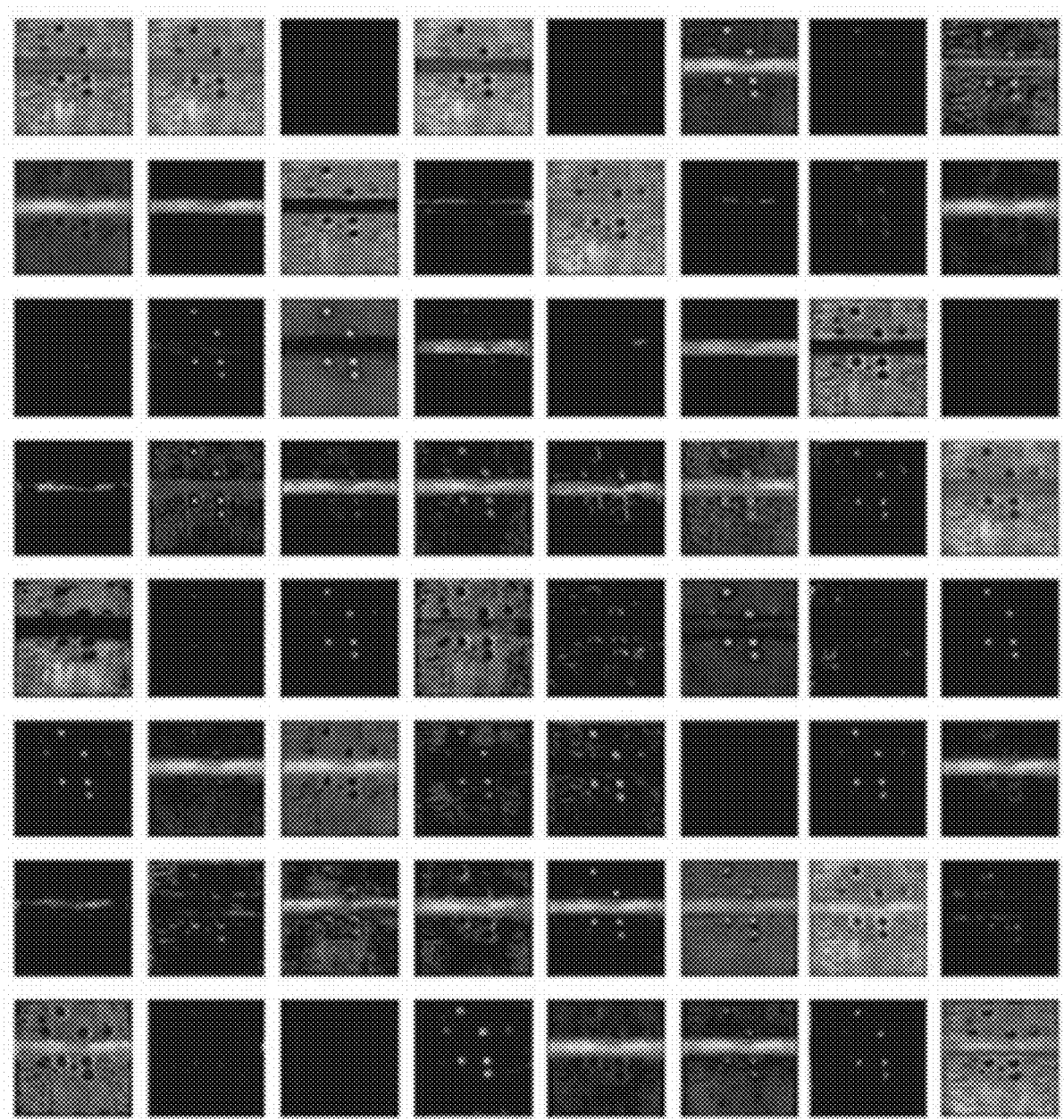
FIG. 6 shows a prototype image generation.

As mentioned previously, to improve the operation speed, instance segmentation was achieved by two parallel tasks in the YOLACT type models. One of the parallel tasks, generating prototype masks, was completed by Protonet. It is worth noting Protonet is a fully connected network (FCN), which is attached to the P3 layer in the FPN. The architecture of Protonet can be seen in FIG. 2. In this branch, k Protonet masks without loss computations were proposed for the entire image. To improve the instance segmentation performance, we increased the k from 32 to 64 in our YOLOACT-Res2Net-50 and YOLACT-Res2Net-101 model. The nonlinear activation function, ReLU, was used to keep the outputs from Protonet unbounded and generate more interpretable prototypes. It also needs to mention that the number of prototype masks is independent of the number of categories, thus, it can lead to distributed representation for the generated prototype. The prototype images generated by the developed YOLACT-Res2Net-50 can be seen in FIG. 6. Note that high-resolution prototypes are beneficial for mask quality and the detection performance on small objects.

Mask Coefficient and Assembly

Figure 2:
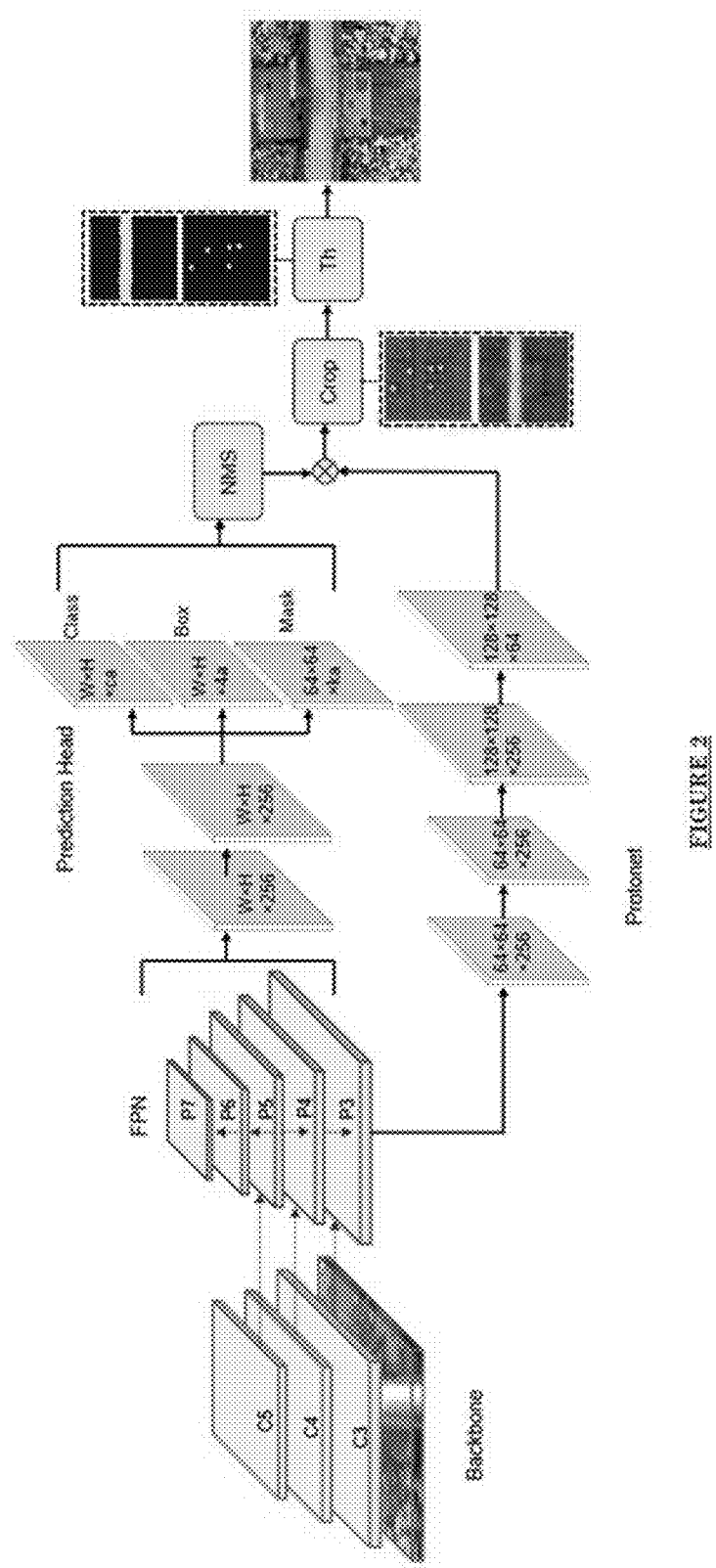
FIG. 2 shows a main structure of a proposed model of the current disclosure.

The other parallel task of instance segmentation is to generate mask coefficients in anchor-based object detectors (prediction head). Unlike the RetinaNet, the YOLACT type models used a shallower predictor and adopted a mask coefficient branch. As FIG. 2 shows, in the prediction head, there are 4+c+k coefficients per anchor. To subtract the generated prototypes, the tan h activation function for non-linearity was applied to the k mask coefficients. The masks were generated by assembling the Protonet output and mask coefficients with a linear combination. A sigmoid nonlinearity then was applied to produce the final masks. The mentioned steps can be performed by a single matrix multiplication and it can be shown in the following Equation (2). During the training and evaluation process, the final masks were cropped with the ground truth bounding box and predicted bounding box, respectively.

$$M = \sigma(PC^T) \quad (2)$$

where P is an h×w×k matrix of prototype masks and C is a n×k matrix of mask coefficients for n instances surviving NMS and score thresholding.

Loss Functions

Three loss functions were applied during the training processes in this disclosure. They are mask loss, classification loss, and box regression loss, respectively. Specifically, the mask loss applied pixel-wise binary cross-entropy (BCE) loss function to calculate the loss between the assembled Masks M and the ground truth masks $M_{gt}$. Mask loss can be expressed in Equation (3). For classification loss and box regression loss, the same loss functions used in the SSD were used shown in Equation (4) and (5). It is worth noting that classification loss here equals to the confidence loss defined in the SSD, and the box regression loss equals to localization loss in the SSD.

$$L_{mask} = BCE(M, M_{gt}) \quad (3)$$

where M is the assembled masks, $M_{gt}$ is the ground truth masks $$\hat{g}_j^w = \log\left(\frac{g_j^w}{d_i^w}\right) \quad \hat{g}_j^h = \log\left(\frac{g_j^h}{d_i^h}\right) \quad (4)$$

$$\hat{g}_j^{cx} = (g_j^{cx} - d_i^{cx})/d_i^w \quad \hat{g}_j^{cy} = (g_j^{cy} - d_i^{cy})/d_i^h$$

$$L_{loc}(x, l, g) = \sum_{i \in Pos}^{N} \sum_{m \in \{cx, cy, w, h\}} x_{ij}^k \text{smooth}_{L1}(l_i^m - \hat{g}_j^m)$$

where l is the predicted box, g is the ground truth, ($c_x$, $c_y$), w, and h is the center, width, and the height of the default bounding box (d). N is the number of matched defaulted boxes. If N=0, then the loss is 0. $x_{ij}^k = \{1,0\}$ to be an indicator of matching the i-th default bounding box and j-th ground truth bounding box of category k.

$$L_{conf}(x, c) = -\sum_{i \in pos}^{N} x_{ij}^p \log(\hat{c}_i^p) - \sum_{i \in Neg} \log(\hat{c}_i^0) \text{ where } \hat{c}_i^p = \frac{\exp(c_i^p)}{\sum_p \exp(c_i^p)} \quad (5)$$

where c is the softmax loss over multiple classes confidences.

Experiments and Results

To quantify and validate our proposed models for real-time instance segmentation, five networks including (1) YOLACT-ResNet-50, (2) YOLACT-ResNet-101, (3) YOLACT-Res2Net-50 (proposed), (4) YOLACT-Res2Net-101(proposed), and (5) Mask R-CNN were trained and evaluated. For models (1)-(4), we trained them with the YOLACT model package. For the model (5), we trained it on the MMDetection (Chen et al., 2019), which is an open-source object detection toolbox for evaluation on different models. Although the training process and hyperparameters varied a little, the detection results were evaluated on the same scale by using the MS COCO evaluation metric (Lin et al., 2014). Because the training procedures were different, and it was impractical to draw the same training and validation curves with different scripts, the training of models (1)-(4) will be discussed in details for better comparison, while some descriptions will be provided on the model (5) in the following sections.

Data Set Preparation

Figure 7:
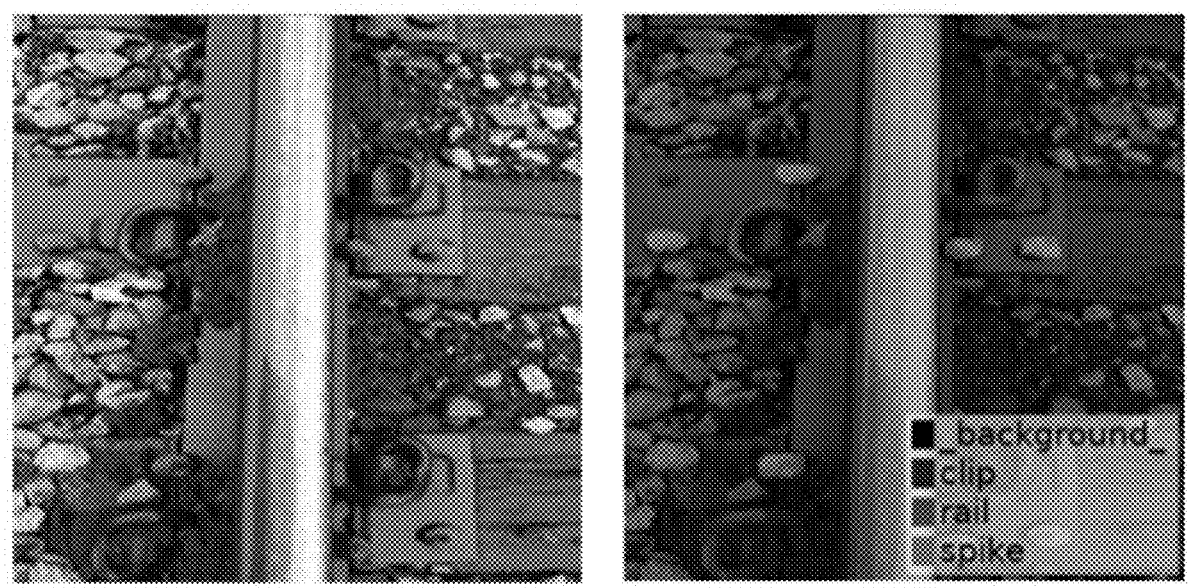
FIG. 7 shows an example of original jpg image and label result (a) Ground truth (b) instance label visualization.

To train and validate the proposed models, 1,250 images with the resolution of 512×512 were extracted from smartphone videos taken by the authors. Three types of rail components, including rail, spike, and clip were included in the image database. To prevent overfitting, the training images were processed with image augmentation, including noise, flip, contrast, rotation, and flip, etc. A popular labeling tool, labelme (Wada, 2016) was employed to generate the annotation files. The output JSON files were converted to COCO format for training, validation, and evaluation. FIG. 7 shows the ground truth and the labeling mask. It should be noted that the background is category 0. The rail, clip, and spike represent category 1, category 2, and category 3, respectively. The category IDs should correctly correspond to the class names. Otherwise, the detection results will have wrong labels. Following the general ratio of the cross-validation principle, 80% of images (1000) were used for training and validation, and 20% of images (250) were used for test.

Training and Validation

Transfer learning is a convenient timesaving method to train deep learning models. Since multiple models need to be trained and evaluated, transfer learning other than training individual models from scratches was employed in the experiments. Pre-trained weights for the backbones of the proposed models (YOLACT-Res2Net-50 & YOLACT-Res2Net-101) and original models (YOLACT-ResNet-50 & YOLACT-ResNet-101) were implemented in the model initialization stage. Because the new backbones were implemented into the original YOLACT model, the dictionary of key and value in the pre-trained weight file needs to be updated with the proposed network structure. To avoid program running errors and make sure the training was successfully started, new functions were written to filter the unused layers (such as some batch normalization layers) in pre-trained weight files and make our proposed architecture correspond to the original settings. The net architecture of the proposed backbones can be seen in FIG. 2.

Generally, the training process aims to minimize the overall loss by optimizing the model parameters (Wang & Cheng, 2020). In other words, the lower the overall loss is, the better the model is. In this disclosure, the popular stochastic gradient descent (SGD) optimizer was applied to train our testing models. Table 2, see FIG. 16, shows the training hyperparameters. The training iteration was 80 k and the initial learning rate was $10^{-3}$. It is worth noting that the learning rate is a vital hyperparameter in model performance. A small value will result in a long training process, and a large value will lead to hasty and unstable training. In this disclosure, the initial learning rate was divided by 10 at iterations 20 k, 60 k, and 70 k by using a weight decay of $5 \times 10^{-4}$ and a momentum of 0.9.

Figure 9:
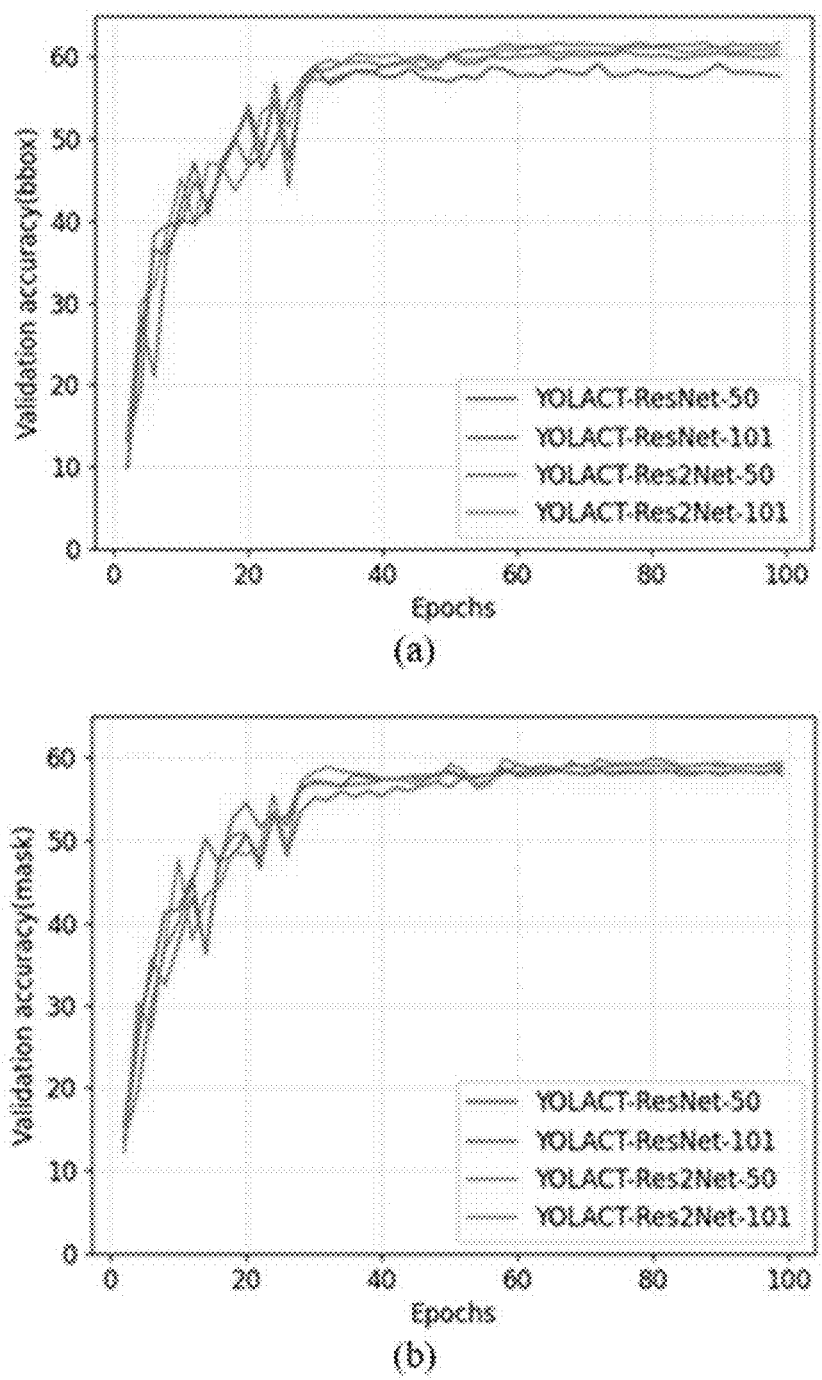
FIG. 9 shows validation accuracy of original YOLACT models and proposed YOLACT-Res2Net-50 and YOLACT-Res2Net-101.

To configure and accelerate the model training, the Pytorch library developed by Facebook and the packages of CUDA 9.0 with Cudnn 7.0.5 developed by NVIDIA were included in this disclosure. All the training processes were accomplished in Google Cloud. The server system is Ubuntu 16.04 with Inter Broadwell CPU. The GPU is NVIDIA K80 with driver 396.44. The training time for each model takes around 2 to 3.5 hours. FIGS. 8 and 9 show the training loss and validation accuracy of test models. In FIG. 8, YOLACT-Res2Net-101 has the largest training loss in the initial stage, 32.07. Meanwhile, the training loss values of other models range from 22.66 to 27.32. After 20,000 iterations (25 epochs), the training loss plots of all models become stable. The final training loss value for different models is around 2.9. FIG. 9 (a) clearly shows the proposed models outperform the original model in terms of the validation accuracy of the bounding box. YOLACT-ResNet-50 has the lowest validation accuracy value, which is 57.65, while YOLACT-Res2Net-50 (proposed model) has the highest validation accuracy value, which is 61.65. In FIG. 9 at (b), the validation accuracies of the mask are close among these four models. Still, YOLACT-Res2Net-101(proposed model) has the highest value of 59.32 and YOLACT-ResNet-50 has the lowest value of 57.95.

Detection Performance Evaluation

Figure 10:
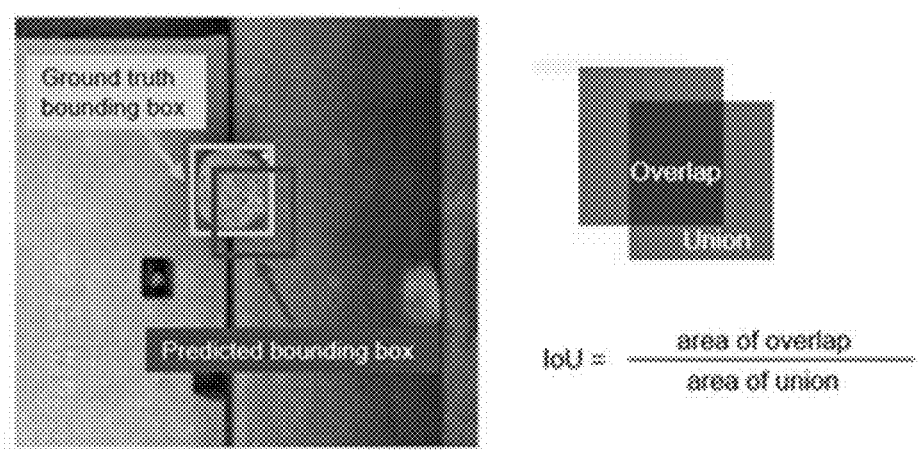
FIG. 10 illustrates the definition of IoU.

In this disclosure, COCO mAP (mean average precision), a common metric in measuring the accuracy of object detectors, was applied to evaluate the detection performance of different models. Before analyzing the mAP results, its important components of intersection over union (IoU) and average precision (AP) need to be explained first. IoU measures the overlap between the predicted boundary and the ground truth. FIG. 10 shows the definition of IoU. Generally, the threshold of IoU is 0.5 to determine if the prediction is a true positive or a false positive. AP is precision averaged across all values of recall between 0 and 1, and it can be calculated by taking the area under the precision recall (PR) curve. Note AP is averaged over all categories, therefore there is no difference between mAP and AP. The calculation of precision and recall are introduced in Equation (6) and (7). From our training logs, the PR curves of our proposed models and original YOLACT models can be seen in FIGS. 11 and 12. Table 3, see FIG. 17, shows the COCO mAP results of all trained models.

$$\text{Precision} = \frac{TP}{TP+FP} \quad (6)$$

$$\text{Recall } l = \frac{TP}{TP+FN} \quad (7)$$

where TP is true positive, TN is true negative, FP is false positive, and FN is false negative.

Figure 11:
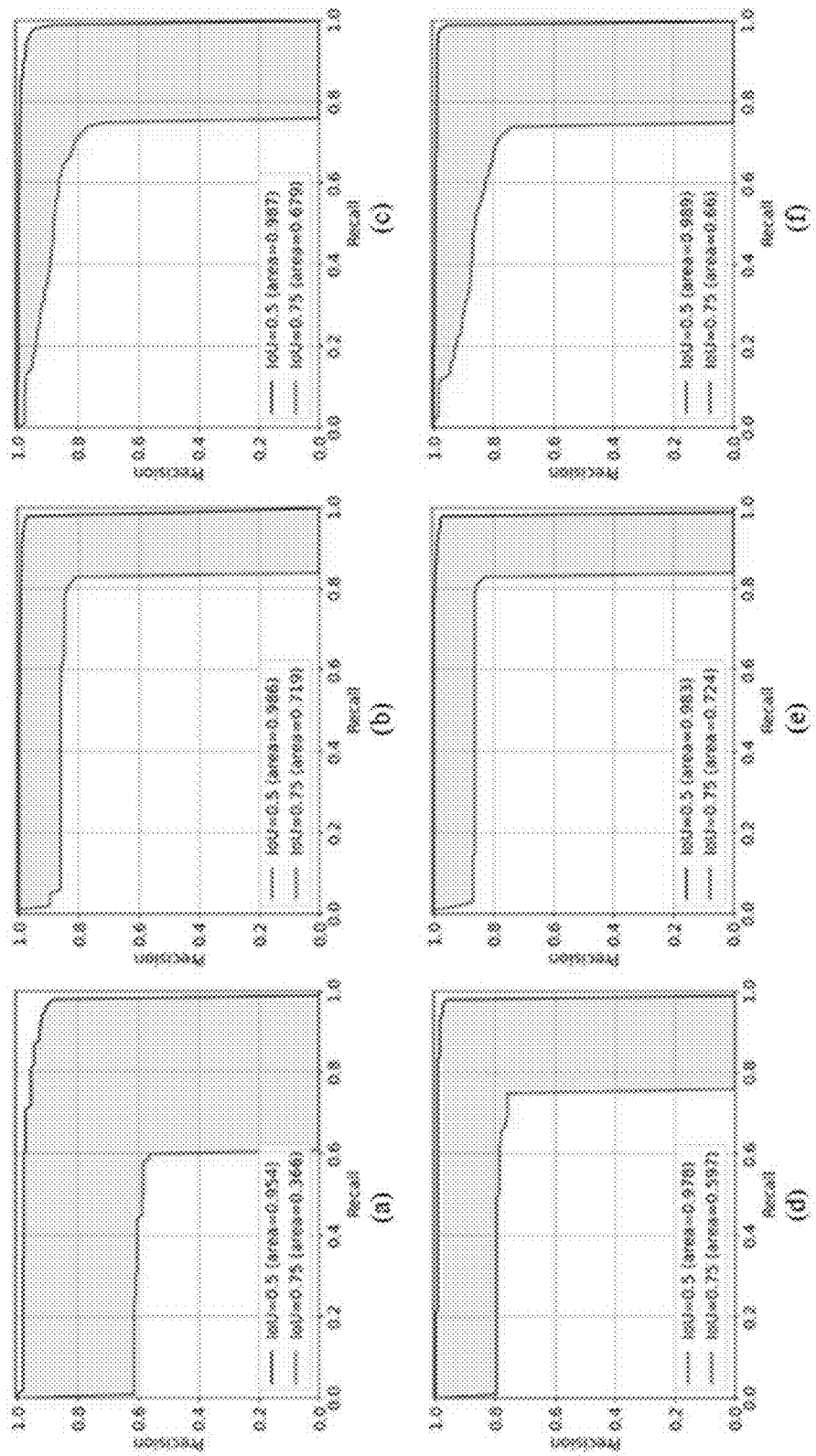
FIG. 11 shows precision-recall curves of YOLACT-ResNet-50 and YOLACT-ResNet-101 on each category. (a)-(c)

Typically, the precision-recall curve shows the relationship between precision and recall of different thresholds. In FIGS. 11 and 12, 0.5 and 0.75 were selected as the thresholds, respectively. A high area corresponds to a high recall and a high precision in each class. Meanwhile, a high precision indicates the detection has more accurate results and a high recall means the majority of predictions are positive results. In FIGS. 11 and 12, with a threshold of 0.5, it can be found that all the areas are over 0.97 except for the result of YOLACT-ResNet-50. When the threshold is 0.75, the best detection for rail is the proposed model, YOLACT-Res2Net-50, of which the area is 0.616. Similarly, the best detections for the clip is YOLACT-Res2Net-101 and the best detections for the spike is YOLACT-Res2Net-50. Based on these results, it is confident that the proposed YOLACT models with the implemented improvements outperform the original YOLACT models.

To evaluate the detection performance on a wider scale, the MS COCO evaluation matric was used and tested as shown in Table 3, see FIG. 17. It shows that the proposed models, YOLACT-Res2Net-50 and YOLACT-Res2Net-101 offered competitive performance in the detection of bounding boxes and masks. For detecting bounding boxes, with the 50% IoU threshold, YOLACT-Res2Net-50 has the highest AP value, 98.1, which is 0.3 AP higher than YOLACT-ResNet-101 and 1 AP higher than YOLACT-ResNet-50. Meanwhile, YOLACT-Res2Net-101 has the same performance as YOLACT-ResNet-101. With the 75% IoU threshold, YOLACT-Re2s2net50 has the highest AP value which is 68.0. It is 9.3 AP higher than YOLACT-ResNet-50 which has the same depth of backbone as YOLACT-Res2Net-50. In addition, YOLACT-Res2Net-50 outperformed YOLACT-ResNet-101 by 2.1 AP.

For the indicators of APs, YOLACT-ResNet-50 performed the best on small object detection, of which the AP value is 43.4. While the APs values for other YOLACT models are all less than 40. Compared with original YOLACT models, the improved models increased the detection accuracy on medium objects by around 2 AP values. Meanwhile, the smallest disparity on medium objects detection between Mask R-CNN and YOLACT models is 20 AP value. Furthermore, it was found that Mask R-CNN achieved the best results on the detection of large objects. It has the highest AP value of 71.1. Even though our YOLACT-Res2Net-50 model performed better on large object detection than YOLACT models. There is still a 14.3 AP difference between it and the Mask R CNN. One possible reason is the difference between the training process, but it does suggest directions on future model improvements. Overall, our improved models outperformed the original models on the bounding box detection.

In terms of instance segmentation performance, our models improved the mask accuracy compared with original YOLACT models and the state-of-the-art instance segmentation model, Mask R-CNN. YOLACT-Res2Net-101 has the highest mask AP value, which is 0.7 higher than the value of YOLACT-ResNet-101. YOLACT-Res2Net-50 also improved by 0.5 AP compared with YOLACT-ResNet-50. For the performance of instance segmentation with IoU threshold of 0.5, the YOLACT-Res2Net-50 model can obtain the same mask AP result as YOLACT-Res2Net-101. The proposed YOLACT-Res2Net-101 model achieved 96.9 AP, which is slightly lower than the value from YOLACT-ResNet-50 model. For the mask results of $AP_{75}$, $AP_S$, and $AP_M$, the YOLACT-Res2Net-101 model all achieved the highest values, which were 60.3, 31.1, and 59.6, respectively, indicating its great performance. Regarding mask results on large objects, Mask R-CNN still obtained the highest APL value which is 79.0. However, on the large object scale, the difference between YOLACT-Res2Net-101 and Mask R-CNN is reduced to 1.5 AP. As for the detection speed, the original YOLACT-ResNet-50 was 40.2 FPS, which is the fastest speed. The proposed model, YOLACT-Res2Net-50, achieved a speed of 36.4 FPS. The slightly slower detection speed is somewhat anticipated as a trade-off for better accuracy. This suggests future model improvements need to focus on large scale objects and improving detection accuracy without compromising the speed. In short, YOLACT-Res2Net-50 performed best on bounding box detection, and YOLACT-Res2Net-101 has the best mask accuracy.

Influence of the Light Condition

In the field practice, the environmental condition is complex, and the track components are relatively small, making visual inspections very challenging. Besides, the inspection window has been reducing due to the busier timetables. Therefore, any detection model has to be robust enough to accommodate harsh environmental conditions for field applications. One of the typical challenges in the field is the light condition. To test the detection performance under different light conditions, five different light intensities were used, which were original light, light −10%, light −30%, light −50%, and light −70%. FIG. 13 shows the testing results under the selected five visibility conditions.

In the ground truth, there are obvious differences between the normal light status and dim status. As the lightness decreased, the image background became darker, and the rail components were blended into the background. It is indeed challenging to distinguish the rail components by naked eyes without sufficient light as shown in the first row in FIG. 13. Furthermore, the specific image presented in FIG. 13 was taken during rainfall, making it more troublesome for detection. In this particular image, there are five spikes, one rail, and four clips. The results of the detection accuracy of each model under different light conditions are presented in FIG. 14. For YOLACT-ResNet-50, in the first four light conditions, it can successfully detect all the spikes and the clips. However, it cannot detect the rail and add the mask on it. In the last circumstance, light −70%, it missed two spikes. The performance of YOLACT-ResNet-101 was similar to YOLACT-ResNet-50. It also failed to detect the rail. Meanwhile, it missed three spikes under the light −70% condition. Regarding the proposed YOLACT-Res2Net-50, except for the last condition, it successfully detected the rails and added the masks on them. Under the light −70% condition, it missed one spike. The proposed YOLACT-Res2Net-101 also performed well under each condition. It detected the rails and added mask on them under four different light conditions, but it missed three spikes in the darkest condition. It is worth noting that the last model, Mask R-CNN has good performance in different light conditions. It detected three rails out of all rails Meanwhile, it just missed 2 spikes in the darkest condition.

Overall, our improved models outperformed the original YOLACT models and Mask R-CNN in these five light conditions. It should be mentioned that the test image was randomly selected from the image set. To some extent, it can reflect the real performance in the field practice. Currently, limited by the training data, other types of track components were not included. In the future, the detection performance can be improved with more data and further enhancement of the model.

The current disclosure provides a new real-time pixel-level railroad track components detection system for periodic inspections. This system is based on a fully connected model for real-time instance segmentation. The input features were extracted by the improved backbone and the FPN structure was responsible for detecting objects on different scales. The instance mask was generated by two parallel tasks. One is accomplished by the Protonet and the other one is achieved by the prediction head which also generates the anchors for bounding boxes. To accelerate the detection speed, the fast NMS was applied. During the training, the first rail components image database was built. Out of a total of 1250 images, 1000 images were used for training and validation, and 250 images were saved for testing. Five models, including the two proposed models and three other popular models, were trained and evaluated based on precision-curve and MS COCO evaluation metrics. Experimental results showed our proposed models outperformed the state-of-the-art models on detection accuracy.

The current disclosure is believed to be the first application of real-time instance segmentation on the railroad inspection and even civil engineering. No previous studies or researches were reported by using the real-time instance segmentation on railroad and civil engineering. The proposed network adopted a module with more receptive fields and granular levels on the backbone, and more prototypes were generated by using a modified parameter. Compared with the original YOLACT model and Mask R-CNN, our proposed models achieved the best performance on the detections of bounding box and mask, with the highest AP of 61.5 on the bounding box and the highest AP of 59.1 on the mask. As a trade-off, the detection speed decreased slightly, but still maintained a real-time speed, which is around or over 30 FPS. Under the different light conditions, our proposed model outperformed the other models, proving the robustness on low visibility conditions. This disclosure demonstrated the possibility of applying the cutting-edge deep learning technology into the railroad track components inspections, paving the road for future applications. However, there is indeed room for improvement. Future extensions will focus on building the first comprehensive railroad image database and improving detection without compromising speed.

One further aspect of the current disclosure is to provide Deployable Autonomous Power-efficient Track Inspection System (DAPTIS) based on deep learning and AI technologies for automated detection and evaluation of the conditions of different track components. This system will be integrated into the existing autonomous inspection rail vehicles of FRA, such as DOTX225 and DOTX226, to further enhance the inspection capabilities. The system will combine the continuously-operating surveillance unit, communication unit, and computer vision and deep-learning/artificial intelligence (AI) unit onto a size, weight, and power (SWaP)-efficient edge computing platform. The success of this research will significantly boost the inspection efficiency without overburdening the power supply and data transfer bandwidth currently available on the rail vehicles. The proposed system will also adopt the modular architecture design, which can be easily extended based on inspection interests, leading to significantly reduced costs of field deployment.

To ensure safe and efficient railroad operation, frequent track inspections (once or twice a week) are enforced by the Federal Railroad Administration (FRA). Till now, some track inspections still are manually, which are inefficient, error-prone, and inaccurate. With the advent of advanced sensors and data processing approaches, automated inspection methods have emerged for different engineering applications, and become popular all over the world, such as pavement crack detection, concrete structure damage monitoring, bridge health evaluation, etc. Autonomous inspection technologies offer unprecedented efficiency and accuracy compared to traditional, manned methods.

Automated approaches are also developed for perform railroad track inspections, such as the GPR, laser, or Lidar, and others to measure rail profile, examine track geometry, estimate fouling conditions, and detect track obstacles. For example, Ensco has developed several image-based inspection systems, such as their Track Component Imaging System (TCIS) and Rail Surface Imaging System (RSIS), which can inspect track components and identify defects using the convolutional neural network to process the high-resolution images. Although prior developments have demonstrated improved track inspection performance, they still suffer from several limitations, including: 1) those systems require specialized and expensive equipment; 2) they require technicians to have extensive training and rich experience to operate; and 3) data collected in the field needs to be transferred back to the centralized facility for post-processing. Therefore, considerable human intervention is still required, making the inspection still expensive and the accuracy is highly susceptible to the skill and experience of the individual personnel. The separate field data collection, centralized post-processing, and analysis lead to complex procedure, unexpected data loss and prolonged time for decision making, all rendering it well-suited for real-time track assessment. Recently, FRA's Office of Research, Development and Technology (RD&T) launched a five-stage program to develop an Autonomous Track Geometry Measurement System (ATGMS) and related technologies, aiming to improve railroad safety. The power consumption of the ATGMS was only around 130 W, and provided by solar panels and methanol fuel cell through a battery bank. The data collect by the ATGMS mounted on DOTX225 has shown the same analysis quality as a truck-mounted track geometry measurement system. The successful applications of DOTX225 and DOTX226 with the ATGMS not only reduce the inspection cost and increase inspection capacity, but also indicate the future direction of autonomous track inspection systems development, that is: 1) low cost, 2) low power consumption, 3) fully automated, 4) low bandwidth requirement, and 5) consistent performance.

Inspired by the success of ATGMS on DOTX225 and DOTX226, this disclosure proposes to develop a Deployable Autonomous Power-efficient Track Inspection System (DAPTIS) that is able to detect and evaluate the conditions of different track components, especially for fastener, tie, and rail condition assessment. The proposed system features low image resolution requirement, low power consumption, hot swap capability, salient field-deployability, high accuracy, and real-time processing speed. The developed system will be miniaturized and integrated into a mobile edge computing platform that can be connected to a general-purpose camera to perform track inspection tasks driven by the advanced artificial intelligence (AI) engine. Due to the low power consumption (<100 W) and hot swap function, this system enables salient integrability with the existing autonomous inspection rail vehicles of FRA, such as DOTX225 and DOTX226, to further advance the inspection capabilities. The proposed DAPTIS represents an integrated, economical, and practical solution of autonomous track inspection that would dramatically improve track safety and benefit all stakeholders at various levels.

The effective assessment of track component conditions heavily relies on two factors: processing of the visual information and identification of anomaly in real time. Therefore, we propose to develop DAPTIS for continuous, real-time monitoring and recognition based on advanced computer vision and image processing, deep learning and AI, and edge computing. The conceptual data flow of the proposed DAPTIS is depicted in FIG. 1.

Module I: Software for AI-based Track Component Detection and Evaluation

The success of computer vision and deep learning technologies has been demonstrated extensively in the research community and industry, and largely driven by the exceptional performance of convolutional neural networks (CNNs) in end-to-end feature learning and task-specific optimization for image-based problems. To tackle the problem of anomaly detection for the track components, such as fasteners, rails, tie plates, spikes, etc., we will leverage our extensive experience developing and applying CNNs for video processing, and adapt state-of-the-art deep learning methodologies to perform autonomous image collection, processing, analysis, and identification for trustworthy situational awareness assessment and track condition evaluation. Specifically, we will develop a pixel-level rail components detection system by using a tailored one-stage instance segmentation model to detect, lock, and track components in a fast and accurate fashion. For this particular project, we will focus on the detection and inspection of different types of rail fasteners that popular in the field. Detection and quantifying rail defects are also possible based on funding available. The proposed CNN extracts the features from field collected data, predicts target objects in different scales utilizing feature pyramid network, and generates high-quality prediction by evaluating the probabilities of classification and anomaly detection. The training process for this system will be carried out offline using a high-performance computing workstation and will be deployed in a heterogeneous edge computing device for real-time detection and evaluation.

Transfer Learning

There are two engineering challenges associated with the DAPTIS, which will be addressed by levering the expertise of our team on edge computing and AI development. The first issue faced when integrating CNNs into DAPTIS for real-world deployment is their poor generalization performance when trained on small datasets given their large number of training parameters. This scenario will occur when the deployment environment is varied, such as various geographic regions involving different track appearance, and the task-specific classification and decision layers are changed. Our team have successfully overcome this challenge through several case studies using a novel method termed "transfer learning." By leveraging the CNN's rich feature representations learned through prior training on very large datasets (e.g., ImageNet), we can replace the final prediction layers of a pre-trained network (e.g., fully-connected network with SoftMax output) with our task-specific prediction layers and train only the new portion of the network on a small, task-specific dataset (the right-most red block in FIG.). The early layers of a CNN learn stacks of low-level, generic features from large datasets with broad class distributions, therefore this robust feature extraction model can accommodate new, unseen inspection tasks (e.g., from different regions). Through an iterative process, we can choose, respectively, the layers extracting low-level characteristics (edges and colors) from input images and those producing classification (rails, spikes, and clips) suitable for specific tasks. FIG. 18 illustrates a realization of the concept, in which all convolution and pooling layer weights are frozen, and only the task-specific classifier (highlighted in red) is trained with weight updates. If the desired performance is not achieved, more layers can be opened-up for training to ensure that higher-level, mission-critical features are sufficiently learned.

Weight Quantization and Parallelization of GPUs

A second challenge for the proposed technology is to reduce the power consumption, memory requirements and computational burden on the edge-computing platform system as much as possible when it is deployed onto FRA's autonomous inspection vehicle DTOX 225 or DTOX 226 (after the AI model is trained). In address this issue, we will develop another post-training module to perform weight quantization. Our track inspection networks are typically trained using 32-bit floating point arithmetic, but weight quantization allows us to reduce our model parameters to 8-bit representations without sacrificing accuracy. Other strategies that can be exploited to meet the SWaP requirement and accelerate image analysis to reach the real-time rate include only analyzing areas in the video frames that only include the rails and fasteners, and utilizing massive parallelization of GPUs to create multiple instances of the prediction models that can simultaneously process different portions of images and frames in series. By incorporating these innovative solutions into our DAPTIS workflow, the models that we deploy to resource-constrained devices will require much less memory and help enable real-time operation. FIG. 19 illustrates some preliminary results in terms of the track component detection, in which the spike, rail, and clip are clearly identified. It should be noted that the video shown in FIG. 19 at (b) was taken under a rainy day with poor illumination conditions.

Module II: Image Acquisition and Edge Computing Hardware

To enable in-situ image analysis and AI inference using the algorithm described above, an appropriate mobile edge-computing platform and integration strategy will be devised and developed leveraging our prior experience. The key constraints effecting the hardware configuration and edge computing strategy for DAPTIS are continuous monitoring, real-time analytics, and low Size, Weight, Power, and Cost (SWaP-C) requirements for implementation and integration to existing autonomous inspection rail vehicles of FRA, like DOTX225 and DOTX226. For our hardware configuration, we chose to use a Basler raL2048-48 gm camera (~$1200, typical power consumption 3 W) and an NVIDIA Jetson TX2 computing platform (~$500, maximum power consumption 15 W) as shown in FIG. 20 and FIG. 21, respectively. The Basler raL2048-48 gm camera employed the Awaiba DR-2k-7 CMOS sensor which can continuously deliver images at maximum 51 kHz at 2k resolution. The Basler raL2048 series cameras are industry proven cameras and have been applied in many infrastructure inspection systems, including the TCIS developed by Ensco. More powerful raL2048 series cameras are available at similar price range. We will connect the Basler raL2048-48 gm Camera to the Jetson TX2 via the Jetson's Gigabit Ethernet port and stream full HD (1080p) video at proper frame rate (fps). The GigE port allows for flexible system configuration and diagnosis in the field, additional camera inputs, and efficient continuous streaming of video around-the-clock. In addition, the HDMI and other video ports can be used to directly monitor the entire inspection process for improved tool utility, such as visualization of the track components and quantitative summary (curves and tables). Note that although the proposed system is intended for automated operation, it can be intervened by human operators/analysts at any time for further investigation, e.g., enlarged view of a specific track component, play back, additional labelling and annotation, and others. By leveraging the Jetson TX2's CPU/GPU architecture in conjunction with GPU-accelerated libraries and accelerated image encoding and decoding, we can perform deep neural network inference efficiently in real-time or near real-time on the Awaiba DR-2k-7 CMOS sensor steam. In contrast to the heavy computing requirements of the offline deep neural network training process, deploying our trained system, i.e., CNN (i.e. YOLO-v3) architectures, requires minimal resources and can be accomplished solely on the Jetson TX2. The 8 GB of shared CPU/GPU onboard the Jetson TX2 provides plenty of space for our model and persistent data, and the 256-core NVIDIA Pascal™ GPU architecture with 256 NVIDIA CUDA cores can efficiently handle the CNN operations in a highly parallel manner. All of these computational resources are contained within a very small System on a Module (SoM) that is embedded in a development board with a form factor of 6.69 in×6.69 in×1.96 in, and when our system is running at peak utilization, the platform draws less than 100 W of power.

The current inventors trained a deep CNN to process long, multivariate sensor streams and successfully deployed it to the same NVIDIA Jetson TX2 for demonstration. In another effort, the team has trained and evaluated a number of cutting-edge deep neural networks for efficient object detection and recognition in video. FIG. 22 at (a) shows an example of one of our integrated software-hardware systems for deployment and testing of CNN-based Automated Target Recognition (ATR) models. The Raspberry Pi 3 was chosen as our low-end computing platform (~$28) for initial field experiments because of its small size (3.37 in×2.22 in), low power consumption (1.2 W), and limited computing resources (1 GB RAM and 1.2 GHz ARM processor). FIG. 5 at (b) and (c) illustrate example imagery with overlaid predicted bounding boxes and class assignments generated by a CNN model running in near real-time on the RaspberryPi. Even while operating in a high-clutter environment, e.g. graffiti, shrubbery, our ATR system was able to recognize foreground objects-of-interest. Each visible segment of the passing truck, even with significant target overlap, was correctly classified and distinguish between the biker. These results convincingly verify the potential of developing and deploying deep neural networks for video analysis in a resource-limited environment for DAPTIS.

Development Framework

DAPTIS will be developed by leveraging extensive R&D experience of the research team on railroad communication, computer vision, and deep learning. The proposed innovation is based on low-cost, commercial-off-the shelf (COT) cameras with edge computing architecture which can be implemented into a mobile computing board that is smaller than a letter size paper. The research team has experience to develop and package relevant AI software and hardware platform in prior defense-related and railroad engineering applications, such as vehicle and pedestrian recognition at the grade crossing and our preliminary results on track component inspection.

In a further embodiment, a cutting-edge convolutional neural network, YOLOv4 is improved, trained, and evaluated based on the images in a public track components image database. Compared with other one-stage object detection models, the customized YOLOv4-hybrid model can achieve 94.4 mean average precision (mAP) and 78.7 frames per second (FPS), which outperforms other models in terms of both accuracy and processing speed. It paves the way for developing portable and high-speed track inspection tools to reduce track inspection cost and improve track safety.

The challenges of railroad track inspection are the work needs to be completed in a very limited time and requires relatively easy operations by the railroad crew. Considering the engineering difficulties and inspired by the successful applications of the third generation of You Only Look Once (YOLO) detectors, which are the state-of-the-art object detection algorithm in the deep learning, this disclosure aims to develop a fast, accurate, yet low computation demand track inspection method.

In this work, a real-time railroad track components inspection framework based on the just-released YOLOv4, see D. Wu, S. Lv, M. Jiang, H. Song, *Using channel*

*pruning-based YOLO v4 deep learning algorithm for the real-time and accurate detection of apple flowers in natural environments, Comput. Electron. Agric.* 178 (2020) 105742, https://doi. org/10.1016/j.compag.2020.105742, is proposed for track components inspection.

The contributions of this disclosure are: (1) an improved YOLOv4 model is firstly proposed for the railroad track components inspection; (2) influence of different activation functions and loss functions on the performance of YOLOv4 trained with a customized dataset is tested and compared; (3) comparison between the improved YOLOv4 and other State-of-The-Art (SOTA) models on the detection performance has been summarized and discussed; (4) the impact of different image sizes and illumination conditions on detection performance has been illustrated; and (5) the detection performance of YOLOv3 and the modified YOLOv4 on "missing components" or "fake components" is compared. Note the former two contributions are focusing on the model improvement, while the latter three contributions are directly related with the field application of automatic railroad track inspections.

Methodology
Proposed Pipeline

In this disclosure, to efficiently and accurately inspect the rail track components with a real-time speed on a single GPU, the newly developed one-stage object detection framework, YOLOv4, see A. Bochkovskiy, C.-Y. Wang, H.-Y. M. Liao, *YOLOv4: optimal speed and accuracy of object detection,* arXiv preprint (2020) arXiv:2004.10934. URL, https://arxiv.org/pdf/2004.10934.pdf, is modified and trained based on the needs of railroad track inspection. Then, the developed models are evaluated and compared with SOTA models. The overall methodology is described in FIG. 23.

Data preparation: the training files mainly include images and the corresponding annotation files which are built using the labelme, see A. Torralba, B. C. Russell, J. Yuen, *Labelme: online image annotation and applications, Proc. IEEE* 98 (8) (2010 Jun. 10) 1467-1484, https://doi.org/10.1109/jproc.2010.2050290, an open-source labeling tool for the model training.

Model training: three object classes, rail, clip, and spike are selected for the training purpose. A public available data set with a total of 1000 images are used for training, see F. Guo, Y. Qian, Y. Wu, Z. Leng, H. Y. Yu, *Automatic railroad track components inspection using real-time instance segmentation, Computer-Aided Civil Infrast. Eng.* (2020), https://doi.org/10.1111/mice.12625. To better fit the training needs of the customized image data, the original activation function of YOLOv4 is modified to improve the prediction performance. The original activation function of YOLOv4 is replaced with two different activation functions and one combination of the hybrid activation functions, aiming to construct three different YOLOv4 models. A total of five models including the three modified YOLOv4 models, original YOLOv4, and original YOLOv3 are trained with the PyTorch library.

Performance evaluation: The precision-recall (PR) curve, precision, recall, F1 score, mean average precision (mAP), and inference time are used to evaluate and compare the training results of different models. The influence of different image sizes and illumination conditions on the prediction performance are evaluated and discussed. The capability to detect "missing components" and "fake components" are also investigated.

Network Architecture

The YOLOv4 model aims to optimize the speed and accuracy on real-time object detection based on YOLOv3. To balance the speed and accuracy, the backbone of Cross-Stage-Partial-connections (CSP) Darknet-53 is utilized in the new network architecture of YOLOv4. Based on the introductions of YOLOv4, CSP Darknet-53 has better performance on COCO dataset, see T.-Y. Lin, M. Maire, S. Belongie, J. Hays, P. Perona, D. Ramanan, P. Dollar, C. L. Zitnick, *Microsoft Coco: Common Objects in Context, European Conference on Computer Vision,* Springer, 2014, 740-755, https://doi.org/10.1007/978-3-319-10602-1_48. To increase the receptive field, which affects the unit of the network, spatial pyramid pooling (SPP) block, see K. He, X. Zhang, S. Ren, J. Sun, *Spatial pyramid pooling in deep convolutional networks for visual recognition, IEEE Trans. Pattern Anal. Mach. Intell.* 37 (9) (2015) 1904-1916, https://doi.org/10.1109/tpami.2015.2389824, and the modified path aggregation network (PANet), see S. Liu, L. Qi, H. Qin, J. Shi, J. Jia, Path aggregation network for instance segmentation, in: *Proceedings of the IEEE conference on computer vision and pattern recognition,* 2018, pp. 8759-8768, https://doi.org/10.1109/cvpr.2018.00913, are integrated into YOLOv4. For the detection head, YOLOv3 head is assembled in the new model, aiming to predict objects in multiple scales. In this disclosure, there are a total of three object classes. Therefore, the number of filters=(classes+5)× 3=24. FIG. 24 presents the overview of the YOLOv4 network architecture.

As shown in FIG. 24, the skeleton of YOLOv4 mainly includes CSP Darknet-53 2402, SPP block 2404, PANet 2406, and the prediction head. Specifically, CSP Darknet-53 2402 assembles Darknet-53 and CSPNet, which includes the partial dense block and the partial transition layer to enhance the variability of the learned features within different layers. The detailed parameters of output features are presented in FIG. 24. SPP block 2404 is used to increase the receptive field and separate the most significant context features without sacrificing inference speed. Same as YOLOv3, there are three scales in the detection head 2408. Since the inputs are 512×512, the parameters of the detection head in YOLOv4 are 64×64×24, 32×32×24, and 16×16×24, respectively.

There are other improvements implemented in YOLOv4, important components are Weighted-Residual-Connections (WRC), see F. Shen, R. Gan, G. Zeng, *Weighted residuals for very deep networks,* in: 2016 3rd International Conference on Systems and Informatics (ICSAI), IEEE, 2016, pp. 936-941, https://doi.org/10.1109/icsai.2016.7811085, *Cross mini-Batch Normalization* (CmBN), see Z. Yao, Y. Cao, S. Zheng, G. Huang, S. Lin, *Cross-iteration batch normalization, arXiv preprint* (2020) arXiv:2002.05712. URL, https://arxiv.org/pdf/2002.05712. pdf, 1908.08681, Mish Activation, D. Misra, Mish: a self regularized non-monotonic neural activation function, arXiv preprint (2019) arXiv: 1908.08681. URL, https:arxiv.org/pdf/1908.08681.pdf, Complete Interaction over Union (CIoU) loss, see Z. Zheng, P. Wang, W. Liu, J. Li, R. Ye, D. Ren, *Distance-IoU Loss: Faster and Better Learning for Bounding Box Regression, AAAI* (2020) 12993-13000, https://doi. org/10.1609/aaai. v34i07.6999., Mosaic data augmentation, and DropBlock regularization, see G. Ghiasi, T.-Y. Lin, Q. V. Le, *Dropblock: a regularization method for convolutional networks, advances in neural information processing systems,* (2018) pp. 10727-10737, URL: https://arxiv.org/pdf/1810.12890.pdf. Generally, it is believed these improvements can effectively improve the detection speed and accuracy on the COCO dataset, see T.-Y. Lin, M. Maire, S.

Belongie, J. Hays, P. Perona, D. Ramanan, P. Dollar, C. L. Zitnick, *Microsoft Coco: Common Objects in Context*, European Conference on Computer Vision, Springer, 2014, pp. 740-755, https://doi.org/10.1007/978-3-319-10602-1_48. Unfortunately, the reality is the COCO dataset hardly meets the specific needs of the field applications, especially for civil engineering applications which highly demand suitable image data to complete specific tasks, such as asphalt pavement crack detection, concrete pavement crack detection, and railroad defects identification.

It is worth noting that, other than the dataset provided by Guo et al., see F. Guo, Y. Qian, Y. Wu, Z. Leng, H. Y. Yu, *Automatic railroad track components inspection using real-time instance segmentation*, Computer-Aided Civil Infrast. Eng. (2020), https://doi.org/10.1111/mice.12625, there has been no other public image dataset related to rail track components such as rail, clip, and spike, which are critical track components to ensure the track integrity and safe operation. Besides, few studies are using YOLOv4 to work on a small dataset and discuss the role of different activation functions in prediction performance with a customized dataset of railroad engineering. In fact, based on the training experience of the authors and relevant studies, see D. Misra, *Mish: a self regularized non-monotonic neural activation function*, arXiv preprint (2019) arXiv:1908.08681. URL, https://arxiv.org/pdf/1908.08681.pdf., different activation functions do imp act the prediction performance. Therefore, in the following part, the influences of different activation functions on training results and prediction performance with the customized dataset are investigated in detail.

Activation Functions

The activation function is a critical part of the neural network and has proven key to high performance among a wide range of tasks. It determines whether a neuron in the neural network should be activated or not, and is characterized by a variety of properties (derivative, monotonicity, etc.) for a customized training, see S. Eger, P. Youssef, I. Gurevych, *Is it time to swish? Comparing deep learning activation functions across NLP tasks*, arXiv preprint (2019) arXiv: 1901.02671. URL, https://arxiv.org/pdf/1901.02671.pdf. Therefore, the choice of activation functions plays an important role in the training dynamics and performance, P. Ramachandran, B. Zoph, Q. V. Le, *Searching for activation functions*, arXiv preprint (2017) arXiv: 1710.05941. URL, https://arxiv.org/pdf/1710.05941.pdf. To train the model efficiently and make the prediction more accurate on the customized dataset, popular activation functions including Mish, Swish, and Leaky-ReLU, are implemented and configured for the training files. The following will introduce the selected different activation functions in detail. Mish. Mish is a novel activation function proposed by Diganta, see D. Misra, *Mish: a self regularized non-monotonic neural activation function*, arXiv preprint (2019) arXiv:1908.08681. URL, https://arxiv.org/pdf/1908.08681.pdf. It is defined in Eq. (1). Like other popular activation functions, it can be easily implemented in the PyTorch and TensorFlow frameworks with well-developed commands. Specifically, it is bounded below and unbounded above with a range of [≈0.31, ∞). The properties of smooth, non-monotonic, unbounded above, and bounded below are important to improve the training performance. Based on the training experience, using Mish could obtain an improved prediction, but there are longer training time and more memory cost. The graph of Mish can be seen in FIG. 25 at. Even though Mish is successfully used on the newly released YOLOv4 model with the COCO dataset, it has high computational expense and costs more time during training, which means it might not be the most suitable activation function on a featured dataset.

$$f(x) = x \cdot \tan h(1+e^x)) \quad (8)$$

Swish.

Swish is an activation function proposed by Prajit. It performs well on various kinds of challenging datasets under popular deep learning libraries. Based on the experiment results reported by Prajit, P. Ramachandran, B. Zoph, Q. V. Le, *Searching for activation functions*, arXiv preprint (2017) arXiv: 1710.05941. URL, https://arxiv.org/pdf/1710.05941.pdf, it can outperform ReLU on ImageNet by 0.9% for Mobile NASNet-A and 0.6% for Inception-Res-Net-v2, respectively. The design of this activation function is inspired by the application of the sigmoid function on the long short-term memory (LSTM) and highway networks. Similar to Mish, it is bounded below, unbounded above, non-monotonic, and smooth. According to Prajit, see Id., the non-monotonicity property distinguishes Swish from other popular activation functions such as ReLU. Meanwhile, smoothness is useful for model generation and optimization.

Equation 9 gives the definition of Swish and FIG. 25 at (b) presents the graph. From FIG. 25 at (d), it can be found that Swish has little variance from Mish, which can be found by comparing FIG. 25 at (a) and (b).

$$f(x) = x \cdot \sigma(x) \quad (9)$$

Leaky-ReLU

The Leaky Rectified Linear Unit (Leaky-ReLU), see A. L. Maas, A. Y. Hannun, A. Y. Ng, *Rectifier nonlinearities improve neural network acoustic models*, Proc. icml (2013) 3. URL, https://ai.stanford.edu/~amaas/paper s/relu hybrid icm12013 final.pdf., is one of the most commonly used activation functions in current deep CNNs. Compared with previous activation functions such as tan h and sigmod, it can address the issue of gradient vanishing and keep the weight updates alive along the propagation process. The definition of Leaky-ReLU is shown in Equation 10. There is an alpha parameter which is used for solving the problem of dead neurons brought by its predecessor, ReLU. The alpha parameter can ensure the gradients would not be zero during the entire training process so that the training performance can be improved. Even though there are a number of activation functions trying to replace Leaky-ReLU, such as parametric rectified linear unit (PReLU), concatenated rectified linear unit (CReLU), and randomized leaky rectified linear unit (RReLU), none of which can achieve the popularity like Leaky-ReLU. The graph of Leaky-ReLU is shown in FIG. 25 at (c).

$$f(x) = \begin{cases} x & \text{for } x \geq 0 \\ ax & \text{for } x < 0 \end{cases} \quad (10)$$

Loss

In current object detection models, bounding box regression is a popular approach to predict the localization boxes on the input images. The previous generation YOLO detector, YOLOv3 (Darknet version) computes the bounding box loss through mean squared error loss (MSE) which needs the center point coordinates, height, and width of the predicted and ground truth bounding boxes. However, MSE loss cannot consider the integrity of the object itself but only treats these parameters as independent variables. To achieve a better performance, for the YOLOv3 (PyTorch version) model trained in this disclosure, the bounding box regression is the generalized IoU (GIoU) which takes the converge area, shape, and orientation all into consideration. However, GIoU needs more iterations for converging, and it still could produce inaccurate results depending on the target and the input image. To improve the bounding box regression in terms of speed and accuracy, a novel loss function CIoU, see Z. Zheng, P. Wang, W. Liu, J. Li, R. Ye, D. Ren, *Distance-IoU Loss: Faster and Better Learning for Bounding Box Regression*, AAAI (2020) 12993-13000, https://doi.org/10.1609/aaai.v34i07.6999, with a faster convergence speed and better performance on bounding box regression is adopted in YOLOv4. For making use of the typically ignored geometric information such as the overlap area, aspect ratio, and central point distance in the bounding box regression, CIoU imposes the consistency of aspect ratios for bounding boxes. The CIoU loss is shown in Equation 11. The equation of IoU can be seen in Equation 12. The definition of trade-off parameter a can be seen in Equation 13. The consistency of aspect ratio v can be seen in Equation 14.

$$L_{CIoU} = 1 - IoU + \frac{\rho^2(b, b^{gt})}{c^2} + av \quad (11)$$

$$IoU = \frac{|B \cap B^{gt}|}{|B \cap B^{gt}|} \quad (12)$$

$$\alpha = \frac{v}{(1 - IoU) + v} \quad (13)$$

$$v = \frac{4}{\pi^2}\left(\arctan\frac{w^{gt}}{h^{gt}} - \arctan\frac{w}{h}\right)^2 \quad (14)$$

where b and $b^{gt}$ is the centroid of B and $B^{gt}$ (see Equation 12), c is the diagonal length of the smallest enclosing box covering ground truth and prediction bounding boxes. $\rho(\cdot)$ is the Euclidean distance, a is a positive trade-off parameter, v computes the consistency of aspect ratio. $B^{gt}=(x^{gt}, y^{gt}, w^{gt}, h^{gt})$ is the centroid coordinate, width, and height of ground truth bounding box, and B=(x, y, w, h) is the centroid coordinate, width, and height of the prediction bounding box. $w^{gt}$ is the width of the ground truth bounding box, w is the width of the prediction bounding box. $h^{gt}$ is the height of the ground truth bounding box, h is the height of the prediction bounding box.

Experiment and Results

In this disclosure, to achieve the goal of inspecting rail track components in a real-time speed on a single GPU with high accuracy and efficiency, four different types of activation functions are implemented in the backbone of YOLOv4 for training and testing with a customized image dataset. YOLOv3 is trained as the control group to evaluate the prediction performance of the original and modified YOLOv4 models. The four different types of activation functions implemented in the backbone of YOLOv4 are Mish, Swish, Leaky-ReLU, and a combination of Swish and Mish. Accordingly, the models in this disclosure are named as YOLOv4 (the original model which uses Mish), YOLOv4-swish (the modified model which uses Swish), YOLOv4-leaky (the modified model which uses Leaky-ReLU), YOLOv4-hybrid (the modified model which uses a combination of Swish and Mish), and YOLOv3. Note that the combination of Swish and Mish functions means the Mish activation function in the first two residual blocks (see FIG. 24) in YOLOv4 are replaced by Swish activation function. The reason for making this modification is to take the advantages of both YOLOv4-swish and YOLOv4, which are expected to have a high F1 value and high mAP value, respectively. To evaluate and compare the predicted results on the same scale, all training works are based on a GitHub repo developed by Ultralytics LLC, see Y. K. Glenn Jocher, guigarfr, Josh Veitch-Michaelis, perry0418, Ttayu, Dustin Kendall., Ultralytics/yolov3: 43.1mAP@0.5:0.95 on COCO2014, (2020), doi: https://doi.org/10.5281/zenodo.3785397. 2020). Even though the training process and hyperparameters may vary a little, the prediction results are evaluated on the same metric as discussed herein.

Data Preparation

As mentioned earlier, a public track component image dataset was built by the inventors for training and validation. There are three object classes in this dataset, which are rail, clip, and spike, respectively. The images are saved from video frames recorded by a smartphone. The videos are taken along a railroad section near the campus of the University of South Carolina. The original video resolution is 1920×1080.

The video is saved frame by frame and the size of the converted images is 512×512. To avoid overfitting in training, image augmentations including flip, contrast, rotation, shift, and Gaussian noise are conducted on this dataset.

To train the YOLO family models, the image data needs to be manually labeled first. The annotated images not only serve as the ground truth but also facilitate evaluating the training accuracy by comparing them with predicted results generated by the trained models.

A total of 1000 images are labeled using the popular annotation tool, labelme. An example of the labeling process is presented in FIG. 26. The dataset is randomly separated into two groups, one with 800 images is used for training, the other one with 200 images is used for validation. The testing set is the same as the validation set. The output of labelme is in JSON format, while the labels for the training of YOLOv3 and v4 need to be in txt format. Therefore, a conversion is performed before the training. After that, the txt format labels are stored separately with the image files.

Training and Validation

When the labeling process of the image data is completed, all JSON files generated from labelme are converted into txt files which contains the object class ID and normalized ground truth box coordinates. In this disclosure, all the models are trained from the scratch since few studies have tested different activation functions in YOLOv4 and no pre-trained weights are available so far. Specifically, the training processes in this disclosure are completed on a workstation with four NVIDIA 2080 Ti GPUs.

Note that only a single GPU is used to train each individual model. The operating system is Ubuntu 18.04, and the NVIDIA driver version is 440.64. To accelerate the training process and leverage the advantages of the powerful parallel computing capability of NVIDIA graphics cards, the packages of CUDA (version 10.2) and cuDNN (version 7.6.5) are applied. The training framework is based on PyTorch library which is published by Facebook AI. In this disclosure, the PyTorch version is 1.5.0 and python version is 3.7. The hyperparameters for all the models are summarized in FIG. 34 at Table 4. It needs to mention that the YOLOv4 and YOLOv3 have slightly different optimized parameter settings. To compare the performance of different activation functions on the customized dataset, the optimized parameters are adopted in this disclosure as shown in Table 4. To compare the influence of different activation functions, all parameters are set to be the same for different YOLOv4 models. Specifically, the input size includes the height and width of the training images. Momentum is a parameter for improving training accuracy and speed. Decay is used to prevent overfitting by causing the weight to exponentially decay to zero. The learning rate is to control the training speed. Batch size is the number of samples for training in each iteration. The training epoch refers to one cycle through the training dataset. FIGS. 27A and 27B present the training loss and validation loss of different models, respectively. In FIG. 27A at (a), the training losses of different models are close to each other. To better show the differences, the training loss from epoch 100 to epoch 200 is selected to have detailed comparisons. FIG. 27A at (b) shows that YOLOv4-hybrid has the lowest training loss among the five models. Typically, a lower loss indicates a better training result. Also, it is interesting to find that there is small variance between YOLOv4 and YOLOv3 on this customized dataset, indicating a similar prediction performance of them. FIG. 27B shows an obvious difference of validation loss, which is around 0.2 between YOLOv4-hybrid and other models. Since the validation set is also defined as the testing set, the validation loss could be more reliable compared to training loss on predicting the performance of different models. So according to FIG. 27B, it can be roughly concluded that YOLOv4-hybrid performs better than other models.

Evaluation Metrics

In order to measure the prediction performance of different models, the precision-recall (PR) curve including precision and recall, mAP, and F1 score are used as the evaluation metrics. Precision and recall are two important factors in the drawing of the PR curve and the calculation of mAP. Precision refers to the percentage of prediction results that are relevant instances. Recall refers to the percentage of total relevant results that are correctly classified by the trained model. F1 score considers both precision and recall and conveys the balance between precision and recall. A well-trained model should have a high F1 score.

Generally, a high precision value is associated with a low false negative value, and a high recall value is associated with a low false negative value. The PR curve describes the trade-off between the precision and recall. The larger area under the PR curve represents a higher AP. In other words, the trained model can perform well on the prediction if AP is high. The definition of precision, recall, and F1 score are given by Equations 15-17.

The mAP is a common parameter for accuracy evaluation on different object detection models. Specifically, it is the average of average precision (AP) for each object class. The AP is an area under a PR curve over the IoU which measures the overlap between ground truth and prediction. The definition of IoU can be referred to FIG. 28. The PR curves of testing models are shown in FIG. 29. Equation 18 shows the calculation on AP. Typically, when IoU is equal to or larger than 0.5, the prediction is recognized as correct. In this disclosure, the threshold of IoU is 0.5. After the AP is computed, the mAP can be calculated according to Equation 19.

$$\text{precision} = \frac{TP}{TP + FP} \quad (15)$$

$$\text{Recall} = \frac{TP}{TP + FN} \quad (16)$$

$$F_1 = 2 \times \frac{\text{Precision} \times \text{Recall}}{\text{Precision} + \text{Recall}} \quad (17)$$

$$AP = \int_0^1 p(r)dr \quad (18)$$

$$mAP = \frac{1}{N} \sum AP_i \quad (19)$$

where TP is true positive which is an outcome that the trained model can correctly predict the positive class, FP is false positive which is an outcome that the trained model falsely predicts the positive class, FN is false negative which is an outcome that the trained model falsely predicts the negative class. N is number of object classes.

FIG. 29 shows the PR curves of the different models. In each plot, there are three object classes which are rail, clip, and spike. Both the precision and recall range from 0 to 1. Generally, with the increase of the recall, the precision decreases. Under each PR curve, the area means the AP of a specific class with an IoU threshold. In this disclosure, the IoU threshold is set to 0.5 and the area can be referred to the column of mAP @ 0.5 in FIG. 35, Table 5.

In Table 5, there are five parameters which are precision, recall, mAP @ 0.5, F1 score, and inference time to assess the prediction performance of the five models. In the column of precision, the hybrid model scores the highest precision value within all objects which are 1.6% and 1.5% higher than the value of YOLOv4 and YOLOv3, respectively. Besides, the hybrid model has the highest precision in the rail and clip, which are 6.7% and 0.4% higher than YOLOv4 and 10.8% and 1.5% higher than YOLOv3, respectively. YOLOv3 has the highest precision in the spike, which is over 90%.

In the column of recall, the hybrid model hits the highest recall values within the overall class, rail, and spike, which are 96.0%, 100.0%, and 89.4%, respectively. Specifically, the corresponding recall values of the hybrid model are 1.1%, 0, and 2.6% higher than YOLOv4 and 1.0%, 0, and 3.0% higher than YOLOv3. Meanwhile, YOLOv3 reaches the highest recall value, 99.0%, for the clip.

Regarding the column of mAP @ 0.5, YOLOv4-hybrid obtains the highest values among all objects and the spike, which are 1.3% and 0.7% higher compared to YOLOv4, and 1.8% and 2.1% higher than YOLOv3. YOLOv4-leaky and YOLOv4-swish score the highest mAP values in the clip and rail, respectively. It can be found that the Leaky-ReLU or Swish activation functions can help improve the mAP value but there is a limited effect.

Focusing on the column of the F1 score, the hybrid model still outperforms other models. It gains the highest F1 values among all objects, rail, and clip, which are 89.6%, 87.7%, and 95.1%. Correspondingly, they are 1.7%, 4.3%, and 0.5% higher compared to YOLOv4, and 1.9%, 7.2%, and 6.0% higher than YOLOv3. YOLOv3 obtains the highest F1 value for the spike, which is 88.1%. Since the F1 score considers both precision and recall, the F1 score is typically selected for comparing the performance of different models. From the result of the F1 score presented in Table 5, see FIG. 35, the hybrid model has the best prediction performance over the rest models.

As regards the inference time which refers to the time using a pre-trained model to make predictions, Table 5, shows it varies from 9.6 ms to 13.2 ms. YOLOv3 has the fastest inference time for a single frame, which is 9.6 ms. Compared with YOLOv3, the original YOLOv4 and the hybrid model are 3.6 ms and 3.1 ms slower. When the inference time is converted to the frame rate as shown in Table 5, all the models are much faster than the requirement of real-time speed which is 30 frames per second (FPS), see J. Redmon, S. Divvala, R. Girshick, A. Farhadi, *You only look once: Unified, real-time object detection*, in: *Proceedings of the IEEE conference on computer vision and pattern recognition*, 2016, pp. 779-788, https://doi.org/10.1109/cvpr.2016.91, indicating it may satisfy the inspection car's speed on the railroad, which is generally between 15 and 20 miles per hour (mph), see X. Liu, A. Lovett, T. Dick, M. Rapik Saat, C. P. Barkan, *Optimization of ultrasonic rail-defect inspection for improving railway transportation safety and efficiency, J. Transp. Eng.* 140 (10) (2014), 04014048, https://doi.org/10.1061/(asce) te.1943-5436.0000697. Note that for the inspection vehicles with a higher speed, the frame rate needs to be higher to the real-time processing. One interesting finding is that the overall performance of YOLOv3 and YOLOv4 has a small variance with this customized image dataset. As for the F1 value, YOLOv4 is only 0.002 higher compared to YOLOv3. In terms of precision and recall, the performance of YOLOv4 is even poorer than YOLOv3. This is in contrast to the belief of the original YOLOv4 report which was trained on the popular large image dataset. The possible reason is that the different image datasets may impact the prediction of different models. In this customized dataset, the environment is more challenging than that in the dataset associated with the original YOLOv4 report, such as similar shapes between the ballast and the spike top, and the frequent repetition of the same objects, like spikes and clips. All these factors can impact the performance of YOLOv4, and the users should build a customized dataset and identify the most suitable activation function whenever possible to meet their specific needs.

Additionally, the impact of different loss functions including CIoU, GIoU, and Distance IoU (DIoU) on the prediction performance has been investigated as shown in Table 6, see FIG. 36. It is easy to find that with different loss functions, the inspection performance varies. The bold numbers indicate better performance with each parameter (i.e. Precision, Recall etc.). With the same loss function, the improved model, YOLOv4-hybrid, performs better either from the accuracy indicator or the processing speed indicator. Regarding the same model, YOLOv4 or YOLOv4-hybrid, the loss function does impact the performance but compared to the proposed activation function structure, they present very a limited impact on the detection accuracy. For example, with respect to the F1 scores of YOLOv4-hybrid (DIoU), YOLOv4(DIoU), and YOLOv4(GIoU), which are 87.9%, 83.4%, and 82.1% respectively.

Taking YOLOv4(GIoU) as the baseline, the proposed model can improve the performance by 4.5% but the loss function only varies the performance by 1.3%. Both activation and loss functions could impact the model performance, but the impact from the activation functions is significantly more pronounced. This suggests that the enhanced performance of the proposed model is the benefit of using the hybrid activation function, rather than the selection of a loss function.

Comparison with Other State-of-the-Art Models

In this disclosure, to compare the detection performance of YOLOv4-hybrid with other SOTA models, five models including Faster R-CNN, RetinaNet, SSD, Cascade R-CNN, and Mask R-CNN have been trained and tested. Specifically, these tests have been conducted on MMdetection which is a deep learning toolbox integrated with the SOTA object detection models. The default training parameters for each model have been kept. The experiment results with different performance indicators are plotted in FIG. 30.

As shown in FIG. 30, it can be easily found that regardless of the performance indicator, Faster R-CNN and RetinaNet perform the worst on the proposed railroad components dataset. The precision values of Faster R-CNN and Retina-Net are only 13% and 17.3%, respectively. With respect to recall values, they are merely 21.2% and 22.7%, respectively. These values are significantly lower than the corresponding values of YOLOv4-hybrid. As for the indicator values of SSD and Cascade R-CNN, it can be found that both of these two models have high mAP@0.5 values, which are 97.6% and 98.5%, respectively. They are 3.2% and 4.1% higher than the mAP@0.5 value of YOLOv4-hybrid.

However, regarding the rest indicators which are quite behind YOLOv4-hybrid. For example, the precision values of SSD and Cascade R-CNN are 61.9% and 71.5%, which are 22.3% and 12.7% lower than the precision value of YOLOv4-hybrid. Besides, Cascade R-CNN has the lowest detection speed among all the models, which is 27.7 FPS, indicating its limited potential for field practice.

With respect to F1 score, Mask R-CNN is the only one close to 80%, which is 75.5%, indicating it has a relatively balanced performance compared to other four models However, it is still 14.1% lower than YOLOv4-hybrid. In addition, its inspection speed is also not promising, which is only 5.2 FPS, 73.5 FPS lower than YOLOv4-hybrid. To put it into a nutshell, compared to other SOTA models, the proposed model has a well-balanced detection performance on either detection accuracy or speed, indicating a possible solution for the future automatic inspection of railroad components.

The recall is an important indicator of the detection performance, which can return and present the ratio of the corrected components that can be detected over all the ground truth instances. To illustrate the detection effect with different recall values, FIG. 31 shows the detection results with the aforementioned models. The first row shows the detection results by using YOLO detectors. The improved YOLO-hybrid model has detected all the components but the YOLOv3 and YOLOv4 missed two and one spike, respectively. The second row presents three models (Mask R-CNN, Cascade R-CNN, and SSD) with high recall values and all of them missed one or two components, indicating similar detection results as YOLOv3 and YOLOv4. But, as shown in FIG. 30, these three models generally have low precision values which means they may cause more false positive instances in the practice with more testing cases. Besides, regarding the detection speed, they are much slower compared to YOLO detectors. The third row gives the detection results using Faster R-CNN and RetinaNet. Both of them cannot work well in the railroad component inspection. Specifically, Faster R-CNN has missed six components while RetinaNet has missed five components. Overall, a higher recall value can return better detection results and it will benefit the engineering practice.

It needs to mention that typically, as shown in FIG. 31, the segmentation-based approach (i.e., Mask R-CNN) can generate the mask on the instance to present its shape. The advantages are they can provide more information related to the instance and meanwhile the models have a good inspection performance. But the high computation cost may limit the potential for the field application with a mobile computing platform. Indeed, for the specific tasks for the railroad (i.e., finding missed rail components), the object detection method with bounding boxes on instances such as our improved YOLOv4, has the superior prediction performance as shown in FIG. 30 and FIG. 31. With an appropriate configuration, it can be utilized and deployed in the railroad practice with its fast speed and high accuracy.

Impacts of Different Image Sizes and Illumination Conditions on Prediction Performance To evaluate the impact of different image sizes and illumination conditions on the detection performance of the proposed YOLOv4-hybrid and test its performance with simulated "missing" and "fake" components, three different image sizes, three different illumination conditions, and three "special cases" have been investigated in this disclosure. The selected three images sizes are 512×512, 416×416, and 256×256, respectively. After the preprocessing, the original brightness is reduced to −30%, −50%, and −70%, respectively, to mimic different visibility conditions. To validate the capability of the proposed model in inspecting potential "missing" track components in the field and test the robustness of the model with "fake" railroad track components, special cases of "fake ballast", "fake spike", and "disappeared clip" are created to challenge the proposed YOLOv4-hybrid. The detailed results are shown as follows.

FIG. 32 at (a) shows the detection performance with different image sizes. To better reflect the real field scenarios, the original images include three different railroad track conditions which are "spike only", "spike and rail", and "spike, rail, and clip", respectively. The reason for mixing different track conditions is to demonstrate the complexity of the track and different densities of the track components in the field. It should be mentioned that the general "walking inspection" practices in the field not only is low-efficiency and labor-intensive but also has low accuracy due to the complicated environment and viewing countless railroad track components could lead to eye fatigue. With different image sizes, FIG. 32 at (a) shows the inspection with the proposed YOLOv4-hybrid is promising and most of the track components can be successfully detected. Under the "spike only" condition, the detections are correct on the image sizes of 512×512 and 416×416. However, when the image size is reduced to 256×256, there is a false detection for the rail. The model classifies a large size ballast as rail. Regarding the "spike and rail" condition, there is only one missing detection for the spike with the image size of 416×416. In the "spike, rail, and clip" condition, all detections are correct. Overall, the image size is not significant in the prediction performance.

FIG. 32 at (b) presents the detection results under different illumination conditions. Three preprocessed illumination conditions are included, and all the false detections are pointed out by yellow arrows. In the "spike only" condition, there are false detections under "light −50%" and "light −70%". In the "light −50%" condition, there is a redundant spike detection. In the "light −70%" condition, the detection misses a spike. Further, in the "spike and rail" condition, there are two missing detections when the illumination is down to "light −70%". Specifically, it misses both the spike and rail. With respect to the condition of "spike, rail, and clip", when the light condition is reduced to "light −70", the detection misses two spikes and incorrectly takes one clip as a spike. Overall, it can be found that the inspection is more sensitive to the variation of visibility rather than image size. Under the very dimmest condition, missing and false inspection can occur, which is unfavorable for field practice. To simulate the missing track components scenario and test the robustness of YOLOv4-hybrid, images edited by Photoshop are fed into the model to check the performance. FIG. 33 shows the edited cases of "fake ballast", "fake spike", and "missing clip" with the stamp tool in Photoshop. According to FIG. 33, even there are "missing parts" and "fake parts", all detection results are correct. In the "spike only" condition, a spike is replaced by a "fake ballast" which has a very similar shape of a spike head, but the model correctly rejects it as a spike. In the "spike and rail" condition, two spikes are manually "copied" and added into the revised image and the newly added spikes are correctly recognized by the model. Moreover, in the "spike, rail, and clip" condition, no redundant label is assigned to the area of the "disappeared clip" and the rest of the detection results are all correct. In summary, the proposed YOLOv4-hybrid model can accurately detect the railroad components before and after certain changes on the railroad track such as missing or fake components.

In this disclosure, a real-time railroad track components inspection framework is proposed, aiming to assist the railroad industry to save inspection cost, improve inspection efficiency and accuracy, and prompt railroad safety. The proposed framework is based on a newly released one-stage object detection model YOLOv4. The original Mish activation functions in the four residual blocks of the backbone are replaced with different activation functions, including Swish, Leaky-ReLU, and a combination of Mish and Swish. A total of 1000 images including rail, spike, and clip are utilized for training and validation. The modified models and the original YOLOv3 and YOLOv4 models are trained and evaluated based on PyTorch library, PR curve, F1 score, mAP, and inference time. Experimental results indicate that the hybrid model, YOLOv4-hybrid, which adopts a hybrid activation function outperforms the other models on precision, recall, mAP, and F1 score, showing potential better inspection performance in the field practice.

The influence of different image sizes and illumination conditions on the prediction performance is investigated. Test results depict that the developed YOLOv4-hybrid is more sensitive to the illumination conditions rather than image size. Under very dimming conditions, the model could miss railroad track components and false alarm could occur. To verify the robustness of the proposed YOLOv4-hybrid in "missing and fake component" scenarios, edited images are used to evaluate the performance of the model. Experimental results indicate the developed YOLOv4-hybrid can accurately distinguish the changes before and after image modification.

This is the first attempt using the improved YOLOv4 model on the railroad infrastructure inspection. This disclosure demonstrates the possibility of applying cutting-edge deep learning technology in the railroad industry for field applications. However, the proposed model still has room for improvement such as the relatively low recall on the spike.

Abbreviations and Acronyms

AP: Average Precision;
CIoU: Complete Interaction over Union;
CmBN: Cross mini-Batch Normalization;
CNN: Convolutional Neural Network;
CReLU: Concatenated Rectified Linear Unit;
CSP: Cross-Stage-Partial-connections;
DCNN: Deep Convolutional Neural Network;
DIoU: Distance IoU;
DWT: Discrete Wavelet Transforms;
FCNs: Fully Convolutional Networks;
FPS: Frames Per Second;
FRA: Federal Railroad Administration;
GIoU: Generalized IoU;
GPR: Ground Penetration Radar;

Leaky-ReLU: Leaky Rectified Linear Unit;
LSD: Line Segment Detector;
LSTM: Long Short-Term Memory;
mAP: Mean Average Precision;
MLPNCs: Multilayer Perceptron Neural Classifiers;
MSE: Mean Squared Error Loss;
PANet: Path Aggregation Network;
Precision-Recall: PR;
PReLU: Parametric Rectified Linear Unit;
RReLU: Randomized Leaky Rectified Linear Unit;
SOTA: State-of-The-Art;
SPP: Spatial Pyramid Pooling;
STM: Structure Topic Model;
VISyR: Visual Inspection System for Railway;
WRC: Weighted-Residual-Connections; and
YOLO: You Only Look Once.

In a further embodiment, this disclosure proposes a computer vision-based instance segmentation framework for the rail surface defect inspection. A rail surface database having 1,040 images (260 source images & 780 augmented images) has been built. The classic instance segmentation model, Mask R-CNN has been re-trained for inspecting rail surface defects with the customized dataset. The influences of different backbones and learning rates are investigated and discussed. The experimental results indicate the ResNet101 backbone has the best inspection capability. With a learning rate of 0.005, the re-trained Mask R-CNN model can achieve the best performance on the bounding box and mask predictions. Sixteen images are used to test the inspection performance of the developed model. The results show the proposed approach in this study is promising. The proposed approach has potential for future field applications.

Over the past decades, many efforts have focused on the inspection of rail surface defects and most of these works rely on rail texture classification, identification, and analysis. Mandriota et al. utilized and compared three feature extractors, i.e., Gabor, wavelet, and Gabor wavelet filters, to extract rail defect textures. Their results showed that the Gabor filter outperforms the other two filters on the rail defects identification. However, one of the main problems of their study is that these three filters require a large number of feature images, which are typically difficult to obtain. Jie et al. proposed a railhead surface defect detection framework, which included image pre-processing, defect locating, defect identifying, post-processing, and a geometrical defect locating method. Test results suggest that their defect locating method is more effective and robust compared to the pixel-level feature extraction method, and the framework has high precision and could meet real-time inspection requirements of the field applications. However, noise in the images has significant negative effects in the defect detection, while the proposed way to remove image noise requires extensive validation and needs to be investigated further. Li et al. proposed an intelligent vision detection system (VDS) for inspecting rail surface defects and addressed two issues of improving image quality and automatic thresholding by using the local Michelson-like contrast (MLC) and the proportion emphasized maximum entropy (PEME) thresholding algorithm. The results show that high recall values on Type I and Type II defects are achieved. Although the proposed approach can effectively address the issue of inspecting rail surface defects, the problem of distinguishing the rusted rail area from the area of the real defect needs to be improved. Li et al. developed a real-time visual inspection system (VIS) for the detection of discrete rail surface defects. VIS aims to solve four difficult problems related to: a) limited features for recognition; b) illumination inequality; c) variation of rail surface reflection; and d) the requirements on high-speed detection. The proposed local normalization (LN) method and the defect localization based on the projection profile (DLBP) algorithm are used to address these four challenges. The results show that VIS can have a recall rate of 93.1% and 80.41% on Type I and Type II defects, respectively. They also mentioned the detection speed can be improved, and the LN method needs to be more robust for field applications.

It is worth noting that the above approaches are focusing on traditional handcrafted features learning to identify and classify rail surface defects, which requires technicians to have rich experience in feature selection, training parameter adjustment, and a large amount of training data. Compared to those methods, deep learning approaches are more flexible and can automatically extract and learn problem-specific features from the original data without subjectively defining any hand-crafted features. Leveraging the fast development of convolutional neural networks (CNN), many recent developments have been successfully applied to civil engineering, such as pavement crack detection, concrete crack detection, and structural health monitoring, etc. However, few studies used deep learning models to identify and characterize rail surface defects. Faghih-Roohi et al., see Faghih-Roohi, S., S. Hajizadeh, A. Nunez, R. Babuska, and B. De Schutter. Deep convolutional neural networks for detection of rail surface defects. In 2016 International joint conference on neural networks (IJCNN), IEEE, 2016. pp. 2584-2589, proposed to use deep convolutional neural networks (DCNN) to learn features of rail surface defects. Three neural network structures, including small, medium, and large DCNN, are trained with two kinds of activation functions, i.e., Tan h and ReLU. Their experimental results indicate that DCNN can detect rail surface cracks with high accuracy, while the large DCNN with ReLU performs better than other models. Also, they mentioned that the larger DCNN model required longer training time. Song et al., Yanan, S., Z. Hui, L. Li, and Z. Hang. Rail surface defect detection method based on yolov3 deep learning networks. In 2018 Chinese Automation Congress (CAC), IEEE, 2018. pp. 1563-1568, proposed to use YOLOv3 to detect rail surface flaws. YOLOv3 is a one-stage detector with real-time speed for detection. It only detects the target objects with bounding boxes while it does not characterize the defect shape nor quantifies the sizes of the detected rail surface defects.

The current challenges of identifying rail surface defects are: 1) the rail surface defects are not of any regular shape, 2) the features are difficult to extract with a hand-crafted feature design, and 3) the inspection work does not produce reliable results. To address the above issues, this disclosure proposes to train the computer vision-based instance segmentation model, Mask R-CNN, see He, K., G. Gkioxari, P. Dollar, and R. Girshick. *Mask r-cnn. In Proceedings of the IEEE international conference on computer vision,* 2017. pp. 2961-2969, for the identification of the rail surface defects. The contributions of this disclosure are: (i) The development of a customized rail surface defect image database which includes 260 source images and 780 augmented images for deep learning model training, evaluation, and test; (ii) Fine-tuning the Mask R-CNN model with two backbones (ResNet50 & ResNet101) and three learning rates(0.02, 0.01, and 0.005) for better inspection and identification performance on rail surface defect; (iii) The inspection performance evaluation of Mask R-CNN model on rail surface defects with different severity levels and different orientations of rails; (iv) The performance comparison between Mask R-CNN and Otsu's method on the rail surface defects inspection; and (v) The impact of different light conditions on the rail surface defects inspection with Mask R-CNN.

In this study, to accurately inspect the rail surface defects, the instance segmentation model, Mask R-CNN with two different backbones, and three different learning rates are trained and evaluated. FIG. 37 shows the overall methodology of this disclosure.

This disclosure has three tasks: (i) data preparation, (ii) model training and evaluation, and (iii) inspection results on the rail and its surface defects. The data preparation tasks include data collection, image augmentation, and data labelling with the generation of annotation files. The popular labelling tool, labelme (21) is used in the labeling process. For the model training and evaluation, two backbones and three learning rates are selected and used in this study, aiming to find the optimal parameters for the inspection. Finally, regarding the inspection performance, the original images containing rail surface defects are used to test and evaluate the robustness of the proposed method.

Mask R-CNN Architecture

Mask R-CNN is an instance segmentation model which is developed by He et al., see He, K., G. Gkioxari, P. Dollar, and R. Girshick. *Mask r-cnn. In Proceedings of the IEEE international conference on computer vision,* 2017. pp. 2961-2969. Compared to the original two-stage detector Faster R-CNN, see 22.Ren, S., K. He, R. Girshick, and J. Sun. *Faster r-cnn: Towards real-time object detection with region proposal networks. In Advances in neural information processing systems,* 2015. pp. 91-99, it adds a parallel branch for recognizing the mask for each instance. It is worth noting that the semantic segmentation model can distinguish multiple objects of the same class as a single entity, while the target function of Mask R-CNN is more challenging since it segments each instance based on semantic segmentation. Similar to Faster R-CNN, it adopts the two-stage procedure consisting of the Region Proposal Network (RPN) in the first stage and parallelized class, box and mask detection in the second stage. The loss L in Mask R-CNN is defined by the three loss functions of classification loss Lcls, bounding box loss Lbox, and mask loss Lmask. The sum of the three loss functions is the total loss, i.e., L=Lcls+Lbox+Lmask. Mask R-CNN network architecture, shown in FIG. 38, includes two parts: (1) The backbone for feature extraction over the input image to generate feature maps; (2) The prediction head for bounding box recognition (including classification and regression) and mask generation. In practice, many convolutional neural network (CNN) frameworks have been used as the backbone for feature extraction, and Mask R-CNN demonstrates that adding feature pyramid network (FPN), see Lin, T Y., P. Dollar, R. Girshick, K. He, B. Hariharan, and S. Belongie. *Feature pyramid networks for object detection. In Proceedings of the IEEE conference on computer vision and pattern recognition,* 2017. pp. 2117-2125, architecture in the backbone can achieve better accuracy.

Some of the existing object detectors, see Liu, W., D. Anguelov, D. Erhan, C. Szegedy, S. Reed, C.-Y. Fu, and A. C. Berg. Ssd: *Single shot multibox detector. In European conference on computer vision,* Springer, 2016. pp. 21-37 and Redmon, J., A. Divvala, R. Girshick, and A. Farhadi. *You only look once: Unified, real-time object detection. In Proceedings of the IEEE conference on computer vision and pattern recognition,* 2016. pp. 779-788, perform worse on small objects than on large objects because lower layers provide accurate location information and less semantic information. As the layers increase, the feature semantic information becomes abundant, but the object location information is not accurate. The proposed backbone structure of Mask R-CNN, depicted in FIG. 39, addresses this issue with its network design. Specifically, the Mask R-CNN backbone consists of the ResNet, He, K., X. Zhang, S. Ren, and J. Sun. *Deep residual learning for image recognition, In Proceedings of the IEEE conference on computer vision and pattern recognition,* 2016. pp. 770-778 with 50 or 101 layers as the bottom-up pathway, the FPN as the top-down pathway, and lateral connections, and all of them are depicted in FIG. 39. The bottom-up pathway in ResNet facilitates the feature extraction. Including the FPN structure into the backbone can help maintain strong semantic features at different scales since it constructs higher resolution layers from the top layers. The lateral connections function as bridges connecting the feature maps and the reconstruction layers for better predictions of object locations. Regarding the prediction head, Mask R-CNN extends the box head of the previously developed Faster R-CNN for classification and regression and adds a parallel mask branch for the mask prediction.

Data Preparation

A dataset with rail surface defect images (260 original images and 780 augmented images) was built. Two object classes are included in this study, i.e., the "rail" class and the "defect" class. To keep the labeling clean and neat in the prediction images, "surface defect" is labeled as "defect. The images have been taken by an iPhone8 smartphone from two rail sections in different time near the campus of the University of South Carolina. One is a 50 meters rail section close to Whaley Street and the other one is a 100 meters rail section close to Assembly Street, Columbia, S. C. The height between the camera and the rail surface is 20±5 cm. The original image resolution is 1920×1080 pixel$^2$. Because of the resolution requirements of the training process, the original images are converted to 512×512 pixel$^2$ resolution. Overfitting refers to the trained model only performs well on the training dataset but loses its accuracy with any other dataset, which is typically due to the insufficient useful information of the training dataset.

In this disclosure, to improve the detection performance and reduce possible overfitting, image augmentations, including image rotation, mirroring, and Gaussian noise, are conducted on the source images. On the one hand, image augmentation can generate similar images to enrich the dataset. On the other hand, the model would not be overfitted with more data. Examples of the original and the augmented images can be seen in FIG. 40.

Before the training procedure, the prepared image data needs to be manually labelled first. A popular image labelling tool, labelme, is used for data labeling. A total of 1,040 images after the augmentation are labeled as two classes, which are rail and defect. It is worth noting that the output file is in a JSON format which contains the location information of each manually labeled shape. All labeled images and JSON files are entered into the neural network for training and validation. The ratio of the training set and validation set is 3:1, which means there are 780 images for training and 260 images for validation. It needs to mention that the test set is the same as the validation set and the images in each set are randomly selected. To better show the features contained in the JSON files, an example JSON file is converted to the source image, generated mask image, and its corresponding visualization image and is shown in FIG. 41.

Model Training and Evaluation
Model Training

In this disclosure, two different backbones, ResNet50 (50 convolutional layers) and ResNet101 (101 convolutional layers), and three different learning rates are used to train and evaluate the models. MMDetection, Chen, K., J. Wang, J. Pang, Y. Cao, Y. Xiong, X. Li, S. Sun, W. Feng, Z. Liu, and J. Xu. Mmdetection: *Open mmlab detection toolbox and benchmark.* arXiv preprint arXiv:1906.07155, 2019, an open-source object detection toolbox that is based on the PyTorch library, is used to train Mask R-CNN models in different settings. All the training, validation, and testing tasks are completed in a workstation equipped with four NVIDIA 2080 Ti GPUs. It is worth noting that only one single GPU is called during all training, validation, and testing processes because the data size is small, and it does not need multiple GPUs for computing. The operating system is Ubuntu 18.04, and the NVIDIA driver version is 440.64. To leverage the powerful computation capability of the graphic card, CUDA (version 10.2) and cuDNN (version 7.6.5) are used in the training. Specifically, CUDA is the NVIDIA's language for expediting computation applications, and cuDNN is a library that provides highly tuned implementations for different layers in deep neural networks. The PyTorch version is 1.5.0 (for Linux) and the python version is 3.7 in this study.

Table 7, see FIG. 49, shows the hyperparameters of each training. Note that the input size is the height and weight of an image. One epoch indicates one cycle that the entire dataset passes through the neural network with updated weight once. In this disclosure, each model is trained by 12 epochs. The batch size is the number of images fed into the neural network in each training iteration. Momentum is used to accelerate the speed of converging and it is set to 0.9. Decay is used to prevent weights from growing too large to introduce overfitting. The value of decay is set to 0.0005. The learning rate is an important parameter to control the update rate of the training weights. If the learning rate is set too high, the model would not converge and may cause unfavorable divergent behavior. If the learning rate is set too low, the training progress would be very slow and may lead to marginal updates in the neural network. In this study, three learning rates are tested on the two different backbones, aiming to explore an optimal hyperparameter combination for the customized dataset on the Mask R-CNN framework.

FIG. 42 shows a representative loss graph depicting the loss changes over training iterations. As mentioned herein, the three losses in the Mask R-CNN model are bounding box loss, mask loss, and regression loss. It is evident that the mask loss has the highest loss values and the class loss has the lowest loss values. It is also interesting to observe that in the initial stage, the bounding box loss has a low value, but with the training progressing, the loss values grow bigger. At the end of the training, the values of the class loss, bounding box loss, and mask loss are 0.109, 0.205, and 0.204, respectively. Therefore, the total loss can be 0.518, which is the summation of all three losses. Note that, typically, the total loss should be less than one if there are good training and configuration.

Model Evaluation

To evaluate the prediction performance in different settings, the parameters of mean average precision (mAP), AP50, and AP75 are used for comparison. Precision is the percentage of correct positive predictions for overall predictions. Specifically, the mAP is the mean value of average precision (AP) for each object class. The intersection over the union (IoU) is defined in Equation 20.

$$IoU = \frac{\text{Area of Overlap}}{\text{Area of Union}} \qquad (20)$$

As shown in FIG. 43, IoU measures the overlap between the ground truth and the prediction result for either a bounding box or a mask and distinguishes the positive case and negative case in the training and testing. Specifically, if the IoU with a ground-truth box above and equal to 0.5 is a positive case, and negative otherwise. AP50 refers to the AP value when the IoU threshold is 50%. Similarly, AP75 indicates the AP value when the IoU threshold is 75%. If the prediction is perfect, the IoU would equal to 1. In contrast, if the prediction is missed, the IoU is 0. Generally, the IoU above 50% is considered as a good prediction for object detection.

FIG. 44 and FIG. 50, Table 8, present the mAP, AP50, and AP75 results with different backbones and learning rates on the prediction of the bounding box and mask. In the plots and tables, the learning rate is named as LR. Specifically, three repeated tests have been performed on each configuration, aiming to accurately evaluate each configuration's performance in a statistical manner. The mean value (MV) and standard deviation (SD) have been calculated after each parallel test set. It is worth noting that a high indicator value on MV and a low indicator value on SD mean a good prediction performance on either bounding box or mask. Typically, the mAP value is the smallest because it includes each object class. AP50 value is higher than AP75 value since the lower IoU threshold will introduces more positive cases in the experiments and generates the higher indicator value.

FIG. 44 at (a) and (b) depict the bounding box prediction results with the backbone of ResNet101 and ResNet50, respectively. For the bounding box prediction results shown in Table 8, see FIG. 50, the ResNet101 (LR=0.005) has the maximum MV on mAP which is 65.43% (SD=0.25), 12.86% higher than the maximum MV on mAP with ResNet50. Regarding to the prediction results with ResNet50, it is clear that with the increase of LR on ResNet50, the Mask R-CNN's bounding box prediction performance improves. For example, with ResNet50, when the LR is 0.02, there are the maximum MVs on mAP, AP50 and AP75, which are 52.57, 80.33, and 50.90, respectively. While, the configuration of Mask R-CNN with ResNet50 and LR=0.005 has the minimum MVs on mAP, AP50 and AP75, which are 34.30% (SD=0.59), 68.37% (SD=0.26), and 30.47% (SD=1.32), respectively. In other words, a low learning rate with ResNet50 produces worse performance on bounding box prediction. Interestingly, there are little differences on the bounding box prediction results with different configurations on ResNet101. For the results shown in Table 8, the indicator values are pretty close with different LR values on ResNet50. Overall, the Mask R-CNN model with the backbone of ResNet101 performs best on bounding box prediction on our dataset and different LR values will not introduce a large performance gap on bounding box predication.

FIG. 50 at (c) and (d) show the mask prediction results with the backbones of ResNet50 and ResNet101, respectively. Similar to the bounding box prediction results, the configuration of Mask R-CNN with ResNet101(LR=0.005) achieves the best MV results on mAP, AP50 and AP75, which are 64.50% (SD=0.22), 90.37% (SD=0.12), and 63.37% (SD=0.66). As for the configuration with ResNet50, when the LR is 0.02, Mask R-CNN achieves the best MV result on mAP, AP50 and AP75, which are 54.53% (SD=0.56), 81.07% (SD=0.05), and 52.37% (SD=0.59), respectively. It is worth noting that under the configuration of ResNet50 backbone, with the increase of the LR, the indicator values of mask prediction results increase. Regarding the mask prediction performance under the configuration of Mask R-CNN with ResNet101 and different LR values, it is easy to find there are similar performances with each configuration. In detail, the gaps between the maximum MVs and minimum MVs on the mAP, AP50 and AP75 are 0.1%, 0.37%, and 0.97%, respectively. Similar to the bounding box prediction results, it shows different LR would not introduce much difference in mask prediction under the model configuration with ResNet101. In short, it can conclude that the Mask R-CNN setting of ResNet101 (LR=0.005) has the best performance on the prediction of the bounding box and mask on this customized rail surface defects dataset.

Inspection Performance

To evaluate the prediction performance of Mask R-CNN on the rail surface defect, the parameter setting of the ResNet101 backbone with the learning rate of 0.005, which achieves the best performance as discussed in the last section, is used to inspect the rail surface defects. A total of sixteen testing images are tested in this section. FIGS. 45 and 46 show the testing images and their corresponding prediction results with different orientations and different defect severities. FIG. 47 presents the comparison results of Mask R-CNN and Otsu's method, see Xu, X., S. Xu, L. Jin, and E. Song. *Characteristic analysis of Otsu threshold and its applications. Pattern recognition letters,* 2011, 32(7), 956-961. FIG. 48 depicts the inspection performance under different light conditions.

Influence of Rail Orientation and Different Defect Severities

In FIG. 45 at (a), the rail has a vertical orientation. While another horizontal section of rail is shown in FIG. 45 at (b). The reason to have different orientations is to investigate if the orientation has an impact on the prediction performance. In FIG. 46 at (a), there are relatively mild defect conditions. In FIG. 46 at (b), there are relatively severe defect conditions processed by the enlarged defect parts in the images. The reason behind this is to explore the inspection performance on different defect severities. In FIG. 45 at (a), some obvious defects can be seen, and the developed model predicts well those defects, especially in the second source image which has a continuously defected area. However, as the evaluation metrics herein indicate, the performance on small defects detection could be further improved as suggested by the last two pictures of FIG. 45 at (a). However, those very tiny defects may not impact the track performance very much unless they grow larger, in which case they would be detected by the proposed model. In FIG. 45 at (b), it clearly shows that almost all defects are successfully detected by Mask R-CNN, indicating promising inspection results. In FIG. 46 at (a), with the relatively mild defect conditions, it can be found that our trained Mask R-CNN model can perform well. There are at least seven defects on each original image shown in FIG. 46 at (a) and the re-trained model have detected the defects' shapes and locations with an accurate manner, indicating its promising performance on the mild defect conditions. As for FIG. 46 at (b), to furtherly investigate the model's performance on the relatively more severe conditions, which is common in the field, four images with dense and packed defects have been utilized for test. Each image has at least eight dense defects with small or large shapes. Obviously, it can be found that the re-trained model can detect dense rail surface defects very well on either their shape and locations. Overall, the orientation of the rail has no impact on the detection of the rail surface defect, suggesting a camera could be mounted at an arbitrary orientation for inspection. The re-trained model can detect different defect severities on the rail surface. The results also indicate Mask R-CNN has promising performance for rail surface defect detection and the potential for field applications, but further improvements can be done for very small defects detections and also the implementation of the model with a computing board needs to be developed in the near future.

Comparison of Inspection Performance Between Mask R-CNN and Otsu's Method

To evaluate the inspection performance and segmentation effect between Mask R-CNN and the traditional image processing algorithm, Otsu's method, which is commonly used for obtaining segmentation results with simple thresholding to separate foreground and background. It needs to mention that the threshold is the average of mean levels of foreground and background divided by it, see Xu, X., S. Xu, L. Jin, and E. Song. Characteristic analysis of Otsu threshold and its applications. Pattern recognition letters, 2011, 32(7), 956-961. The reasons to choose Otsu's method are twofold: (1) It is a representative method which is simple and widely studied in other engineering domains; (2) It has similar functionality with Mask R-CNN and both of them can be used for image segmentation, which is useful for defect size analysis in the future study. FIG. 47 presents the comparison results between Mask R-CNN and Otsu's method.

In FIG. 47, compared to Otsu's method, Mask R-CNN has better performance on both dense defect conditions (columns 1 and 2) and sparse defect conditions (columns 3 and 4). In columns 1 and 2, there are 13 defects and 8 defects identified by Mask RCNN. Meanwhile, although Otsu's method can separate the area of large defects, it still introduces a lot of noise on the testing images especially for the image in column 2. In columns 3 and 4, the sparse defect cases, it can be concluded that the fine-tuned Mask R-CNN model can also inspect and distinguish the rail and the defects well. Regarding the performance of Otsu's method in columns 3 and 4, it can be found that Otsu's method cannot separate the foreground and background (e.g., column 3) since their grayscale is similar and the noise is still significant in the sparse case. Besides, Otsu's method cannot deliver the type of object class in the inspection results. For example, taking a view on the inspection result using Otsu's method in column 4, if there is no label to mark it as surface defect, it is a bit hard to judge.

Inspection Performance Under Different Light Conditions

In the real practice, there are many environmental noises which can negatively impact the inspection results. Those factors need to be considered include but not limited to rust, shadow, mud-spot, over-exposure, and dust. Due to the limitation of the available testing data, many of those factors are not covered. Inspired by previous studies, see Guo, F., Y. Qian, Y. Wu, Z. Leng, H. Yu. *Automatic railroad track components inspection using re-al-time instance segmentation. Computer-Aided Civil and Infrastructure Engineering.* 2021 March; 36(3):362-77, Guo, F., Y. Qian, and Y. Shi. *Real-time railroad track components inspection based on the improved YOLOv4 framework. Automation in Construction.* 2021 May 1, 125, 103596, and Wu, Y., Y. Qin, L. Jia. *Research on rail surface defect detection method based on UAV images. Prognostics and System Health Management Conference (PHM-Chongqing)* 2018 Oct. 26 (pp. 553-558).

IEEE, the inspection results of rail surface defects under different light conditions are discussed in this section.

FIG. 48 shows the inspection performance of rail surface defects under three light conditions which are normal, over-exposure, and weak-light conditions, respectively. Even it can be found that the fine-tuned Mask R-CNN can perform well under all the three light conditions, the inspection results are still influenced by the light variation. Specifically, in FIG. 48 at (b), there are mislabeled defect results in column 1 and missed defect results in column 3. In FIG. 48 at (c), it is easy to find that each mask is a little bit larger than the results in FIG. 48 at (a) and (b). It may be due to the boundary of defects is not as obvious as in previous conditions and it will introduce the errors in the defects size evaluation in the future study.

To put it into a nutshell, all testing results indicate Mask R-CNN has promising performance for rail surface defect detection and the potential for field applications, but further improvements can be done for defects size evaluation and grading and the implementation of the model with a computing board needs to be developed in the near future.

CONCLUSIONS

In this study, an automatic inspection framework using Mask R-CNN to inspect the rail surface defect is proposed, aiming to improve the inspection accuracy and efficiency, save the labor cost, and improve the railroad safety. Two different backbones, ResNet50 and ResNet 101, are implemented into Mask R-CNN to test their feature extraction capability on a customized rail surface defect dataset. Three different learning rates which are 0.02, 0.01, and 0.005 are selected for testing the optimal learning speed on this customized dataset. A total of 1,040 images, including two object classes, rail and defect, are utilized for training and evaluation. Different parameter configurations are trained and evaluated based on the MMDetection toolbox. The evaluation metrics including mAP, AP50, and AP75 are used for the model evaluation. Parallel tests have been performed and the test results have been analyzed in a statistical manner using the parameters of MV and SD. Test results indicate that under the configuration of the ResNet101 backbone and the learning rate of 0.005, Mask R-CNN can achieve the highest MVs on mAP with respect to the bounding box and mask predictions, which are 65.43 (SD=0.25) and 64.50 (SD=0.22), respectively. A total of sixteen images with different defect severities have been tested on the optimal parameter settings of Mask R-CNN. The comparison between fine-tuned Mask R-CNN model and Otsu's method has been conducted. Experimental results present a better performance than Otsu's method and show a promising performance on the rail surface defect inspection regardless of the rail orientation, different defect severities, and different light conditions.

To our best knowledge, this is the first attempt using the instance segmentation model, Mask R-CNN, to inspect or predict the rail surface defects. The results indicate a possible solution by using Mask R-CNN to inspect rail surface defect in future applications. However, the prediction performance of the developed model can be further improved as more training data are used.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. An improved one-stage object detection model comprising:
    at least one camera;
    at least one graphics processing unit;
    at least one one-stage object detection model YOLOv4-hybrid, comprising
      Swish;
      Leaky-ReLU; and
      a combination of Mish and Swish; and
    the one-stage object detection model YOLOv4-hybrid employs a hybrid activation function, which includes parameters:
      precision;
      recall;
      mAP; and
      F1 score functionality.

2. The improved one-stage object detection model of claim 1, wherein the model functions in diverse light conditions.

3. The improved one-state object detection model of claim 1, wherein the model can detect image modification.

4. The improved one-state object detection model of claim 3, wherein detection of image modification includes analysis of a structural integrity of a component analyzed by the model.

5. The improved one-state object detection model of claim 1, further comprising a deep learning algorithm.

6. The improved one-state object detection model of claim 1, wherein the model performs real time component detection.

7. The improved one-state object detection model of claim 1, wherein the model performs real time component detection on a railway.

* * * * *